(12) United States Patent
Liu et al.

(10) Patent No.: US 10,019,962 B2
(45) Date of Patent: Jul. 10, 2018

(54) CONTEXT ADAPTIVE USER INTERFACE FOR AUGMENTED REALITY DISPLAY

(75) Inventors: James C. Liu, Bellevue, WA (US); Anton O. Andrews, Seattle, WA (US); Benjamin I. Vaught, Seattle, WA (US); Craig R. Maitlen, Woodinville, WA (US); Christopher M. Novak, Redmond, WA (US); Sheridan Martin Small, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 624 days.

(21) Appl. No.: 13/212,172

(22) Filed: Aug. 17, 2011

(65) Prior Publication Data
US 2013/0044128 A1  Feb. 21, 2013

(51) Int. Cl.
*G09G 5/00* (2006.01)
*G06F 3/01* (2006.01)
(Continued)

(52) U.S. Cl.
CPC ............. *G09G 5/00* (2013.01); *G02B 27/017* (2013.01); *G06F 3/011* (2013.01); *G06T 19/006* (2013.01);
(Continued)

(58) Field of Classification Search
CPC ..... G06T 19/006; G06T 7/60; G06T 2215/16; G06T 7/70; G06T 2219/024; G06T 11/60;
(Continued)

(56) References Cited

U.S. PATENT DOCUMENTS

| 6,046,712 A | 4/2000 | Beller et al. |
| 6,456,262 B1 | 9/2002 | Bell |

(Continued)

FOREIGN PATENT DOCUMENTS

| CN | 101026776 A | 8/2007 |
| EP | 1710002 A1 | 10/2006 |

(Continued)

OTHER PUBLICATIONS

Barras, Colin. "Innovation: Gaze trackers eye computer garners." NewScientist [online]. Mar. 26, 2010. Retrieved from the Internet on Aug. 26, 2010: URL: <http://www.newscientist.com/article/dn18707-innovation-gaze-trackers-e>, 4 pages.

(Continued)

*Primary Examiner* — Xilin Guo
(74) *Attorney, Agent, or Firm* — Arent Fox LLP

(57) ABSTRACT

A user interface includes a virtual object having an appearance in context with a real environment of a user using a see-through, near-eye augmented reality display device system. A virtual type of object and at least one real world object are selected based on compatibility criteria for forming a physical connection like attachment, supporting or integration of the virtual object with the at least one real object. Other appearance characteristics, e.g. color, size or shape, of the virtual object are selected for satisfying compatibility criteria with the selected at least one real object. Additionally, a virtual object type and appearance characteristics of the virtual object may be selected based on a social context of the user, a personal context of the user or both.

23 Claims, 27 Drawing Sheets

(51) Int. Cl.

| | | |
|---|---|---|
| *G02B 27/01* | (2006.01) | |
| *H04N 13/02* | (2006.01) | |
| *H04N 13/04* | (2006.01) | |
| *G06T 19/00* | (2011.01) | |
| *G09G 3/00* | (2006.01) | |
| *G09G 3/34* | (2006.01) | |
| *G09G 5/12* | (2006.01) | |
| *G09G 5/14* | (2006.01) | |

(52) U.S. Cl.
CPC ....... *H04N 13/0271* (2013.01); *H04N 13/044* (2013.01); *G02B 2027/014* (2013.01); *G02B 2027/0112* (2013.01); *G02B 2027/0178* (2013.01); *G09G 3/002* (2013.01); *G09G 3/3413* (2013.01); *G09G 5/12* (2013.01); *G09G 5/14* (2013.01); *G09G 2340/12* (2013.01); *G09G 2354/00* (2013.01)

(58) Field of Classification Search
CPC ........... G06T 2219/2021; G06T 19/003; G06T 13/40; G06T 19/00; G09G 5/00; G09G 3/002; G09G 3/3413; G09G 5/12; G09G 5/14; G09G 2340/12; G09G 2354/00; H04N 13/004; H04N 13/0271; H04N 13/044; G02B 27/017; G02B 2027/0112; G02B 2027/0178; G02B 2027/014; G06F 3/011; H04L 67/22; H04L 67/327; H04L 12/2814; H04L 61/2589
See application file for complete search history.

(56) References Cited

U.S. PATENT DOCUMENTS

| | | |
|---|---|---|
| 6,597,346 B1 | 7/2003 | Havey et al. |
| 6,711,414 B1 | 3/2004 | Lightman et al. |
| 6,738,040 B2 | 5/2004 | Jahn et al. |
| 6,760,046 B2 | 7/2004 | I'Anson et al. |
| 6,842,175 B1 | 1/2005 | Dieter et al. |
| 6,886,137 B2 | 4/2005 | Peck et al. |
| 6,975,991 B2 | 12/2005 | Basson et al. |
| 7,137,069 B2 | 11/2006 | Abbott et al. |
| 7,401,300 B2 | 7/2008 | Nurmi |
| 7,493,153 B2 | 2/2009 | Ahmed et al. |
| 7,532,230 B2 | 5/2009 | Culbertson et al. |
| 7,736,000 B2 | 6/2010 | Enriquez et al. |
| 7,805,528 B2 | 9/2010 | Park et al. |
| 7,822,607 B2 | 10/2010 | Aoki et al. |
| 7,948,451 B2 | 5/2011 | Gustafsson et al. |
| 8,184,070 B1 | 5/2012 | Taubman |
| 8,209,183 B1 | 7/2012 | Patel et al. |
| 8,223,088 B1 | 7/2012 | Gomez et al. |
| 8,743,145 B1 | 6/2014 | Price |
| 9,111,326 B1 | 8/2015 | Worley et al. |
| 2002/0075286 A1* | 6/2002 | Yonezawa et al. ........... 345/679 |
| 2002/0149583 A1 | 10/2002 | Segawa et al. |
| 2002/0158873 A1 | 10/2002 | Williamson |
| 2004/0008157 A1 | 1/2004 | Brubaker et al. |
| 2005/0047629 A1 | 3/2005 | Farrell et al. |
| 2005/0206583 A1 | 9/2005 | Lemelson et al. |
| 2006/0007308 A1 | 1/2006 | Ide et al. |
| 2006/0115130 A1 | 6/2006 | Kozlay |
| 2006/0146012 A1 | 7/2006 | Arneson et al. |
| 2006/0227151 A1 | 10/2006 | Bannai |
| 2006/0250322 A1 | 11/2006 | Hall et al. |
| 2006/0270419 A1 | 11/2006 | Crowley et al. |
| 2007/0081726 A1 | 4/2007 | Westerman |
| 2007/0167689 A1 | 7/2007 | Ramadas et al. |
| 2007/0201859 A1 | 8/2007 | Sarrat |
| 2007/0250901 A1 | 10/2007 | McIntire et al. |
| 2008/0002262 A1 | 1/2008 | Chirieleison |
| 2008/0024392 A1 | 1/2008 | Gustafsson et al. |
| 2008/0133336 A1 | 6/2008 | Altman et al. |
| 2008/0158096 A1 | 7/2008 | Breed |
| 2008/0195956 A1 | 8/2008 | Baron |
| 2008/0211771 A1 | 9/2008 | Richardson |
| 2009/0005961 A1* | 1/2009 | Grabowski .......... G01C 21/365 701/532 |
| 2009/0055739 A1 | 2/2009 | Murillo et al. |
| 2009/0100076 A1 | 4/2009 | Hamilton et al. |
| 2009/0125590 A1 | 5/2009 | Hayano et al. |
| 2009/0158206 A1 | 6/2009 | Myllyla |
| 2009/0187389 A1 | 7/2009 | Dobbins et al. |
| 2009/0187933 A1 | 7/2009 | Ritter et al. |
| 2009/0189974 A1* | 7/2009 | Deering ................ G09G 3/02 348/46 |
| 2009/0217211 A1 | 8/2009 | Hildreth et al. |
| 2009/0233548 A1 | 9/2009 | Andersson et al. |
| 2009/0243968 A1 | 10/2009 | Nakazawa |
| 2009/0284608 A1 | 11/2009 | Hong et al. |
| 2009/0286570 A1 | 11/2009 | Pierce |
| 2009/0287490 A1 | 11/2009 | Cragun et al. |
| 2009/0289955 A1 | 11/2009 | Douris et al. |
| 2009/0289956 A1 | 11/2009 | Douris et al. |
| 2010/0017728 A1 | 1/2010 | Cho et al. |
| 2010/0079356 A1 | 4/2010 | Hoellwarth |
| 2010/0197399 A1 | 8/2010 | Geiss |
| 2010/0199232 A1 | 8/2010 | Mistry et al. |
| 2010/0204984 A1 | 8/2010 | Yang et al. |
| 2010/0238161 A1 | 9/2010 | Varga et al. |
| 2010/0257252 A1 | 10/2010 | Dougherty et al. |
| 2010/0303289 A1 | 12/2010 | Polzin |
| 2010/0306647 A1 | 12/2010 | Zhang et al. |
| 2010/0306715 A1 | 12/2010 | Geisner et al. |
| 2010/0332668 A1 | 12/2010 | Shah et al. |
| 2011/0022196 A1 | 1/2011 | Linsky et al. |
| 2011/0112934 A1 | 5/2011 | Ishihara |
| 2011/0115816 A1* | 5/2011 | Brackney ............... G06Q 10/06 345/629 |
| 2011/0126272 A1 | 5/2011 | Betzler et al. |
| 2011/0181497 A1 | 7/2011 | Raviv |
| 2011/0188760 A1* | 8/2011 | Wright et al. ................ 382/203 |
| 2011/0205242 A1 | 8/2011 | Friesen |
| 2011/0219291 A1 | 9/2011 | Lisa |
| 2011/0221656 A1* | 9/2011 | Haddick et al. ................... 345/8 |
| 2011/0292076 A1* | 12/2011 | Wither .............. G06F 17/30265 345/632 |
| 2011/0316845 A1 | 12/2011 | Roberts et al. |
| 2012/0019557 A1 | 1/2012 | Aronsson et al. |
| 2012/0021828 A1* | 1/2012 | Raitt et al. ....................... 463/31 |
| 2012/0026277 A1 | 2/2012 | Malzbender et al. |
| 2012/0041822 A1 | 2/2012 | Landry et al. |
| 2012/0079018 A1 | 3/2012 | Rottler et al. |
| 2012/0083244 A1 | 4/2012 | Verthein et al. |
| 2012/0143361 A1* | 6/2012 | Kurabayashi et al. ......... 700/94 |
| 2012/0204222 A1 | 8/2012 | Bodi et al. |
| 2012/0210255 A1* | 8/2012 | Ooi .................... G06T 19/006 715/762 |
| 2012/0218263 A1 | 8/2012 | Meier et al. |
| 2012/0249741 A1* | 10/2012 | Maciocci ................ G06F 3/011 348/46 |
| 2012/0270578 A1 | 10/2012 | Feghali |
| 2012/0303610 A1 | 11/2012 | Zhang |
| 2013/0024577 A1 | 1/2013 | Krishnaswamy et al. |
| 2013/0044130 A1 | 2/2013 | Geisner et al. |
| 2013/0174213 A1 | 7/2013 | Liu et al. |
| 2015/0095158 A1 | 4/2015 | Nasserbakht et al. |

FOREIGN PATENT DOCUMENTS

| | | |
|---|---|---|
| JP | 1997204287 | 8/1997 |
| JP | 2002041234 | 2/2002 |
| JP | 2002223458 | 8/2002 |
| JP | 2003508808 | 3/2003 |
| JP | 2003132068 | 5/2003 |
| JP | 2006145922 | 6/2006 |
| KR | 20030054603 | 7/2003 |
| KR | 20030056302 A | 7/2003 |
| KR | 20110107542 A | 10/2011 |
| WO | 2005124429 | 12/2005 |
| WO | 2007015184 A2 | 2/2007 |
| WO | 2007066166 | 6/2007 |

(56) References Cited

FOREIGN PATENT DOCUMENTS

| WO | 2007085303 | | 8/2007 |
|---|---|---|---|
| WO | 2011045276 | A1 | 4/2011 |
| WO | 2013023706 | A1 | 2/2013 |

OTHER PUBLICATIONS

Gaze-enhanced User Interface Design. Stanford HCI Group [online]. Retrieved from the Internet on Aug. 27, 2010: URL: <http://hci.stanford.edu/research/GUIDe/>, 3 pages.

Hua, et al., "Using a Head Mounted Projective Display in Interactive Augmented Environments", Proceedings of IEEE and ACM International Symposium on Augmented Reality, 2001, pp. 217-223, 7 pages.

Kemp, Miles. "Augmented Reality Glasses Concept by Nokia." Spatial Robots [online]. Sep. 23, 2009. Retrieved from the Internet on Aug. 26, 2010: URL: <http://www.spatialrobots.com/2009/09/augmented-reality-glasses-concept-by-nokia/>, 6 pages.

Liarokapis, Fotis, "An Augmented Reality Interface for Visualizing and Interacting with Virtual Content", Draft Paper to Appear in Journal of Virtual Reality, vol. 11, Issue 1, Feb. 2007, 18 pages.

Nilsson, et al., "Hands Free Interaction with Virtual Information in a Real Environment: Eye Gaze as an Interaction Tool in an Augmented Reality System." PsychNology Journal, vol. 7, No. 2, pp. 175-196, Apr. 28, 2009, 22 pages.

Nokia Has Been Fine-Tuning Eye-Tracking Glasses. Symbian-Guru.com [online], Sep. 6, 2009. Retrieved from the Internet on Aug. 26, 2010: URL: <http://www.symbian-guru.com/welcome/2009/09/nokia-has-been-fine-tuning-eye-tracking-glasses.html>, 3 pages.

"Visual perception," Wikipedia [online]. Retrieved from the Internet on Aug. 26, 2010: URL: <http://en.wikipedia.org/wiki/Visual_perception>, 6 pages.

U.S. Appl. No. 12/970,695, filed Dec. 16, 2010.

U.S. Appl. No. 13/361,923, filed Jan. 30, 2012.

Bier et al., "Toolglass and Magic Lenses: The See-Through Interface," Proceedings of the 20th Annual Conference and Exhibition on Computer Graphics and Interactive Techniques (SIGGRAPH '93), Aug. 2-6, 1993, Anaheim, California, USA, 17 pages.

Hollerer et al., "Exploring MARS: Developing Indoor and Outdoor User Interfaces to a Mobile Augmented Reality System," Computers and Graphics, 23(6):779-785, Elsevier Science Limited, Dec. 1999, 12 pages.

Peters, Brandon, "Pupil Size Can Objectively Identify Sleepiness, Sleep Deprivation," Pupillometry Often Used in Research Setting, About.com [online], Mar. 25, 2010 [retrieved on Aug. 9, 2011], Retrieved from the Internet: <URL: http://sleepdisorders.about.com/od/doihaveasleepdisorder/qt/Pupil_Size.htm>, 1 page.

Partala, et al., "Pupil size variation as an indication of affective processing," International Journal of Human-Computer Studies, Jul. 2003, vol. 59, Issue 1-2, pp. 185-198, Academic Press, Inc., Duluth, MN, USA, 14 pages.

Ajanki, et al., "Contextual Information Access with Augmented Reality," 2010 IEEE International Workshop on Machine Learning for Signal Processing (MLSP), Aug. 29, 2010-Sep. 1, 2010, pp. 95-100, 6 pages.

Ajanki, et al., "Ubiquitous Contextual Information Access with Proactive Retrieval and Augmentation", Proceedings of the Fourth International Workshop in Ubiquitous Augmented Reality (IWUVR 2010), May 17, 2010, Helsinki, Finland, 5 pages.

Selker, "Visual Attentive Interfaces,"—Published Date: Oct. 2004, BT Technology Journal, vol. 22 No. 4, pp. 146-150. Retrieved from the Internet by May 5, 2011 http://web.media.mit.edu/~walter/bttj/Paper16Pages146-150.pdf, 5 pages.

Guan et al., "Real-Time 3D Pointing Gesture Recognition for Natural HCI,"—Proceedings of the 7th World Congress on Intelligent Control and Automation, Jun. 25-27, 2008, Chongqing, China, pp. 2433-2436 http://ieeexplore.ieee.org/stamp/stamp.jsp?tp=&arnumber=4593304, 4 pages.

Gade et al., "Person Localization in a Wearable Camera Platform towards Assistive Technology for Social Interactions," Special Issue of Media Solutions that Improve Accessibility to Disabled Users, Ubiquitous Computing and Communication Journal, MSIADU, vol. 5, No. 1, Mar. 10, 2010 and—Retrieved from the Internet: May 5, 2011, http://www.ubicc.org/files/pdf/7_424.pdf, 12 pages.

Depalma, "Leveraging Online Virtual Agents to Crowdsource Human-Robot Interaction," posted Mar. 25, 2011. Retrieved from the Internet: May 5, 2011, http://crowdresearch.org/blog/?p=68, 1 page.

Ajanki, et al. "Contextual Information Access with Augmented Reality." In Proceedings of IEEE International Workshop on Machine Learning for Signal Processing (MLSP), Aug. 29-Sep. 1, 2010, pp. 95-100.

Ajanki, et al., "Ubiquitous Contextual Information Access with Proactive Retrieval and Augmentation", Proceedings of the Fourth International Workshop in Ubiquitous Augmented Reality (IWUVR 2010), May 17, 2010, 5 pages.

U.S. Appl. No. 13/216,647, filed Aug. 24, 2011.

Second Office Action dated Jul. 29, 2014 in Chinese Patent Application No. 201110443987.0, with English Summary of the Office Action and English Notification Sheet, 10 pages.

Office Action dated Apr. 2, 2013 in U.S. Appl. No. 12/970,695, 53 pages.

Response to Office Action dated Oct. 1, 2013 in U.S. Appl. No. 12/970,695, 13 pages.

Final Office Action dated Jan. 16, 2014 in U.S. Appl. No. 12/970,695, 28 pages.

Response to Office Action dated Jul. 11, 2014 in U.S. Appl. No. 12/970,695, 12 pages.

International Search Report dated Apr. 24, 2012 in International Application No. PCT/US2011/063350, 3 pages.

Written Opinion of the International Searching Authority dated Apr. 24, 2012 in Application No. PCT/US2011/063350, 6 pages.

English Abstract of KR 20030054603 dated Jul. 2, 2003.

English Abstract of KR 20030056302 dated Jul. 4, 2003.

Office Action dated Feb. 12, 2014 in Chinese Patent Application No. 201110443987, with English Summary of the Office Action and English Notification Sheet, 14 pages.

English Abstract of CN101026776A dated Aug. 29, 2007, 2 pages.

Response to Chinese Office Action dated Jun. 27, 2014, Chinese Patent Application No. 201110443987.0, with English Translation of Amended Claims, 17 pages.

Office Action dated Sep. 12, 2013 in U.S. Appl. No. 13/361,923, 51 pages.

Response to Office Action filed Mar. 9, 2014 in U.S. Appl. No. 13/361,923, 18 pages.

Office Action dated May 15, 2014 in U.S. Appl. No. 13/361,923, 38 pages.

U.S. Appl. No. 13/689,471, filed Nov. 29, 2012.

International Search Report dated Jan. 14, 2013 in International Application No. PCT/US2012/52136, 4 pages.

Written Opinion of the International Searching Authority dated Jan. 14, 2013 in International Application No. PCT/US2012/52136, 5 pages.

Response to Office Action filed Oct. 13, 2014 in Chinese Patent Application No. 201110443987, with English language translation of the Amended claims, 8 pages.

Office Action dated Dec. 3, 2014, and partial English translation thereof, in Chinese Patent Application No. 201110443987, 6 pages.

Response to Office Action filed Oct. 15, 2014 in U.S. Appl. No. 13/361,923, 18 pages.

Supplementary European Search Report dated Apr. 16, 2015 in European Patent Application No. 11849398.0.

Response to Office Action filed Feb. 10, 2015 in Chinese Patent Application No. 201110443987.0.

Notice of Grant of Patent Right for Invention dated Apr. 2, 2015 in Chinese Patent Application No. 201110443987.0.

Communication pursuant to Article 94(3) EPC dated Jun. 9, 2015 in European Patent Application No. 11849398.0.

Response to Office Action filed Jul. 14, 2015 in European Patent Application No. 11849398.0.

(56) References Cited

OTHER PUBLICATIONS

Notice of Allowance and Fee(s) Due dated Aug. 6, 2015 in U.S. Appl. No. 12/970,695.
Office Action dated Nov. 6, 2015 in Taiwanese Patent Application No. 100140759, filed Dec. 16, 2011, partial English language translation, 10 pages.
Office Action dated Dec. 22, 2015 in Japanese Patent Application No. 2013-544548, 8 pages.
English language Abstract for JP2003508808 published Mar. 4, 2003.
English language Abstract for JP2002041234 published Feb. 8, 2002.
English language Patent Abstract and machine translation for JP2003132068 published May 9, 2003.
English language Patent Abstract and machine translation for JP1997204287 published Aug. 5, 1997.
English language Patent Abstract and machine translation for JP2006145922 published Jun. 8, 2006.
English language Patent Abstract and machine translation for JP2002223458 published Aug. 9, 2002.
Office Action dated Apr. 15, 2016 in U.S. Appl. No. 13/689,471, 133 pages.
Response to Office Action filed Jul. 15, 2016 in U.S. Appl. No. 13/689,471, 11 pages.
Notice of Allowance dated Aug. 26, 2016 in U.S. Appl. No. 13/689,471, 17 pages.
U.S. Appl. No. 15/389,098, filed Dec. 22, 2016.
"Office Action Issued in U.S. Appl. No. 13/689,453", dated Mar. 14, 2014, 12 Pages.
"Response Filed in U.S. Appl. No. 13/689,453", dated Jun. 10, 2014, 8 Pages.
"Response Filed in U.S. Appl. No. 13/689,453", dated Nov. 4, 2013, 8 Pages.
"Final Office Action Issued in U.S. Appl. No. 13/361,923", dated Jan. 26, 2015, 49 Pages.
"Notice of Allowance Issued in U.S. Appl. No. 13/361,923", dated May 28, 2015, 8 Pages.
"Response Filed in U.S. Appl. No. 13/361,923", dated Apr. 10, 2015, 21 Pages.
"Final Office Action Issued in U.S. Appl. No. 13/689,453", dated Nov. 19, 2015, 28 Pages.
"Final Office Action Issued in U.S. Appl. No. 13/689,453", dated Aug. 8, 2016, 25 Pages.
"Interview Summary Issued in U.S. Appl. No. 13/689,453", dated Jun. 18, 2014, 3 Pages.
"Non Final Office Action Issued in U.S. Appl. No. 13/689,453", dated Apr. 11, 2016, 26 Pages.
"Non Final Office Action Issued in U.S. Appl. No. 13/689,453", dated Aug. 5, 2013, 30 Pages.
"Non-Final Office Action Issued in U.S. Appl. No. 13/689,453", dated Mar. 27, 2015, 24 Pages.
"Notice of Allowance Issued in U.S. Appl. No. 13/689,453", dated Oct. 5, 2016, 12 Pages.
"Response Filed in U.S. Appl. No. 13/689,453", dated Sep. 26, 2016, 8 Pages.
"Response Filed in U.S. Appl. No. 13/689,453", dated Jul. 15, 2016, 12 Pages.
"Response Filed in U.S. Appl. No. 13/689,453", dated Feb. 26, 2016, 11 Pages.
"Final Office Action Issued in U.S. Appl. No. 14/865,410", dated Jun. 20, 2017, 38 Pages.
"Non-Final Office Action Issued in U.S. Appl. No. 14/865,410", dated Feb. 9, 2017, 27 Pages.
"Non-Final Office Action Issued in U.S. Appl. No. 14/865,410", dated Nov. 13, 2017, 44 Pages.
"International Search Report & Written Opinion Issued in PCT Application No. PCT/US2012/051954", dated Nov. 29, 2012, 11 Pages.
Reitmayr, et al., "Collaborative Augmented Reality for Outdoor Navigation and Information Browsing", In Proceedings of the Second Symposium on Location Based Services and TeleCartography, Jan. 2004, 11 Pages.

* cited by examiner

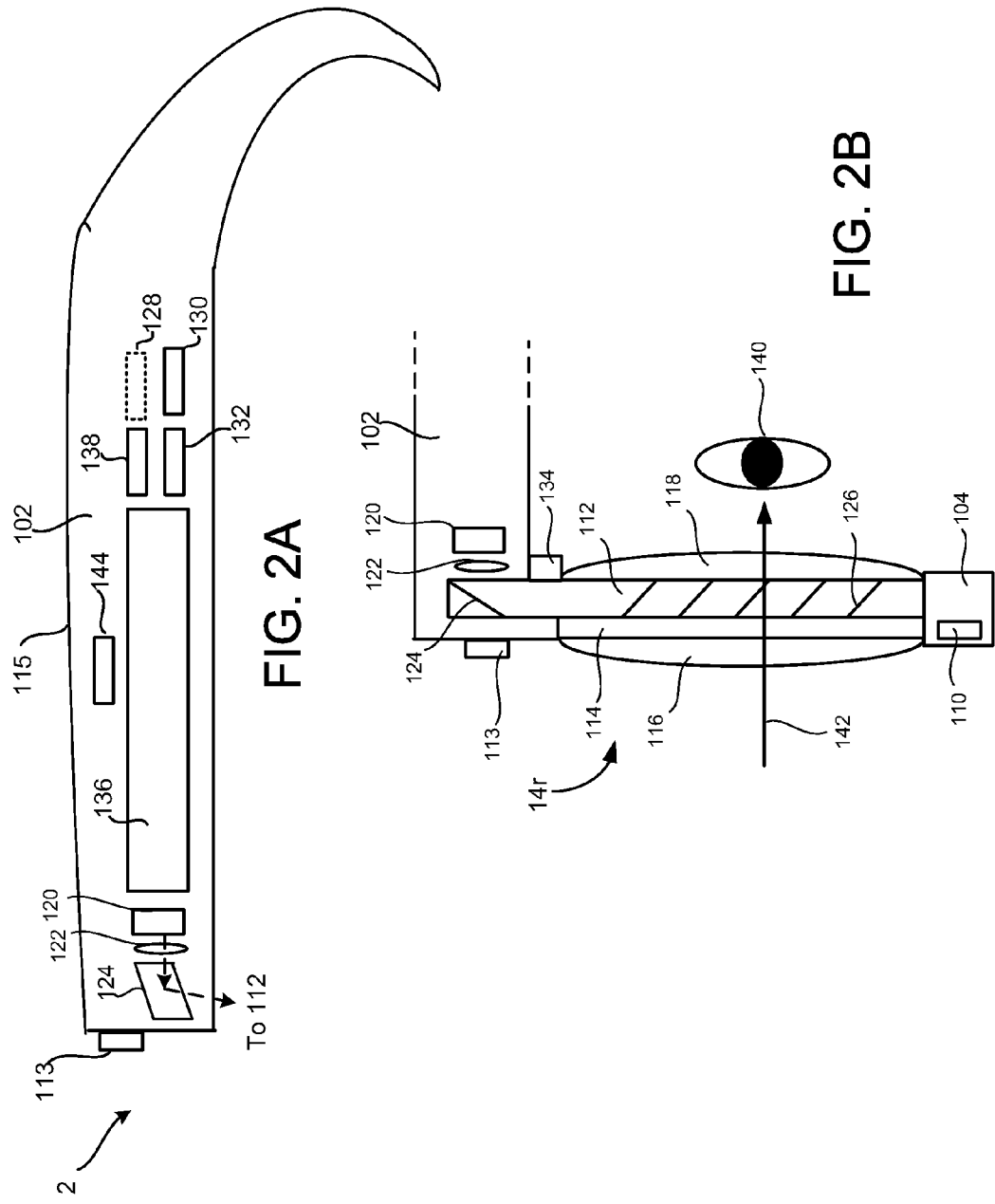

For type of material is material type 1:
colors available are color 1, color 3, color 4, color 8

For type of material is material type 1:
surface patterns available are pattern 1, pattern 2, pattern 7

For type of material is material type 1:
surface textures available are texture 1, texture 2

For type of material is material type 1:
    for type of object is object type 1, animation effects available are animation 1
    for type of object is object type 2, animation effects available are animation 2

For color 1, compatible colors available are all other colors except color 3.

For color 2, compatible colors available are color 1, color 4, and color 6

For color 3, compatible colors available are color 5, color 7, and color 8

For surface 1, types of physical connections available are attachment, horizontal support, hanging, integration For surface 2, types of physical connections available are attachment, hanging, integration For surface 3, types of physical connections available are integration

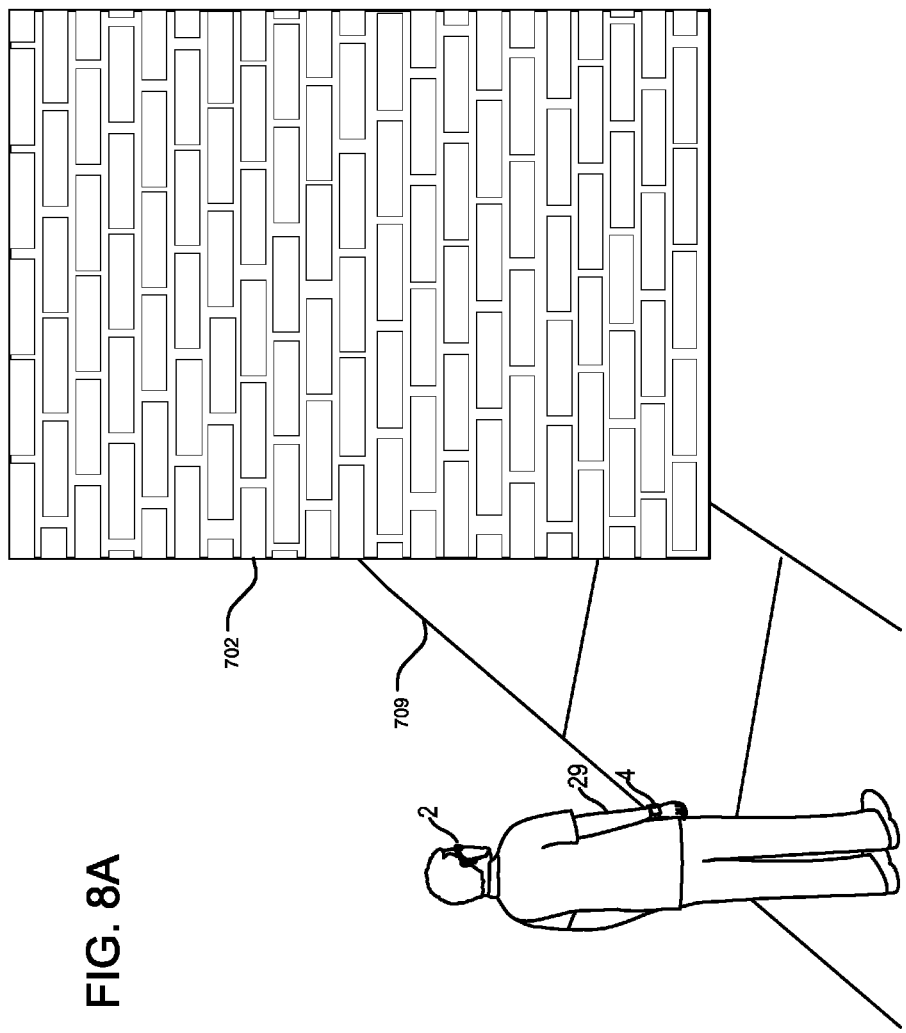

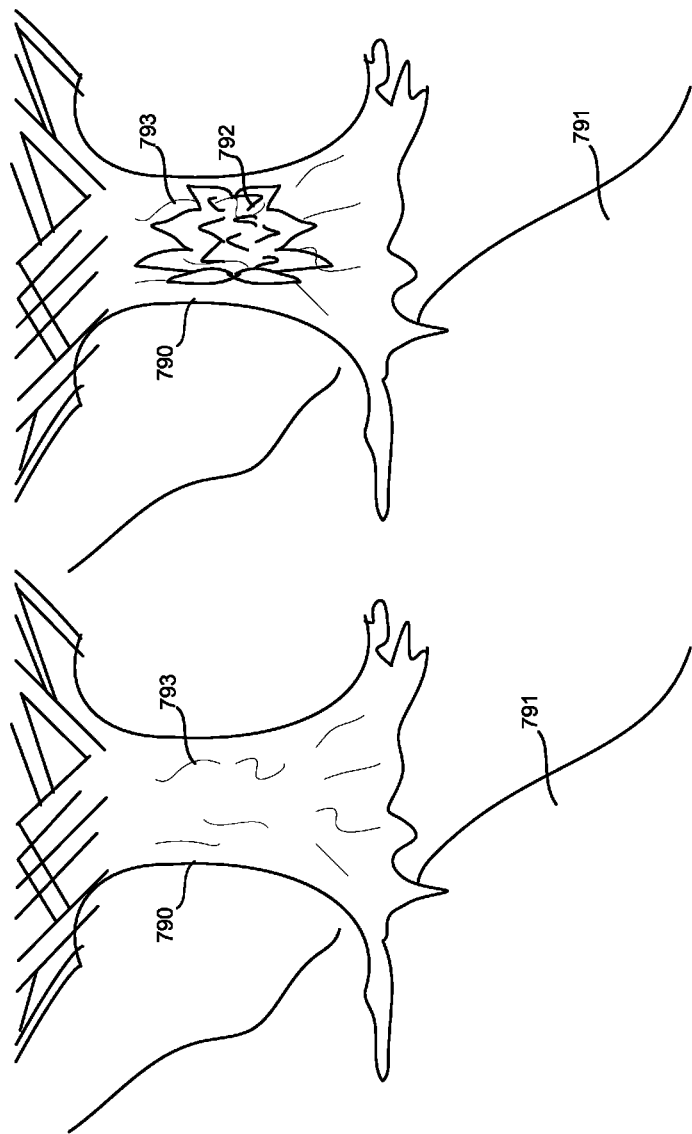

CONTEXT ADAPTIVE USER INTERFACE FOR AUGMENTED REALITY DISPLAY

BACKGROUND

Augmented or mixed reality is a technology that allows virtual imagery to be mixed with a user's actual view of the real world. A near-eye display may be worn by a user to view the mixed imagery of real objects and virtual objects displayed in the user's field of view. A see-through augmented reality display allows a user interface (UI) to be overlaid on top of a user's view of a real world environment, and a problem emerges of having UI elements appear out-of-context with the real-world environment or situation. Such out-of-context images can mark a distracting user experience in interacting with the UI rather than an experience integrated with a real world environment.

SUMMARY

Technology provides a user interface with a virtual object appearing in context with a real environment view of a see through, augmented reality display device system. Appearance characteristics of real objects in the real environment are identified. Some examples of appearance characteristics are type of object, size, shape, color, pattern, surface, surface texture, surface physical context, physical interaction characteristics, and surface geometric orientation. The virtual object is selected for the virtual object to have an appearance of a physical connection with at least one real object in the user's environment. For example, instead of an e-mail window appearing in mid-air, the e-mail content appears in a virtual picture frame hanging on a real wall. In this example, the virtual picture frame appears to have a physical connection of hanging to the real world object of the wall. In another example, a virtual object may appear to be integrated into a real object, e.g. a text message spelled in letters appearing as if carved or burnt in the wood of a desk. As discussed further below, the appearance of the virtual object may also be based on content it represents. Additionally, a social context of the user may also effect the appearance of the virtual object, content to be represented by a virtual object in the interface, and a method for interacting with the user interface. Likewise, a personal context of the user may also effect the appearance of the virtual object and what content is represented by virtual objects.

The technology provides an embodiment of one or more processor readable storage media having instructions encoded thereon which instructions cause one or more processors to execute a method for providing a user interface of a see-through, augmented reality display with a virtual object appearing in context with a real environment. The method comprises identifying one or more appearance characteristics including a surface of one or more real world objects in the real environment and identifying one or more types of physical connections available based on any surface identified for the one or more real world objects. A virtual object type is selected from one or more virtual object candidates, and an anchor real world object set is selected from the one or more real world objects based on the virtual object type and the one or more real objects of the anchor set being capable of forming a physical connection with each other. Display data is generated for an image of the virtual object having the selected virtual object type and forming the physical connection with the anchor real world object set.

The technology provides an embodiment of a method for providing a user interface with a virtual object for displaying content, the virtual object appearing in context with a real environment of a user using a see through, augmented reality display device system. The method comprises identifying one or more appearance characteristics including a surface of one or more real world objects in the real environment and identifying one or more types of physical connections available based on any surface identified for the one or more real world objects. A type of virtual object is selected based on the content to be represented by the virtual object and the type of object being capable of forming a physical connection using at least one of the one or more types of physical connections available. An anchor real world object set is selected from the one or more real world objects in the real environment based on a capability of forming the physical connection with the selected virtual object. Display data is generated for an image of the virtual object having the selected virtual object type and forming the physical connection with the anchor real world object set.

The technology provides an embodiment of a system for providing a user interface with a virtual object appearing in context with a real environment of a user using a see through, augmented reality display device system. The system comprises a computer system communicatively coupled via a network to the see-through, augmented reality display device system for receiving image data of the real environment. The computer system comprises one or more processors and a memory accessible by the one or more processors.

The memory stores software for execution by the one or more processors for identifying one or more appearance characteristics including a surface of one or more real world objects in the real environment and for identifying one or more types of physical connections available based on any surface identified for any of the one or more real world objects. A set of graphical design rules are also stored in the memory which define compatibility criteria between appearance characteristics.

The one or more processors select a type of object for the virtual object and select an anchor real world object set from the one or more real world objects based on compatibility criteria of the set of graphical design rules for forming a physical connection using one of the one or more types of physical connection available. The one or more processors generate display data for an image of the virtual object having the physical connection with the anchor real world object set by the see-through, near-eye, augmented reality display device system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2A is a side view of an eyeglass temple of the frame of in an embodiment of the see-through, mixed reality display device embodied as eyeglasses providing support for hardware and software components.

FIG. 2B is a top view of an embodiment of a display optical system of a see-through, near-eye, mixed reality device.

FIGS. 5E, 5F and 5G illustrate some examples of graphical design rules identifying compatibility criteria for appearance criteria for realistic visual relationships between a virtual and a real object.

FIGS. 8A and 8B illustrate an example of one or more virtual objects representing content and appearing as being physically connected with a real object in a user field of view.

FIGS. 13A, 13B and 13C illustrate an example of an animation effect and a virtual object which is integrated with and has a compatible appearance with an anchor real world object in a real environment about the user.

DETAILED DESCRIPTION

Figure 1A:
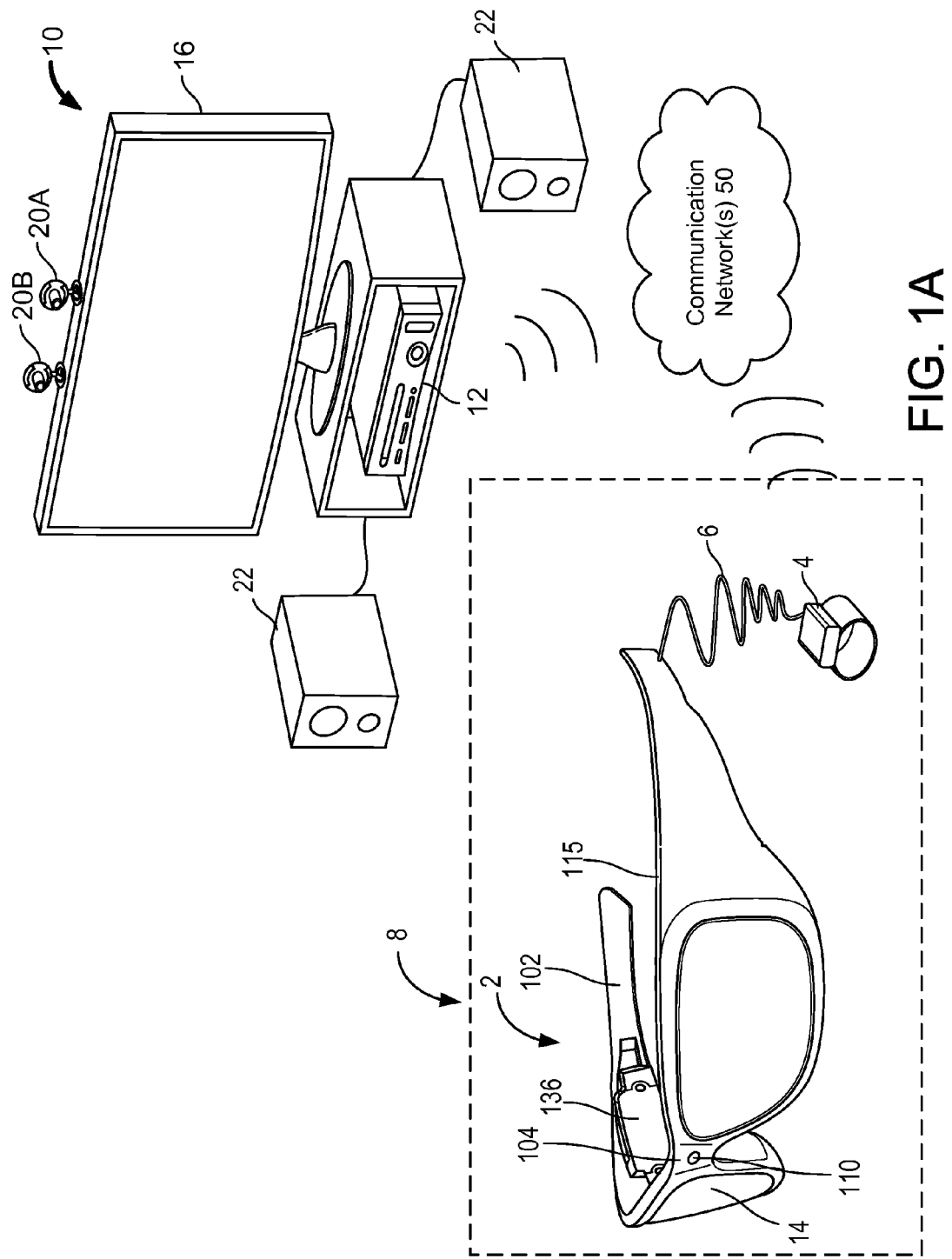
FIG. 1A is a block diagram depicting example components of one embodiment of a see-through, mixed reality display device system.

A feature of a see-through, augmented reality display device unlike other display devices is that the images displayed do not monopolize the user's view. When a user looks at a computer screen of a laptop, desktop computer or smartphone, software executing on the processor generates what is viewed on one hundred percent of the computer screen. The user interface through which a user receives audio or visual content output by the computer system and enters input is formatted for the computer screen. The user's view is diverted from the real world when looking at the computer screen. With an augmented or mixed reality display device, the user can literally see through the display and interact with the real world while also seeing images generated by one or more software applications. One may say there is shared control of the display view by the executing software and the user's head movements and physical environment.

The technology provides a user interface which adapts to the real world environment of the user. In one aspect, the real world environment of the user may be thought of as comprising one or more types of context. One example of a context is a real world environment, in other words, those people and things physically present in a space around the user. The user interface adapts its appearance to be in context with the real world environment. For example, appearance characteristics of virtual objects like size, shape, and color are selected so the virtual objects blend or integrate with the real world view of the user. In many of the embodiments below, the virtual object has an appearance of context by having an appearance of a physical connection with a real object the user actually sees. In some embodiments, graphical design rules which define realistic, visual relationships between appearance characteristics may be applied in selecting the appearance characteristics for the virtual object.

Another example of a context type is a social environment or social context. Furthermore, as discussed in some embodiments below, the user interface adapts its presentation of content to a social environment or context of the user. Some examples of content the user interface may change based on social context or environment are menu selection options, filters applied to messages and other received data. The appearance of the representation of the content in the user interface may also be changed based on the social context. For example, the type of virtual object selected to represent the content or its position in the user field of view may change due to the social context. A method of user interaction with the UI may also be selected based on the social context, for example, which sensory form of communication is selected for outputting data to the user. A physical location of the user, electronically identified relationships with other people, time of day, and an activity of the user are examples of factors defining the user's social context.

Additionally, a personal context of the user may affect the appearance of content in a user interface of a see-through, augmented reality display device system. A personal context of the user may be derived in part based on user profile data such as one's favorite color, favorite foods, state of being, and schedule data. Some factors like an activity of a user and time of day are factors upon which both a personal context and a social context may be based.

The discussion of the figures below begin with describing embodiments of hardware and software components which leverage network connectivity for providing a context adaptive user interface for a see through, augmented reality display device.

FIG. 1A is a block diagram depicting example components of one embodiment of a see-through, augmented or mixed reality display device system. System 8 includes a see-through display device as a near-eye, head mounted display device 2 in communication with processing unit 4 via wire 6. In other embodiments, head mounted display device 2 communicates with processing unit 4 via wireless communication. Processing unit 4 may take various embodiments. In some embodiments, processing unit 4 is a separate unit which may be worn on the user's body, e.g. the wrist in the illustrated example or in a pocket, and includes much of the computing power used to operate near-eye display device 2. Processing unit 4 may communicate wirelessly (e.g., WiFi, Bluetooth, infra-red, wireless Universal Serial Bus (WUSB), cellular, 3G, 4G or other wireless communication means) over a communication network 50 to one or more hub computing systems 12 whether located nearby in this example or at a remote location. In other embodiments, the functionality of the processing unit 4 may be integrated in software and hardware components of the display device 2.

Head mounted display device 2, which in one embodiment is in the shape of eyeglasses in a frame 115, is worn on the head of a user so that the user can see through a display, embodied in this example as a display optical system 14 for each eye, and thereby have an actual direct view of the space in front of the user.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Based on the context of executing software, for example, a gaming application, the system can project images of virtual objects, sometimes referred to as virtual images, on the display that are viewable by the person wearing the see-through display device while that person is also viewing real world objects through the display.

Frame 115 provides a support for holding elements of the system in place as well as a conduit for electrical connections. In this embodiment, frame 115 provides a convenient eyeglass frame as support for the elements of the system discussed further below. In other embodiments, other support structures can be used. An example of such a structure is a visor or goggles. The frame 115 includes a temple or side arm for resting on each of a user's ears. Temple 102 is representative of an embodiment of the right temple and includes control circuitry 136 for the display device 2. Nose bridge 104 of the frame includes a microphone 110 for recording sounds and transmitting audio data to processing unit 4.

Hub computing system 12 may be a computer, a gaming system or console, or a combination of one or more of these. According to an example embodiment, the hub computing system 12 may include hardware components and/or software components such that hub computing system 12 may be used to execute applications such as gaming applications, non-gaming applications, or the like. An application may be executing on hub computing system 12, or by one or more processors of the see-through mixed reality system 8.

In this embodiment, hub computing system 12 is communicatively coupled to one or more capture devices, such as capture devices 20A and 20B. In other embodiments, more or less than two capture devices can be used to capture the room or other physical environment of the user.

Capture devices 20A and 20B may be, for example, cameras that visually monitor one or more users and the surrounding space such that gestures and/or movements performed by the one or more users, as well as the structure of the surrounding space, may be captured, analyzed, and tracked to perform one or more controls or actions within an application and/or animate an avatar or on-screen character. Each capture device, 20A and 20B, may also include a microphone (not shown). Hub computing system 12 may be connected to an audiovisual device 16 such as a television, a monitor, a high-definition television (HDTV), or the like that may provide game or application visuals. In some instances, the audiovisual device 16 may be a three-dimensional display device. In one example, audiovisual device 16 includes internal speakers. In other embodiments, audiovisual device 16, a separate stereo or hub computing system 12 is connected to external speakers 22.

Figure 1B:
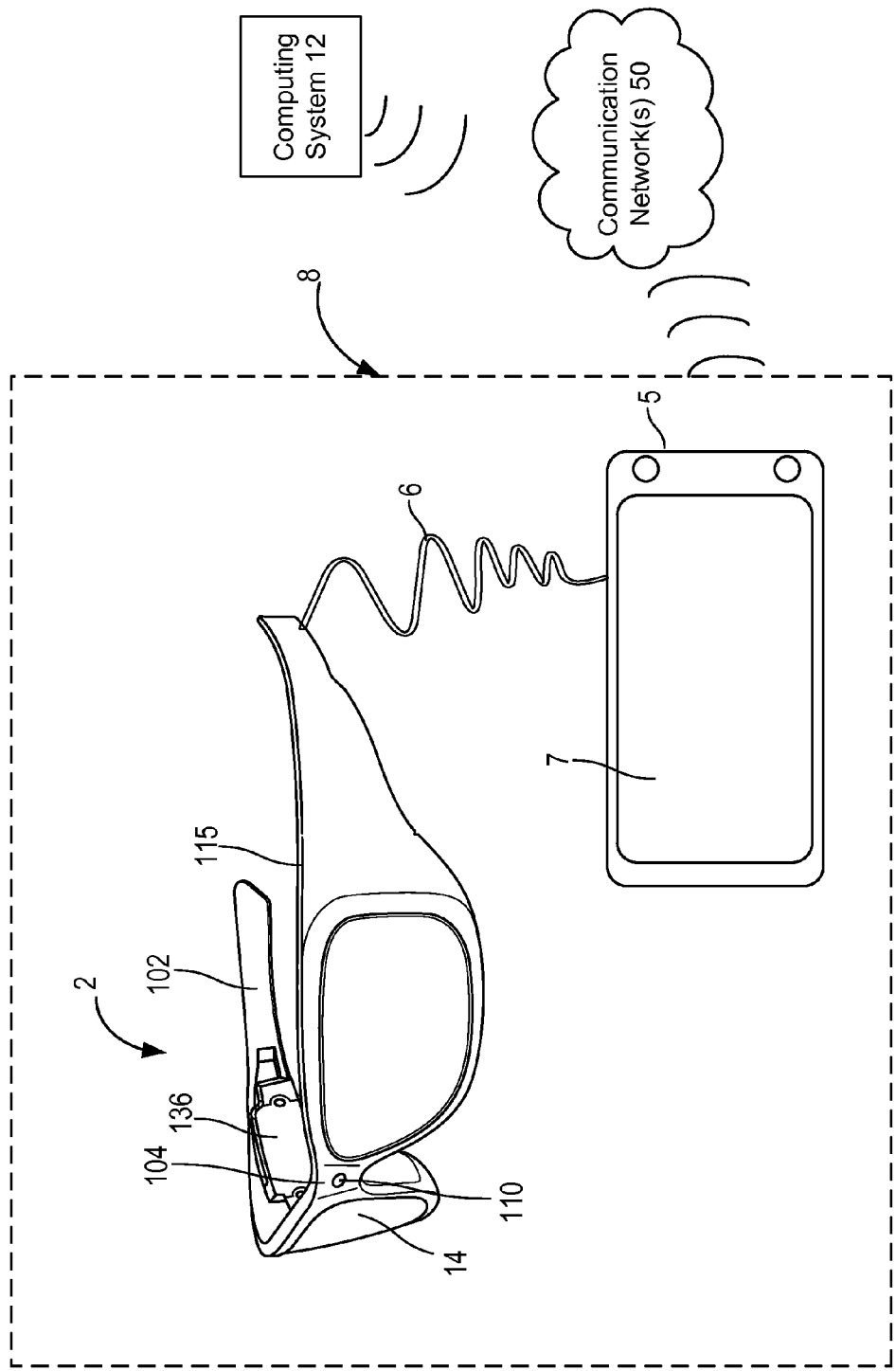
FIG. 1B is a block diagram depicting example components of another embodiment of a see-through, mixed reality display device system.

FIG. 1B is a block diagram depicting example components of another embodiment of a see-through, augmented or mixed reality display device system 8 which may communicate over a communication network 50 with other devices. In this embodiment, the near-eye display device 2 communicates with a mobile computing device 5 as an example embodiment of the processing unit 4. In the illustrated example, the mobile device 5 communicates via wire 6, but communication may also be wireless in other examples.

Furthermore, as in the hub computing system 12, gaming and non-gaming applications may execute on a processor of the mobile device 5 which user actions control or which user actions animate an avatar as may be displayed by the display optical systems 14. A display 7 of the mobile device 5 may also display data, for example menus, for executing applications. The mobile device 5 also provides a network interface for communicating with other computing devices like hub computing system 12 over the Internet 50 or via another communication network 50 (e.g., WiFi, Bluetooth, infra-red, WUSB, cellular, 3G, 4G or other wireless communication means) via a wired or wireless communication medium using a wired or wireless communication protocol. A remote network accessible computer system like hub computing system 12 may be leveraged for processing power and remote data access by a processing unit 4 like mobile device 5. Examples of hardware and software components of a mobile device 5 such as may be embodied in a smartphone or tablet computing device are described in FIG. 20, and these components can embody the hardware and software components of a processing unit 4 such as those discussed in the embodiment of FIG. 3B. Some other examples of mobile devices 5 are a laptop or notebook computer and a netbook computer.

FIG. 2A is a side view of an eyeglass temple 102 of the frame 115 in an embodiment of the see-through, mixed reality display device embodied as eyeglasses providing support for hardware and software components. At the front of frame 115 is physical environment facing video camera 113 that can capture video and still images which are transmitted to the processing unit 4,5. Particularly in some embodiments where the display device 2 is not operating in conjunction with depth cameras like capture devices 20*a* and 20*b* of the hub system 12, the physical environment facing camera 113 may be a depth camera as well as a visible light sensitive camera. For example, the depth camera may include an IR illuminator transmitter and a hot reflecting surface like a hot mirror in front of the visible image sensor which lets the visible light pass and directs reflected IR radiation within a wavelength range or about a predetermined wavelength transmitted by the illuminator to a CCD or other type of depth sensor. Other examples of detectors that may be included on the head mounted display device 2 without limitation, are SONAR, LIDAR, Structured Light, and/or Time of Flight distance detectors positioned to detect information that a wearer of the device may be viewing.

The data from the camera may be sent to a processor 210 of the control circuitry 136, or the processing unit 4,5 or both, which may process them but which the unit 4,5 may also send to one or more computer systems 12 over a network 50 for processing. The processing identifies and maps the user's real world field of view. Additionally, the physical environment facing camera 113 may also include a light meter for measuring ambient light.

Control circuits 136 provide various electronics that support the other components of head mounted display device 2. More details of control circuits 136 are provided below with respect to FIG. 3A. Inside, or mounted to temple 102, are ear phones 130, inertial sensors 132, GPS transceiver 144 and temperature sensor 138. In one embodiment, inertial sensors 132 include a three axis magnetometer 132A, three axis gyro 132B and three axis accelerometer 132C (See FIG. 3A). The inertial sensors are for sensing position, orientation, and sudden accelerations of head mounted display device 2. From these movements, head position may also be determined.

Mounted to or inside temple 102 is an image source or image generation unit 120. In one embodiment, the image source includes micro display assembly 120 for projecting images of one or more virtual objects and lens system 122 for directing images from micro display 120 into light guide optical element 112. Lens system 122 may include one or more lenses. In one embodiment, lens system 122 includes one or more collimating lenses. In the illustrated example, a reflecting element 124 of light guide optical element 112 receives the images directed by the lens system 122.

There are different image generation technologies that can be used to implement micro display 120. For example, micro display 120 can be implemented using a transmissive projection technology where the light source is modulated by optically active material, backlit with white light. These technologies are usually implemented using LCD type displays with powerful backlights and high optical energy densities. Micro display 120 can also be implemented using a reflective technology for which external light is reflected and modulated by an optically active material. Digital light processing (DGP), liquid crystal on silicon (LCOS) and Mirasol® display technology from Qualcomm, inc. are all examples of reflective technologies. Additionally, micro display 120 can be implemented using an emissive technology where light is generated by the display, see for example, a PicoP™ display engine from Microvision, Inc.

FIG. 2B is a top view of an embodiment of a display optical system 14 of a see-through, near-eye, augmented or mixed reality device. A portion of the frame 115 of the near-eye display device 2 will surround a display optical system 14 for providing support for one or more lenses as illustrated and making electrical connections. In order to show the components of the display optical system 14, in this case 14*r* for the right eye system, in the head mounted display device 2, a portion of the frame 115 surrounding the display optical system is not depicted.

In one embodiment, the display optical system 14 includes a light guide optical element 112, opacity filter 114, see-through lens 116 and see-through lens 118. In one embodiment, opacity filter 114 is behind and aligned with see-through lens 116, lightguide optical element 112 is behind and aligned with opacity filter 114, and see-through lens 118 is behind and aligned with lightguide optical element 112. See-through lenses 116 and 118 are standard lenses used in eye glasses and can be made to any prescription (including no prescription). In one embodiment, see-through lenses 116 and 118 can be replaced by a variable prescription lens. In some embodiments, head mounted display device 2 will include only one see-through lens or no see-through lenses. In another alternative, a prescription lens can go inside light guide optical element 112. Opacity filter 114 filters out natural light (either on a per pixel basis or uniformly) to enhance the contrast of the virtual imagery. Light guide optical element 112 channels artificial light to the eye. More details of the opacity filter 114 and light guide optical element 112 is provided below. In alternative embodiments, an opacity filter 114 may not be utilized.

Light guide optical element 112 transmits light from micro display 120 to the eye 140 of the user wearing head mounted display device 2. Light guide optical element 112 also allows light from in front of the head mounted display device 2 to be transmitted through light guide optical element 112 to eye 140, as depicted by arrow 142 representing an optical axis of the display optical system 14*r*, thereby allowing the user to have an actual direct view of the space in front of head mounted display device 2 in addition to receiving a virtual image from micro display 120. Thus, the walls of light guide optical element 112 are see-through. Light guide optical element 112 includes a first reflecting surface 124 (e.g., a mirror or other surface). Light from micro display 120 passes through lens 122 and becomes incident on reflecting surface 124. The reflecting surface 124 reflects the incident light from the micro display 120 such that light is trapped inside a planar, substrate comprising light guide optical element 112 by internal reflection.

After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye 140 of the user. In one embodiment, each eye will have its own light guide optical element 112. When the head mounted display device has two light guide optical elements, each eye can have its own micro display 120 that can display the same image in both eyes or different images in the two eyes. In another embodiment, there can be one light guide optical element which reflects light into both eyes.

Opacity filter 114, which is aligned with light guide optical element 112, selectively blocks natural light, either uniformly or on a per-pixel basis, from passing through light guide optical element 112. In one embodiment, the opacity filter can be a see-through LCD panel, electro chromic film, or similar device which is capable of serving as an opacity filter. Such a see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

Opacity filter 114 can include a dense grid of pixels, where the light transmissivity of each pixel is individually controllable between minimum and maximum transmissivities. While a transmissivity range of 0-100% is ideal, more limited ranges are also acceptable. In one example, 100% transmissivity represents a perfectly clear lens. An "alpha" scale can be defined from 0-100%, where 0% allows no light to pass and 100% allows all light to pass. The value of alpha can be set for each pixel by the opacity filter control unit 224 described below.

A mask of alpha values can be used from a rendering pipeline, after z-buffering with proxies for real-world objects. When the system renders a scene for the augmented reality display, it takes note of which real-world objects are in front of which virtual objects. If a virtual object is in front of a real-world object, then the opacity should be on for the coverage area of the virtual object. If the virtual object is (virtually) behind a real-world object, then the opacity should be off, as well as any color for that pixel, so the user will only see the real-world object for that corresponding area (a pixel or more in size) of real light. Coverage would be on a pixel-by-pixel basis, so the system could handle the case of part of a virtual object being in front of a real-world object, part of the virtual object being behind the real-world object, and part of the virtual object being coincident with the real-world object. Displays capable of going from 0% to 100% opacity at low cost, power, and weight are the most desirable for this use. Moreover, the opacity filter can be rendered in color, such as with a color LCD or with other displays such as organic LEDs, to provide a wide field of view. More details of an opacity filter are provided in U.S. patent application Ser. No. 12/887,426, "Opacity Filter For See-Through Mounted Display," filed on Sep. 21, 2010, incorporated herein by reference in its entirety.

In one embodiment, the display and the opacity filter are rendered simultaneously and are calibrated to a user's precise position in space to compensate for angle-offset issues. Eye tracking can be employed to compute the correct image offset at the extremities of the viewing field. In some embodiments, a temporal or spatial fade in the amount of opacity can be used in the opacity filter. Similarly, a temporal or spatial fade in the virtual image can be used. In one approach, a temporal fade in the amount of opacity of the opacity filter corresponds to a temporal fade in the virtual image. In another approach, a spatial fade in the amount of opacity of the opacity filter corresponds to a spatial fade in the virtual image.

In one example approach, an increased opacity is provided for the pixels of the opacity filter which are behind the virtual image, from the perspective of the identified location of the user's eye. In this manner, the pixels behind the virtual image are darkened so that light from a corresponding portion of the real world scene is blocked from reaching the user's eyes. This allows the virtual image to be realistic and represent a full range of colors and intensities. Moreover, power consumption by the augmented reality emitter is reduced since the virtual image can be provided at a lower intensity. Without the opacity filter, the virtual image would need to be provided at a sufficiently high intensity which is brighter than the corresponding portion of the real world scene, for the virtual image to be distinct and not transparent. In darkening the pixels of the opacity filter, generally, the pixels which follow the closed perimeter of virtual image are darkened, along with pixels within the perimeter. It can be desirable to provide some overlap so that some pixels which are just outside the perimeter and surround the perimeter are also darkened (at the same level of darkness or less dark than pixels inside the perimeter). These pixels just outside the perimeter can provide a fade (e.g., a gradual transition in opacity) from the darkness inside the perimeter to full amount of opacity outside the perimeter.

Head mounted display device 2 also includes a system for tracking the position of the user's eyes. As will be explained below, the system will track the user's position and orientation so that the system can determine the field of view of the user. However, a human will not perceive everything in front of them. Instead, a user's eyes will be directed at a subset of the environment. Therefore, in one embodiment, the system will include technology for tracking the position of the user's eyes in order to refine the measurement of the field of view of the user. For example, head mounted display device 2 includes eye tracking assembly 134 (see FIG. 2B), which will include an eye tracking illumination device 134A and eye tracking camera 134B (see FIG. 3A).

In one embodiment, eye tracking illumination source 134A includes one or more infrared (IR) emitters, which emit IR light toward the eye. Eye tracking camera 134B includes one or more cameras that sense the reflected IR light. The position of the pupil can be identified by known imaging techniques which detect the reflection of the cornea. For example, see U.S. Pat. No. 7,401,920, entitled "Head Mounted Eye Tracking and Display System", issued Jul. 22, 2008 to Kranz et al., incorporated herein by reference. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eye usually moves in unison. However, it is possible to track each eye separately. Alternatively, eye tracking camera may be an alternative form of tracking camera using any motion based image of the eye to detect position, with or without an illumination source.

Another embodiment for tracking the direction of the eyes is based on charge tracking. This concept is based on the observation that a retina carries a measurable positive charge and the cornea has a negative charge. Sensors 128, in some embodiments, are mounted by the user's ears (near earphones 130) to detect the electrical potential while the eyes move around and effectively read out what the eyes are doing in real time. (See Control your mobile music with eyeball-activated earphones!, Feb. 19, 2010 [retrieved from the Internet Jul. 12, 2011: http://www.wirefresh.com/control-your-mobile-music-with-eyeball-actvated-headphones].) Eye blinks may be tracked as commands. Other embodiments for tracking eyes movements such as blinks which are based on pattern and motion recognition in image data from the small eye tracking camera 134 mounted on the inside of the glasses, can also be used.

Besides tracking gaze for identifying a user area of focus in a user field of view and identifying commands, data of the eye captured via sensors, referred to also as eye data, may be used as a basis for determining state of being data stored as part of a personal context. For example, blinking beyond a certain level as detected from image data, glint data, or sensors 128 may be used as an indicator of strong emotion. More simply, a detected closed eyelid for a period of time can indicate a state of being as "sleeping" or may be categorized in activity data as "sleeping" depending on the implementation categorization selected in design choice.

Pupil size and pupil size changes may also be factors upon which a state of being may be determined. From image data, one or more processors of the display device system 8 can identify a black pupil area in a number of image data samples of each respective eye and average the black pupil areas in the number of image data samples to adjust for headshake. An assumption may be made that a pupil is a circle and when viewed from an angle is an ellipse. For example, as the pupil changes its gaze and moves from the center of the image frame, the pupil appears as an ellipse, as a circle viewed from an angle appears as an ellipse. The center of the pupil is the center of the ellipse. The ellipse is fitted from detected edge points in the image. Because such edge points are noisy and not all of them are on the ellipse, the ellipse fitting process is repeated many times over randomly selected subsets of all edge points. The subset that is most consistent with all the edge points is used to obtain the final ellipse.

Pupil size changes with lighting changes; however, if the lighting does not change, one axis of the ellipse, the major axis, remains constant as it represents the diameter of the pupil. The width of the minor axis of the ellipse changes with gaze changes. The light meters (not shown) of the front facing cameras 113 can detect lighting changes. Therefore pupil dilation due to factors other than lighting changes can also be determined Pupil size and the pupil size stability may indicate a state of being sleepy or tired. Sleepiness and sleep deprivation may cause the pupil's overall size to shrink if tired, and the pupil size to become less stable, fluctuating in size. Pupil dilation beyond a criteria under steady state lighting conditions may also indicate a reaction to an emotional stimuli. However, pupil dilation may also be associated with activity.

Therefore, software such as a client push service application $459_1$ discussed below may correlate the pupil dilation with at least a state of being data setting of "strong emotion" if from image data from the outward or physical environment facing cameras 113 and small head movement indicated by the motion sensors 132, the user appears to be sitting down in his or her office. The object being viewed as indicated by the image data from the outward facing cameras 113 may provide more data, e.g. family or employer names in a document, a video or other person or animal being view, from which the software can follow instructions for inferring an emotion. In another example, the image data indicates the view of one of the user's typical lunchtime running paths and the motion sensors 132 indicate a running or jogging speed, state of being data settings may include "awake" and "neutral emotion" and may include "exercising" and "running" as activity data settings.

In one embodiment, the instructions may comprise looking up detected objects in the image data in a database including relationships between the user and the object, and the relationship being associated in data with one or more state of being data settings. Other instruction logic such as heuristic algorithms may be applied to determine a state of being of the user based on both the eye data and the image data of the user's surroundings. The client push service application $459_1$ updates user profile data $460_1$ and $460_N$ with updates to state of being data, activity data, or both upon which a version of a context adaptive UI application 456 (see FIG. 5A) may determine content and appearance of the content for display by the see-through, augmented reality display device system 8.

In the embodiments above, the specific number of lenses shown are just examples. Other numbers and configurations of lenses operating on the same principles may be used. Additionally, FIGS. 2A and 2B only show half of the head mounted display device 2. A full head mounted display device would include another set of see through lenses 116 and 118, another opacity filter 114, another light guide optical element 112, another micro display 120, another lens system 122 physical environment facing camera 113 (also referred to as outward facing or front facing camera 113), eye tracking assembly 134, earphone 130, sensors 128 if present and temperature sensor 138. Additional details of a head mounted display 2 are illustrated in U.S. patent application Ser. No. 12/905,952 entitled Fusing Virtual Content Into Real Content, Filed Oct. 15, 2010, fully incorporated herein by reference.

Figure 3A:
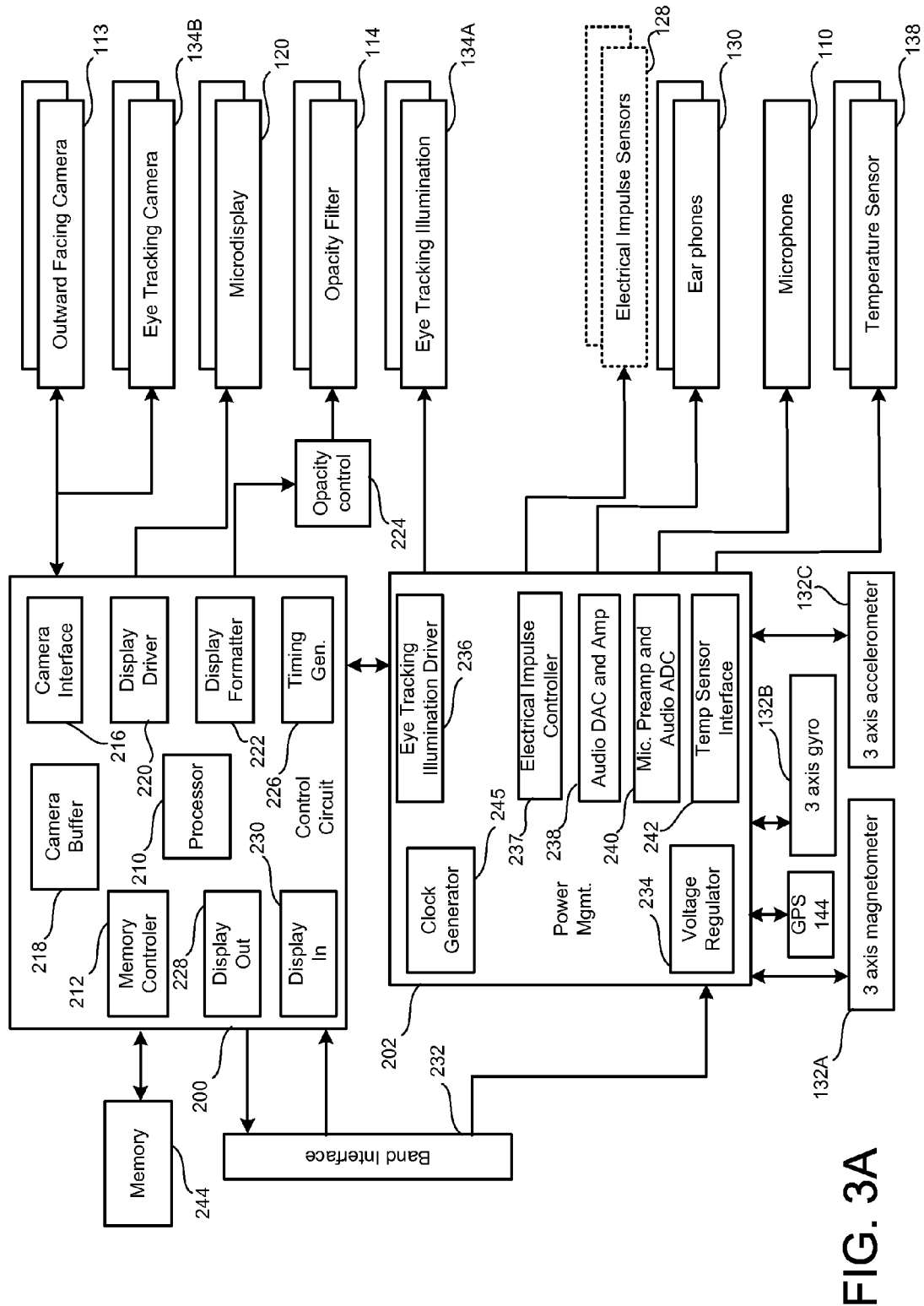
FIG. 3A is a block diagram of one embodiment of hardware and software components of a see-through, near-eye, mixed reality display device as may be used with one or more embodiments.
Figure 3B:
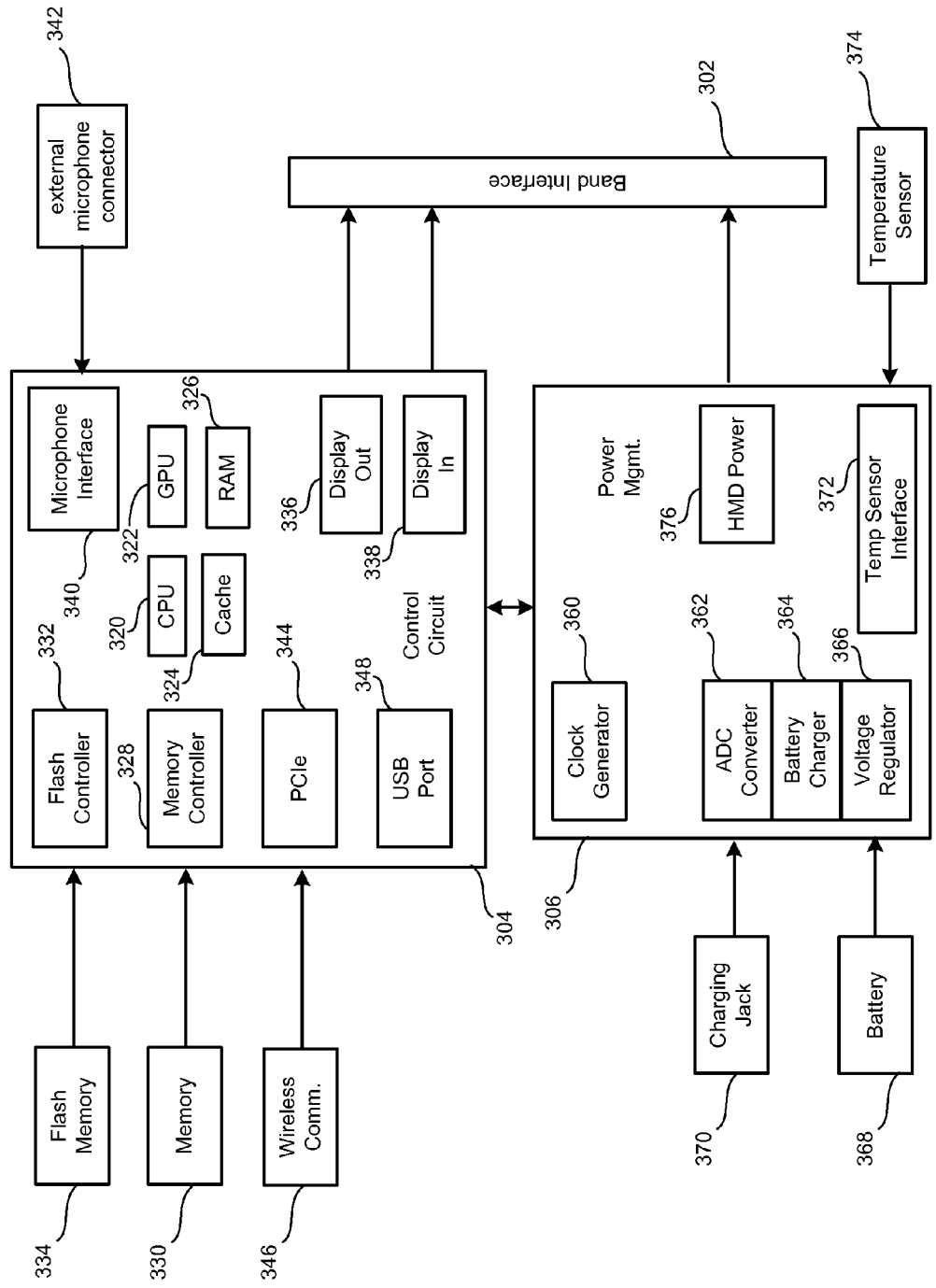
FIG. 3B is a block diagram describing the various components of a processing unit.

FIG. 3A is a block diagram of one embodiment of hardware and software components of a see-through, near-eye, mixed reality display device 2 as may be used with one or more embodiments. FIG. 3B is a block diagram describing the various components of a processing unit 4,5. In this embodiment, near-eye display device 2, receives instructions about a virtual image from processing unit 4,5 and provides data from sensors back to processing unit 4,5. Software and hardware components which may be embodied in a processing unit 4,5, for example as depicted in FIG. 3B, receive the sensory data from the display device 2 and may also receive sensory information from a computing system 12 over a network 50 (See FIGS. 1A and 1B). Based on that information, processing unit 4, 5 will determine where and when to provide a virtual image to the user and send instructions accordingly to the control circuitry 136 of the display device 2.

Note that some of the components of FIG. 3A (e.g., outward or physical environment facing camera 113, eye camera 134, micro display 120, opacity filter 114, eye tracking illumination unit 134A, earphones 130, sensors 128 if present, and temperature sensor 138 are shown in shadow to indicate that there are at least two of each of those devices, at least one for the left side and at least one for the right side of head mounted display device 2. FIG. 3A shows the control circuit 200 in communication with the power management circuit 202. Control circuit 200 includes processor 210, memory controller 212 in communication with memory 244 (e.g., D-RAM), camera interface 216, camera buffer 218, display driver 220, display formatter 222, timing generator 226, display out interface 228, and display in interface 230. In one embodiment, all of components of control circuit 200 are in communication with each other via dedicated lines of one or more buses. In another embodiment, each of the components of control circuit 200 are in communication with processor 210.

Camera interface 216 provides an interface to the two physical environment facing cameras 113 and each eye camera 134 and stores respective images received from the cameras 113, 134 in camera buffer 218. Display driver 220 will drive microdisplay 120. Display formatter 222 may provide information, about the virtual image being displayed on microdisplay 120 to one or more processors of one or more computer systems, e.g. 4, 5, 12, 210 performing processing for the augmented reality system. The display formatter 222 can identify to the opacity control unit 224 transmissivity settings for which pixels of the display optical system 14. Timing generator 226 is used to provide timing data for the system. Display out interface 228 includes a buffer for providing images from physical environment facing cameras 113 and the eye cameras 134 to the processing unit 4, 5. Display in interface 230 includes a buffer for receiving images such as a virtual image to be displayed on microdisplay 120. Display out 228 and display in 230 communicate with band interface 232 which is an interface to processing unit 4, 5.

Power management circuit 202 includes voltage regulator 234, eye tracking illumination driver 236, audio DAC and amplifier 238, microphone preamplifier and audio ADC 240, temperature sensor interface 242, electrical impulse controller 237, and clock generator 245. Voltage regulator 234 receives power from processing unit 4,5 via band interface 232 and provides that power to the other components of head mounted display device 2. Illumination driver 236 controls, for example via a drive current or voltage, the eye tracking illumination unit 134A to operate about a predetermined wavelength or within a wavelength range. Audio DAC and amplifier 238 provides audio data to earphones 130. Microphone preamplifier and audio ADC 240 provides an interface for microphone 110. Temperature sensor interface 242 is an interface for temperature sensor 138. Electrical impulse controller 237 receives data indicating eye movements from the sensor 128 if implemented by the display device 2. Power management unit 202 also provides power and receives data back from three axis magnetometer 132A, three axis gyro 132B and three axis accelerometer 132C. Power management unit 202 also provides power and receives data back from and sends data to GPS transceiver 144.

FIG. 3B is a block diagram of one embodiment of the hardware and software components of a processing unit 4 associated with a see-through, near-eye, mixed reality display unit. The mobile device 5 may include this embodiment of hardware and software components as well as similar components which perform similar functions. FIG. 3B shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with see-through, near-eye display device 2 via band interface 302 and band interface 232, display in buffer 338 in communication with near-eye display device 2 via band interface 302 and band interface 232, microphone interface 340 in communication with an external microphone connector 342 for connecting to a microphone, PCI express interface for connecting to a wireless communication device 346, and USB port(s) 348.

In one embodiment, wireless communication component 346 can include a Wi-Fi enabled communication device, Bluetooth communication device, infrared communication device, cellular, 3G, 4 G communication devices, wireless USB (WUSB) etc. The wireless communication component 346 thus allows peer-to-peer data transfers with for example, another display device system 8, as well as connection to a larger network via a wireless router or cell tower. The USB port can be used to dock the processing unit 4, 5 to another display device system 8. Additionally, the processing unit 4,5 can dock to another computing system 12 in order to load data or software onto processing unit 4, 5, as well as charge processing unit 4, 5. In one embodiment, CPU 320 and GPU 322 are the main workhorses for determining where, when and how to insert virtual images into the view of the user.

Power management circuit 306 includes clock generator 360, analog to digital converter 362, battery charger 364, voltage regulator 366, see-through, near-eye display power source 376, and temperature sensor interface 372 in communication with temperature sensor 374 (located on the wrist band of processing unit 4). An alternating current to direct current converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power interface 376 provides power to the display device 2.

A context such as a real world environment or a social environment is determined based on the location of the user and the people and things in the user's environment. For image processing purposes, both a person and a thing may be an object, and an object may be a real object, something physically present, or a virtual object in an image displayed by the display device 2. Typically, virtual objects are displayed in three dimensions so that just as a user interacts with real objects in three dimensions, the user may interact with virtual objects in three dimensions. In some embodiments, image data captured from one or more depth cameras provides data for determining the three dimensional relationship of the user to objects, real and virtual, in the user field of view.

Figure 4:
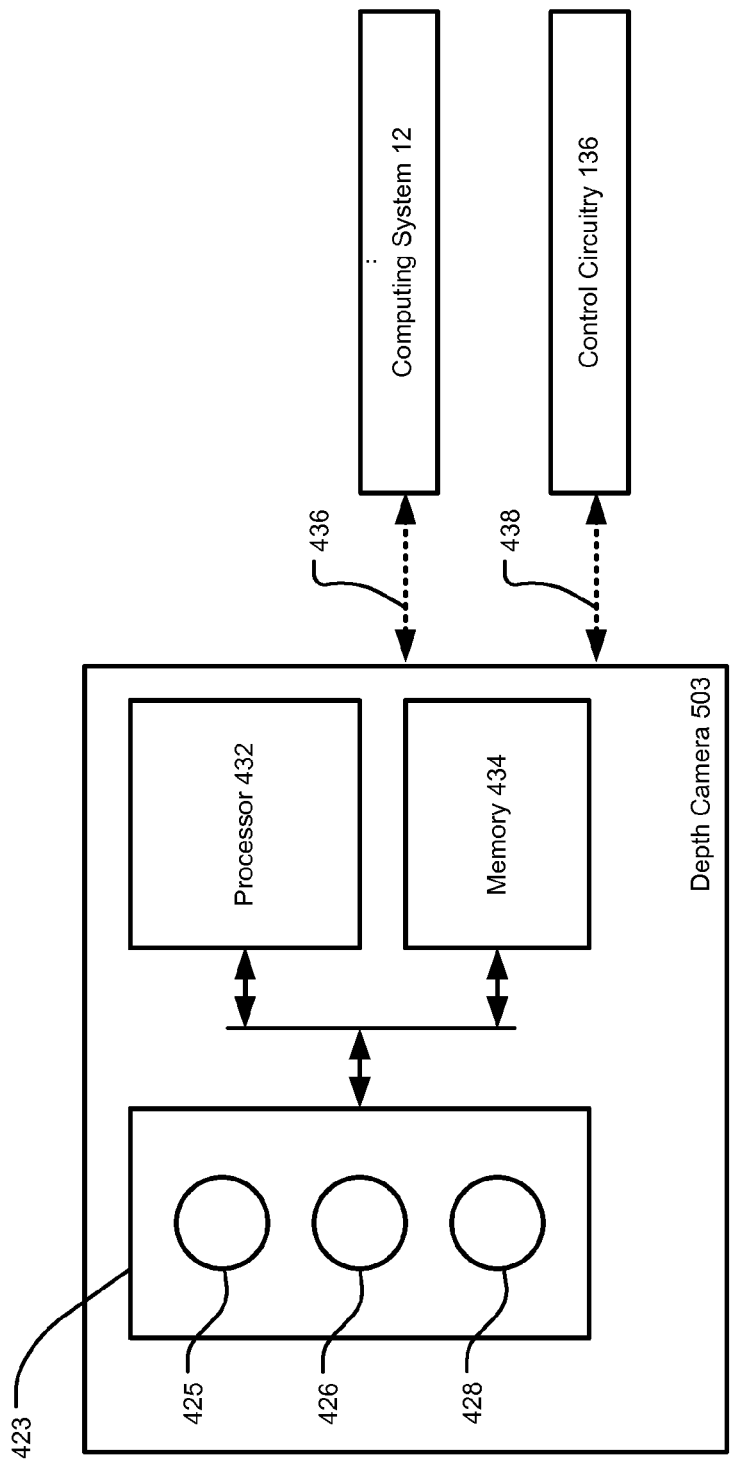
FIG. 4 illustrates an embodiment of a depth camera which may operate in a system embodiment of the technology.

FIG. 4 illustrates an embodiment of a depth camera 503. The outward, front or physical environment facing camera 113 may be embodied as a depth camera which sends images over a communication coupling 438 to the control circuitry 136 which in turn sends the images to the processing unit 4,5 for further processing locally or with the aid of a remote computer system 12. Additionally, as in FIG. 1A, capture devices 20A and 20B in the physical environment of the user may each or together embody a depth camera 503 for processing and sending depth data via a communication coupling 436 to a computer system 12 which may send data about object positions within a three-dimensional model of the environment over a network 50 to the processing unit 4,5. In some embodiments, a computing system 12 or the control circuitry 136 or the processing unit 4,5 may provide a clock to depth camera 503 that may be used to determine a rate of capture of image data, for example a frame rate of 30 frames a second.

According to an example embodiment, depth camera 503 may be configured to capture video with depth information including a depth image that may include depth values via any suitable technique including, for example, time-of-flight, structured light, stereo image, or the like. As shown in FIG. 4, depth camera 503 may include an image camera component 423 which may include an infra-red (IR) light component 425, a three-dimensional (3-D) camera 426, and an RGB (visual image) camera 428 that may be used to capture the depth image of a scene.

The depth image may include a two-dimensional (2-D) pixel area of the captured scene where each pixel in the 2-D pixel area may represent a depth value such as a distance in, for example, centimeters, millimeters, or the like of an object in the captured scene from the camera. According to one embodiment, the depth camera 503 may organize the depth information into "Z layers," or layers that may be perpendicular to a Z axis extending from the depth camera along its line of sight. In other embodiments, gestures for device commands may be determined from two-dimensional image data.

According to another embodiment, in depth image processing, two or more physically separated cameras 503 may view a scene from different angles to obtain visual stereo data that may be resolved to generate depth information. For example, there may be an outward facing camera 113 on each side of frame 115. Furthermore, depth cameras 503 in an environment, e.g. a place of business, may provide images as well as depth cameras 503 on HMD devices worn by users in the environment to a depth image processing application for creating and updating a three dimensional model of the objects within the environment. Other types of depth image sensors can also be used to create a depth image.

In an example embodiment, the depth camera 503 may further include a processor 432 that may be in communication with the image camera component 423 and executes instructions including, for example, instructions for receiving a depth image, generating the appropriate data format (e.g., frame) and transferring the data to a computing system, e.g. control circuitry 136 or hub computing system 12. Depth camera 503 may further include a memory 434 that may store the instructions that are executed by processor 432, images or frames of images captured by the 3-D camera and/or RGB camera, or any other suitable information, images, or the like.

As mentioned above, the depth camera 503 is in communication with hub computing system 12 via a communication link 436. The communication link 436 may be a wired connection including, for example, a USB connection, a Firewire connection, an Ethernet cable connection, or the like and/or a wireless connection such as a wireless 802.11b, g, a, or n connection. The communication link 438 may be implemented as a wire connection which may connect a depth camera version of the outward facing camera 113 to the control circuitry 136 which forwards the image data to the processing unit 4,5 for further processing. Communication link 438 could also be wireless in some examples.

Software executing on one or more of the hardware components discussed above use the data provided by sensors such as the camera, orientation sensors and GPS sensor and network connections to track others and real and virtual objects in a user's environment.

Figure 5A:
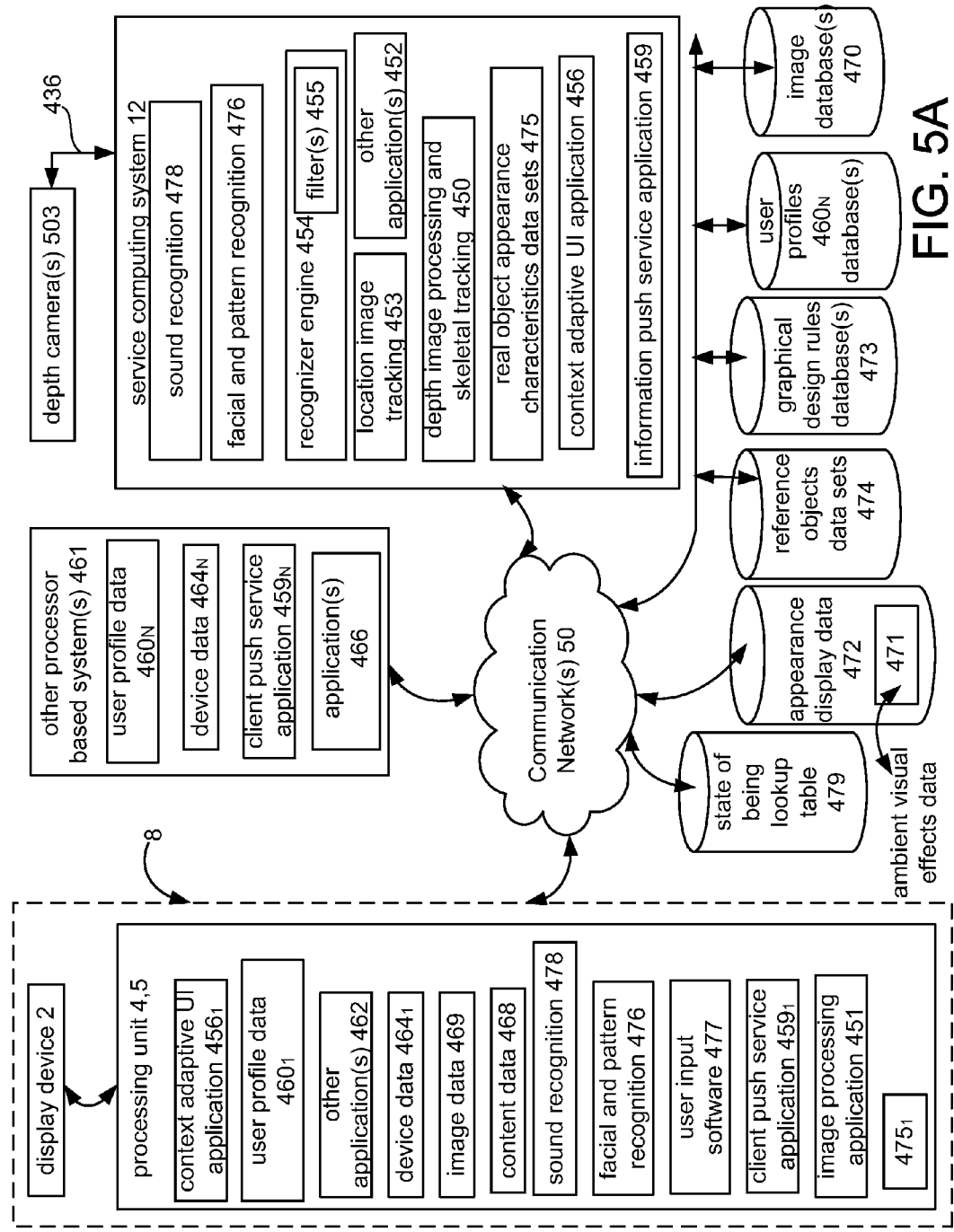
FIG. 5A is a block diagram of a system from a software perspective for providing a user interface with a virtual object appearing in context with a real environment of a user using a see-through, augmented reality display device system.

FIG. 5A is a block diagram of a system from a software perspective for providing a user interface with a virtual object appearing in context with a real environment of a user using a see-through, augmented reality display device system. In this embodiment, a see-through, augmented reality display device system 8 executing a version of a context adaptive user interface (UI) application as a client side context adaptive UI application $456_1$ is communicatively coupled over a network 50 to a computing system 12 executing another version of the context adaptive UI application as a server side context adaptive UI application 456. Computing system 12 may be implemented using one or more computer systems. Some examples of other processor based systems 461 are other see-through, augmented or mixed reality display device systems, other head mounted display systems, servers, mobile devices like mobile phones, smartphones, netbooks, notebooks, and the like and desktop computers. In this embodiment, each of the systems 8, 461 and 12 are communicatively coupled over one or more networks 50 to various databases discussed further below such as state of being lookup table 479, appearance display data 472 with ambient visual effects data 471, reference object data sets 474, graphical design rules database(s) 473, user profile databases $460_N$ and image database(s) 470. These other processor based systems 461 communicate with the display device system 8 to provide content, for example a message, in various multimedia formats like text, audio, image and video data, from one or more of its applications 466.

Often with the aid of the server side context adaptive UI application 456, the client side context adaptive UI application $456_1$ causes the content to be represented by one or more virtual objects which appear in context with the real world view of the display device system 8. As described further below, whether on the client side or the server side, the context adaptive UI application identifies at least one surface and its geometric orientation for at least one real object of a real environment of the user to which a physical connection can be formed with a type of virtual object. Furthermore, a composite surface formed by a plurality of surfaces of real world objects may also be identified. Each real object having a surface and each plurality of real world objects forming a composite surface is selected as an anchor real world object candidate set. Thus a set can have one real object as a sole member or a plurality of real objects as members. Additionally, surface physical context data such as spatial clearance or surround free space (e.g. 556) and position 558 of the surface with respect to one or more other objects in the user's surroundings may also be identified.

Additionally, more than one real object may appear to physically connect with a virtual object, and more than one virtual object may appear to physically connect with a real object. Additionally, compatibility of other appearance characteristics of an anchor real object candidate set and a virtual object type candidate may also form a basis for selection of both types of objects. Some examples of appearance characteristics are described below with respect to FIG. 5B.

In this embodiment, another application provides additional data for determining a social context or a personal context or both based on data received from and sent to executing applications of a processor based system 461, an example of which is display system 8. The display device system 8 and the other processor based systems 461 execute a client side version of a push service application $459_N$ which communicates over a communication network 50 with an information push service application 459. A user may register an account with the information push service application 459 which grants the information push service permission to monitor the user's executing applications and data generated and received by them as well as user profile data $460_N$, and device data $464_N$ for tracking the user's location and device capabilities.

Trust levels may be determined by user profile data 460 which identifies people known to the user as social networking friends which may be subdivided into different groups based on trust levels. Additionally, the user may explicitly identify trust levels in their user profile using the client context adaptive UI application $456_1$. In one embodiment, computing system 12 includes a user profile database $460_N$ which may aggregate data from user profile data stored on the different user computer systems 8, 461 of the user.

The local copies of the user profile data may store some of the same user profile data 460 and may periodically update their local copies with the user profile data $460_N$ stored by the computer system 12 in an accessible database 460 over a communication network 50. Some examples of user profile data are the user's expressed preferences, the user's friends' list, the user's preferred activities, the user's favorites, some examples of which are, favorite color, favorite foods, favorite books, favorite author, etc., a list of the user's reminders, the user's social groups, the user's current location, and other user created content, such as the user's photos, images and recorded videos. In one embodiment, the user-specific information may be obtained from one or more data sources or applications such as the user's social networking sites, contacts or address book, schedule data from a calendar application, email data, instant messaging data, user profiles or other sources on the Internet as well as data directly entered by the user. As discussed above, state of being data derived from eye data may also be updated and stored in the user profile data 460 both locally and by the remote push service application 459. In this embodiment, network accessible state of being lookup table 479 links identified eye data with a state of being as a reference for deriving the state of being.

Each version of the push service application 459 also stores in user profile data 460 a tracking history of the user. Some examples of events, people and things tracked in the tracking history are locations visited, transactions, content and real things purchased, and people detected with whom the user has interacted. If electronically identified friends (e.g. social networking friends) are registered with the push service application 459 too, or they make information available to the user or publicly through other applications 466, the push service application 459 can use this data as well to track the content and social context of the user.

For example, the information push service 459 will receive data from display device system 8 that a voicemail message has been received from a social networking friend, Sally, with a high trust level according to the user profile data 460$_N$ stored for the user. The push service application 459 from GPS data, a network address for a network connection point, or image data of the user's surroundings or a combination of these determines the user is at work, and sets a social context setting to work. Sally is also a registered user and is wearing her display device system 461. Sally's device communicates device data 464N from her GPS sensor, so the push service application 459 provides Sally's location, the message data, and its content type being audio, as well as the social context setting of work to the context adaptive UI application 456 of either the server, the client executing on the display device system 8 or both. Based on this provided data from the push service application 459, the context adaptive UI application 456 selects the appearance characteristics of a virtual object representing the message and determines to which one or more real objects the virtual object will be anchored in the user field of view. The determination may consider one or more real objects either currently present in the user field of view or having one or more trajectories to come into the user field of view in a predetermined visibility time window as discussed below.

As described further below, real objects are identified in image data and their appearance characteristics are stored, for example as real object appearance characteristics data sets 475 which are accessible over a communication network 50 from computer system 12. A local version of these data sets or a subset 475$_1$ may also be stored on the display device system 8. Reference object data sets 474 provide categories of appearance characteristics tied to different types of objects, and these reference object data sets 474 may be used to recognize objects in image data, and also to select appearance characteristics of virtual objects so they look realistic.

Figure 5B:
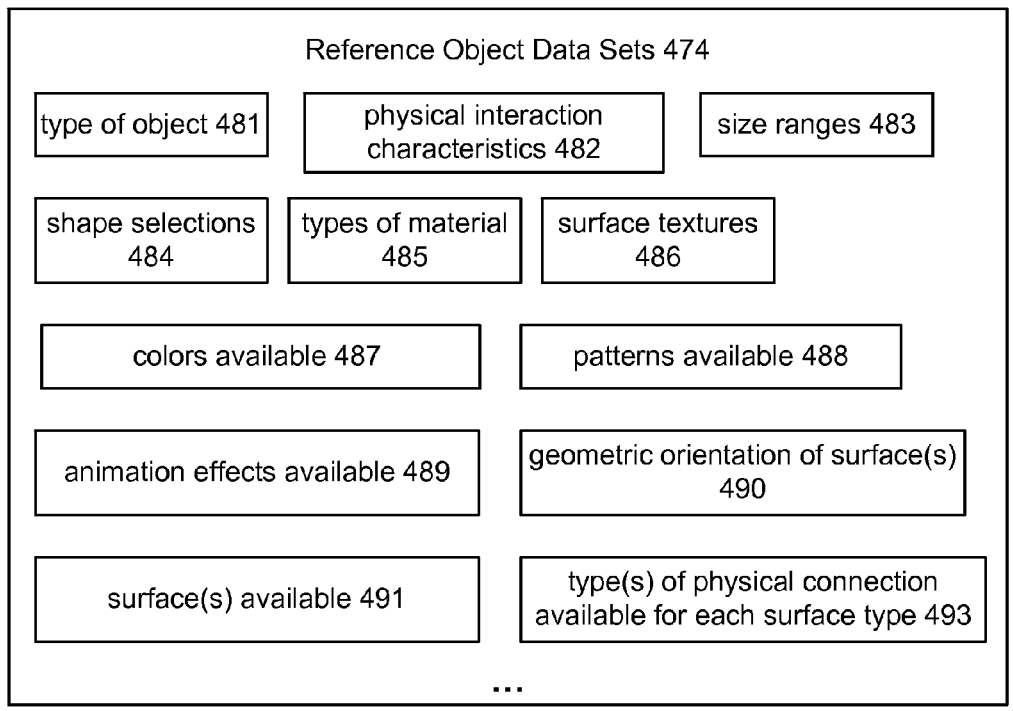
FIG. 5B illustrates an example of a reference object data set.

FIG. 5B illustrates an example of a reference object data set. The data fields include a type of object 481 which may be a data record which also includes sub-fields. For the type of object 481, the other data fields provide data records identifying the types of appearance characteristics available for the type of object. Again, a reference object data set 474 for an object is like a template. The term "available" or "typical" is identifying one or more types of a particular appearance characteristic or a physical connection type which have been identified offline that the type of object commonly possesses. The offline identification may have been performed manually or by pattern recognition software and is used as a basis for each reference data set 474 stored for each type of object defined for the system. For example, the other data records identify size ranges 483, shape selections available 484, typical types of material 485, colors available 487, patterns available 488, surface(s) available 491, typical surface texture(s) 486, a geometric orientation 490 of each available surface 491. Additionally, the reference object data set 474 includes one or more types of physical connection available for each available surface 493. Additionally, a data record 489 may identify animation effects available for the type of object.

Furthermore, a data record 482 may identify physical interaction characteristics for each type of object based on its appearance characteristics. For example, the size, shape of the object and a surface texture of a surface are all factors which effect the physics of an object or how the object will respond to global physical rules, or at least more simply, user physical interaction with the object. Similarly, in another example a type of material of an object can effect physical interaction. When placing a book on a seat of a hardwood chair, the seat does not change shape due to the weight of the supported book. However, a book placed on pillow would cause a depression in the pillow, the sides of which depression would edge the book. In another example, a finger pressed against a hard rubber basketball, properly inflated, has little deformation of the surface while a finger similarly applied to a balloon causes a deformation in the surface which surrounds the finger tip. In another example, a particular texture, either selected for a surface of a virtual object type or existing for a surface of a real object, may affect not only the appearance of the virtual object but also its motion. A smooth textured surface of a virtual object moving across a smooth desk surface experiences less friction than a rock rolling down a rocky trail.

In an example of a desk as the type of object, a sub-field of the type of object may be selected as office desk. The size ranges 483 may range from typical values of 4 to 6 feet in width, 2 to 4 feet in length and 2 to 4 feet in height. Colors available may be brown, silver, black, white, navy blue, beige, or gray. Someone may have a red office desk, so the reference appearance characteristics typically provide commonly found or average parameters. The surfaces 491 may include a flat surface which the geometric orientation 490 indicates as horizontal. Vertical surfaces may also be noted from the image data of the desk. The surface texture 486 for the flat surface may be smooth and the patterns available 488 may indicate wood grain, and vinyl reflective. Types of wood grain patterns may be sub-fields or sub-records to the patterns available 488 record. Animation effects for the office desk including a wood grain surface pattern include fire breaking out and dying out as embers followed by an image of wood underneath with the letters of a message carved. The types of physical connection available 493 for the flat horizontal surface would be support, e.g. paper, cup, picture frame resting on the surface, or integration like the carved letters in the wood so that the content appears an integral part of the real object. A virtual extension of the desktop may also be an example of integration as the extension appears to be a part of the structure of the desk.

Some examples of surfaces are flat and round. In some embodiments, round may be subdivided into types of round shapes like circular, parabolic, elliptical and the like. Some examples may include degrees of roundness. An example of another surface type is uneven. Some examples of surface textures are smooth and rough. In some examples, more detailed categorizations may be provided like wood grain, pock marked, corkboard, rocky, sandpaper and wet as some illustrative examples. Some examples of surface patterns are wood grain (e.g. the texture is smooth but the desk pattern is wood grain), a single color, polka dot, psychedelic, and checkerboard. Some examples of geometric orientation are horizontal, vertical, diagonal, and various angular measurements in between may also be used.

As mentioned above, the reference object data sets 474 also provide input parameters for defining the appearance characteristics of a virtual object. In one embodiment, appearance display data 472 may define types of virtual objects and their appearance characteristics for rendering by the microdisplay 120 of the display device 2. For example, these virtual object types may be considered templates and parameters for appearance characteristics, e.g. a specific color and size are selected for display data 472 in an instantiation of the template. For example, a class may be defined for each type of object, and the context adaptive UI application at runtime instantiates a virtual object of the respective class with the parameters for the appearance characteristics of size, type of material, color, pattern, surface texture, shape parameters, geometric orientation of the object, geometric orientation of each surface of the virtual object, physical interaction characteristics, as well as one or more physical connection types for each surface, position data for each physical connection with one or more selected real objects and any animation effects selection. The appearance display data 472 may be implemented in a markup language. For example, Extensible Markup Language (XML) may be used. In another example, a markup language like Virtual Reality Modeling Language (VRML) may be used.

Figure 5C:
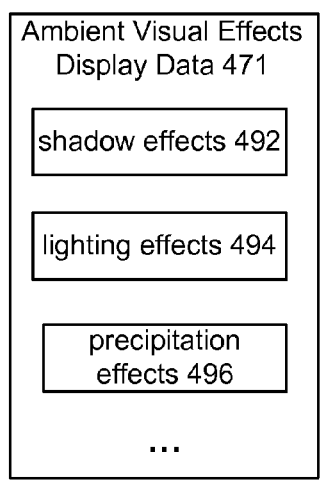
FIG. 5C illustrates some examples of ambient visual effects data.

FIG. 5C illustrates some examples of ambient visual effects display data 471. As a subset of the appearance display data 472, depending on the real world view, ambient visual effects 471 may be applied to the image including the virtual object to fit in with the real world view. Some examples of such ambient visual effects display data 471 are shadow effects 492, light effects 494 and precipitation effects 496. If it is raining and a virtual object is to be displayed on a wall outside, for example, the display data 474 will be selected to include a rain effect, so when the opacity filter 114 blocks out a portion of the real world view for overlay by the virtual object, the virtual object on the wall will also be receiving the rain like the real objects in the view.

Figure 5D:
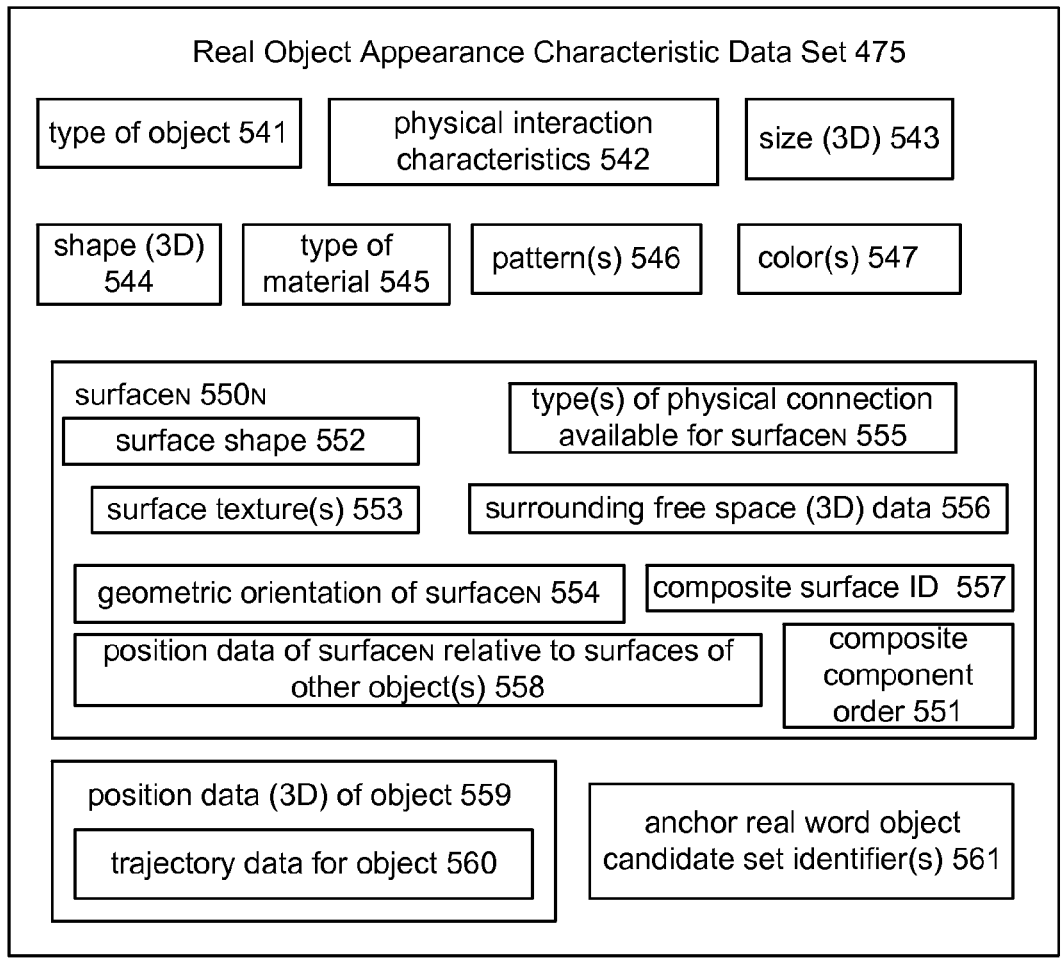
FIG. 5D illustrates some examples of data fields in a real object appearance characteristics data set.

FIG. 5D illustrates some examples of data fields in a real object appearance characteristics data set. Some of the names of data fields may be the same or similar to the reference object data set 474, but the characteristic data set 475 includes the actual data values detected or determined based on captured data of the real object. A data value may not be able to be determined for each data field. In some embodiments, the data value assigned is chosen from a selection of available types provided by the reference object data set 474.

The example data fields include a type of object 541, physical interaction characteristics 542 which are determined based on other appearance characteristics like size 543, in three dimensions in this example, shape 544, also 3D in this example, and type of material 545. Some other exemplary data fields include pattern(s) 546 and colors as well as surface(s).

Surface 550N represents an exemplary data set for each surface identified. The data set includes a surface shape 552, one or more surface textures 553, a geometric orientation 554 of the surface$_N$ and a surface shape 552 (e.g. flat, round, curvy, uneven, etc.). Data values, e.g. attachment, integration, hanging, support, for one or more type(s) 555 of physical connection available are assigned based on the identified surface$_N$, its shape 552, geometric orientation 554, and other factors like surrounding free space (3D) data 556. (In other examples, data for 556, shape 552 and size 543 may be two dimensional.)

Surrounding free space or clearance helps narrow anchor real world object candidate sets. If a table surface is identified, but it is full of items like plants, for example, a support physical connection type is not available for the table surface, unless some form of image processing for replacement of a real object is used. The surrounding free space (3D) 556 may be determined from position data 558 of the surface$_N$ relative to one or more surfaces of one or more other objects, real or virtual, in the real environment. These other objects would typically be nearest neighbor objects. Position data 559 in 3D for the object may also be stored. In this example, the position data 559 includes trajectory data 560 tracking a direction of movement through positions in a location. (In other examples, data for free space 556, relative surface data 558, position data 559, shape 552 and size 543 may be two dimensional.)

As discussed below, in some situations, 3D modeling data of a location the user is in may track real and virtual objects in the location in a coordinate system independent of the user field of view. In this way, a prediction for an object coming into the user field of view can be made based on the user's head position and movement in the location (e.g. based on image data and/or the inertial sensors 132) or the trajectory, a direction of movement, of the object in the 3D modeled location or both.

The position data 558 of surface$_N$ relative to one or more surfaces of one or more other objects in the real environment may be determined based on the position data 559 of objects in the real environment tracked at least in the user field of view or additionally in a 3D model of a location. For example, the position tracking tracks each surface individually as part of the edges of an object. In other examples, a reference point of an object is tracked for position, and a position of the surface of the object is stored with respect to the reference point of its object. Positions of surfaces on different objects with respect to each other are then determined based on the relative positions of the reference points of the objects (e.g. each object's centroid) and each different surface's position to its respective reference point.

As mentioned above, a composite surface may be formed from surfaces from different real objects. There are various implementations designs which may be used to track in stored data which surface of which real object forms the composite surface and in what configuration. In this example, a surface which forms part of a composite surface with a different surface of another real object has a data value stored for a composite surface identifier 557 and another data valued stored for a composite component order identifier 551. The surfaces of the other real objects forming the composite surface share the identifier 557, and each surface in the composite surface is assigned an order identifier 551 by the context adaptive UI application 456, $456_1$ for identifying the configuration of the composite structure. A surface that is independent of a composite structure may just have null values for the composite related identifiers 551 and 557.

An example of a composite structure is two branches of separate trees which together form a hanging composite surface big enough for a banner wherein each tree separately would only support a smaller sign. Size of a virtual object type may be a determining factor for selecting a composite surface over a surface of a single real world object.

One or more anchor real world object candidate set identifiers 561 is stored for the one or more real objects. A real object can be associated with the surfaces$_N$ 550 of its structure, but can also form a composite structure with another real object. A surface$_N$ data set 550 can also be stored for the composite surface, and the real objects forming a composite surface are linked by the same anchor real world candidate set identifier. Each real object also would have another anchor real world object candidate set identifier 561 on its own individual basis.

For a given location in which a number of real objects are fixed, anchor real world object candidate sets can be stored and retrieved later.

FIGS. 5E, 5F and 5G illustrate some examples of graphical design rules 473 identifying compatibility criteria for appearance criteria for realistic visual relationships between a virtual object and a real object. FIG. 5D illustrates some examples of a subset 502 of rules for a type of material of type material type 1. For material type 1, the colors available are the subset of colors, color 1, color 3, color 4 and color 8. Surface patterns available for material type 1 are pattern 1, pattern 2 and pattern 7. Surface textures available are texture 1 and texture 2. The rule subset may also comprise nested rules, like for the type of material is material type 1 and the type of object is object type 1, animation effects available are animation 1. If the object type is object type 2, the animation effects available are animation 2. This example of "material type 1" has limited colors and patterns, so it is likely something like clay brick which has a typical color set of colors associated with it although others are possible, and the patterns and textures of bricks are fairly limited.

If material type 1 were something like cotton fabric or aluminum, the colors and patterns would be practically infinite so a setting might be "all" indicating all the colors and the patterns capable of being rendered by the display device system 2 are available for the type of material. Other appearance characteristics, e.g. type of object, for the object may provide more limitations on color and patterns, size, shape etc as well as ambient factors in the real environment.

FIG. 5F illustrates a subset 504 of graphical design rules for compatible colors. For example, For color 1, compatible colors available are all other colors except color 3. Color 1 may be white for example, and color 3 may be beige so a lack of contrast may make the white and beige incompatible for rendering by the display device system 2. In another rule, compatible colors of color 1, color 4 and color 6 are identified for a color 2, and in yet another example of a compatible color rule, for color 3, compatible colors are color 5, color 7 and color 8.

FIG. 5G illustrates a subset 506 rules for surface types and the types of physical connections available. In the first rule example, for surface 1, the types of physical connections available are attachment, horizontal support, hanging and integration. A horizontal surface a predetermined number of feet off the ground may be an example of such a surface. Again, another rule such as the type of object may limit the types of physical connections available. For example, for a horizontal surface of an office desk, attachment is likely removed as an option as a desk is a workspace which the user fills with different objects daily. For the example of surface 2, the types of physical connections available are attachment, hanging and integration. Surface 2 may be a vertical flat surface like a wall. For surface 3, the types of physical connection available may be simply integration. For example, if surface 3 is a rounded surface, integration or seaming an integral part of the rounded surface may have been selected as most appropriate. For example, a message on a baseball may appear like the other stitches on the baseball.

The graphical design rules 473 for providing realistic visual relationships are predetermined, for example determined by a programmer working with a graphical designer offline. For example, the types of physical connections, the compatibility of colors, the animation effects available for an object type or object sub-type in view of a surface texture type are determined offline, or perhaps by a separate graphical design software suite. However, the context adaptive UI application 456, $456_1$ automatically executes the predetermined graphical design rules 473 for determining which appearance characteristics will be displayed for the virtual object and representing them in display data in a format which can be rendered by the display device system 8.

The image processing application 451 will format display data 472 to a format which can be processed by the image generation unit 120, e.g. the microdisplay 120, and provide instructions to the opacity controller 224 for the opacity filter 114, if used.

In the example of FIG. 5A, the see-through, augmented reality display device system 8, user profile data $460_1$, and other applications 462 as well as device data 464. Device data 464 may include a unique identifier for the computer system 8, a network address, e.g. an IP address, model number, configuration parameters such as devices installed, the operation system, and what applications are available in the display device system 8 and are executing in the display system 8 etc. Particularly for the see-through, mixed reality display device system 8, the device data may also include data from sensors or determined from the sensors like the orientation sensors 132, the temperature sensor 138, the microphone 110, the electrical impulse sensor 128 if present, and the GPS transceiver 144. Image data 469 is also stored and may include images for analysis remotely by the computing system 12, and images to be displayed by the display optical systems 14 of the display device 2. Content data 468 includes content received from other applications like a version of the information push service application 459 which the context adaptive UI application $456_1$ processes for display in context with the real environment.

Sound recognition software 478 may be used to interpret commands or identify nearby users. Facial and pattern recognition software 476 may also be used to detect and identify users in image data as well as objects in image data. User input software 477 can receive data identifying physical actions like gestures, particular spoken commands or eye movements for controlling an application, for example an avatar in a game or simple commands for a word processor. The one or more physical actions may indicate a response or request of a user with respect to a real or virtual object.

The block diagram also represents software components for recognizing physical actions in image data which is discussed further below. Furthermore, the image data plus sensor data available is processed for determining positions of objects, including other users, within a user field of view of the see-through, near-eye display device 2. This embodiment illustrates how the various devices may leverage networked computers to map a three-dimensional model of a user field of view and the surrounding space and the real and virtual objects within the model. An image processing application 451 executing in a processing unit 4,5 communicatively coupled to a display device 2 can communicate image data 469 from front facing camera 113 over one or more communication networks 50 to a depth image processing and skeletal tracking application 450 in a computing system 12 for processing of image data to determine and track objects, which include both people and things, in three dimensions. In some embodiments, additionally, the image processing application 451 may perform some processing for mapping and locating objects in a 3D user space locally and may interact with the location image tracking application 453 for receiving distances between objects. Many combinations of shared processing are possible between the applications by leveraging network connectivity.

A depth image processing application 450 detects objects, identifies objects and their locations in the model. The application 450 may perform its processing based on depth image data from depth cameras 503 like 20A and 20B, two-dimensional or depth image data from one or more front facing cameras 113, and images obtained from databases 470. The image databases 470 may include reference images of objects for use in pattern and facial recognition (e.g. as may be performed by software 476). Some of the images in one or more of the databases 470 may also be accessed via location metadata associated with objects in the images by a location image tracking application 453. Some examples of location metadata include GPS metadata, location data for network access points like a WiFi hotspot, and cell tower location information.

The location image tracking application 453 identifies images of the user's location in one or more image database(s) 470 based on location data received from the processing unit 4,5 or other location units (e.g. GPS units) identified as being within a vicinity of the user, or both. Additionally, the image database(s) may provide images of a location indexed or accessible with location metadata like GPS data, or WiFi hotspot or cell tower location information uploaded by users who wish to share their images. The location image tracking application 453 provides distances between objects in an image based on location data to the depth image processing application 450.

The tracking information from the depth image processing and skeletal tracking application 450, the image processing software 451 or both is provided to either or both of the server and client context adaptive UI applications 456 and 456$_1$. Application 456 provides the tracking information, audio data and visual image data to recognizer engine 454.

In another embodiment, recognizer engine 454 receives the tracking information directly from depth image processing and skeletal tracking module 450 and receives the audio data and visual image data directly from the processing unit 4,5, the capture devices 20A and 20B, or both.

Depth cameras 503 (e.g. capture devices 20A and 20B or front facing cameras 113) provide RGB images (or visual images in other formats or color spaces) and depth images to hub computing system 12. Hub computing system 12 will use the RGB images and depth images to track a user's or object's movements. For example, the system will track a skeleton of a person using the depth images. There are many methods that can be used to track the skeleton of a person using depth images. One suitable example of tracking a skeleton using depth image is provided in U.S. patent application Ser. No. 12/603,437, "Pose Tracking Pipeline" filed on Oct. 21, 2009, Craig, et al. (hereinafter referred to as the '437 application), incorporated herein by reference in its entirety.

The process of the '437 application includes acquiring a depth image, down sampling the data, removing and/or smoothing high variance noisy data, identifying and removing the background, and assigning each of the foreground pixels to different parts of the body. Based on those steps, the system will fit a model to the data and create a skeleton. The skeleton will include a set of joints and connections between the joints. Other methods for tracking can also be used. Suitable tracking technologies are also disclosed in the following four U.S. patent applications, all of which are incorporated herein by reference in their entirety: U.S. patent application Ser. No. 12/475,308, "Device for Identifying and Tracking Multiple Humans Over Time," filed on May 29, 2009; U.S. patent application Ser. No. 12/696,282, "Visual Based Identity Tracking," filed on Jan. 29, 2010; U.S. patent application Ser. No. 12/641,788, "Motion Detection Using Depth Images," filed on Dec. 18, 2009; and U.S. patent application Ser. No. 12/575,388, "Human Tracking System," filed on Oct. 7, 2009.

Recognizer engine 454 includes multiple filters 455 to determine a gesture, action, or condition that may be performed by any person or object detectable by a depth camera 503. Those gestures may be associated with various controls, objects or conditions of the context adaptive UI application 456. For example, such gestures may be a method of interaction for a user to provide input to the context adaptive UI. A filter comprises information defining a gesture, action or condition along with parameters, or metadata, for that gesture, action or condition. For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Parameters may then be set for that gesture. Where the gesture is a throw, a parameter may be a threshold velocity that the hand has to reach, a distance the hand travels (either absolute, or relative to the size of the user as a whole), and a confidence rating by the recognizer engine that the gesture occurred. These parameters for the gesture may vary between applications, between contexts of a single application, or within one context of one application over time.

Inputs to a filter may comprise things such as joint data about a user's joint position, angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made. In some instances, two-dimensional image data is only available. For example, the front facing cameras 113 only provide two-dimensional image data. From the device data 464, the type of front facing camera 113 can be identified, and the recognizer engine 454 can plug in two-dimensional filters for its gestures. Thus, the hub computing system 12 may use the recognizer engine 454, with the filters, to interpret and track movement of objects (including people.)

More information about recognizer engine 454 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009, both of which are incorporated herein by reference in their entirety.

References to front facing image data are referring to image data from one or more front facing cameras like camera 113 in FIGS. 2A and 2B. In these embodiments, the field of view of the front facing cameras 113 approximates the user field of view as the camera is located at a relatively small offset from the optical axis 142 of each display optical system 14, and the offset is taken into account in processing the image data.

Figure 6A:
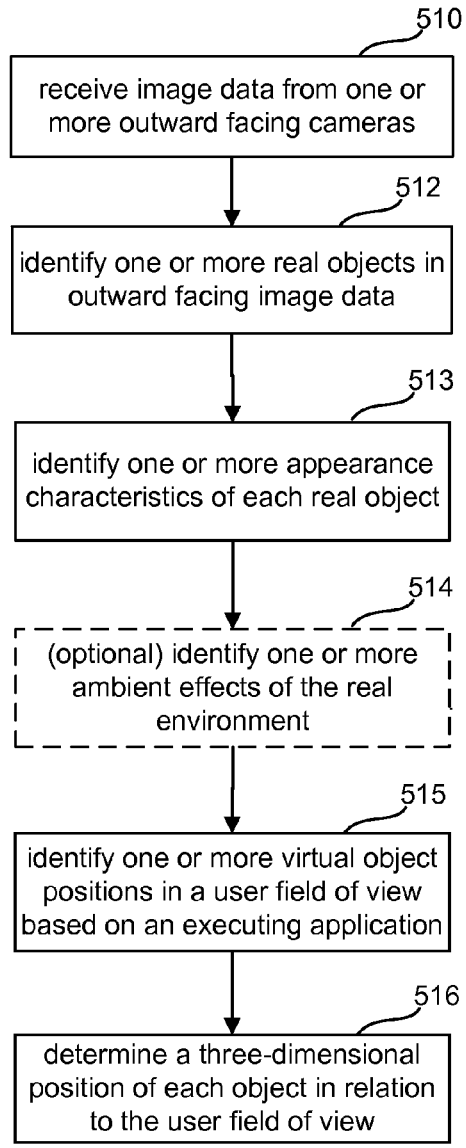
FIG. 6A is a flowchart of a method embodiment for determining a three-dimensional user field of view.

FIG. 6A is a flowchart of a method embodiment for determining a three-dimensional user field of view. In step 510, one or more processors of the control circuitry 136, the processing unit 4,5, the hub computing system 12 or a combination of these receive image data from one or more front facing cameras, and in step 512 identify one or more real objects in front facing image data. In some embodiments, front facing image data is three-dimensional image data. Data from the orientation sensor 132, e.g. the three axis accelerometer 132C and the three axis magnetometer 132A, can also be used with the front facing camera 113 image data for mapping what is around the user, the position of the user's face and head in order to determine which objects, real or virtual, he or she is likely focusing on at the time. The facial and pattern recognition software 476 may identify objects of people and things by comparison with reference object data sets 474 and actual images stored in image data 470.

In step 513, the one or more processors executing the facial and pattern recognition software 476 also identify one or more appearance characteristics of each real object such as type of object, size, surfaces, geometric orientation, shape, color, etc. Optionally, the recognition software 476 identifies one or more ambient effects of the real environment. Based on an executing application, the one or more processors in step 514 identify virtual object positions in a user field of view based on executing applications. In step 516, a three-dimensional position is determined for each object in the user field of view. In other words, where each object is located with respect to the display device 2, for example with respect to the optical axis 142 of each display optical system 14.

Figure 6B:
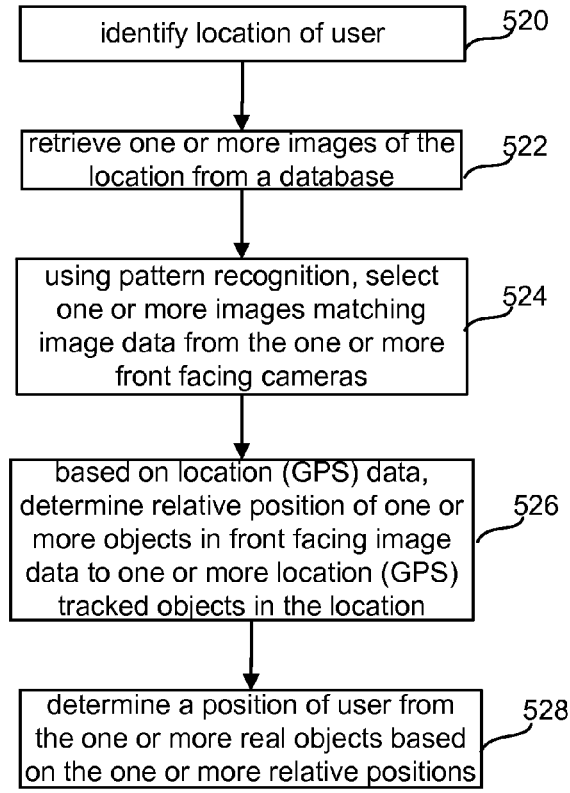
FIG. 6B is a flowchart of a method embodiment for identifying one or more real objects in a user field of view.

FIG. 6B is a flowchart of a method embodiment for identifying one or more real objects in a user field of view. This embodiment may be used to implement step 512. In step 520, a location of user wearing the display device 2 is identified. For example, GPS data via a GPS unit 965 (see FIG. 16) in the mobile device 5 or GPS transceiver 144 on the display device 2 may identify the location of the user. Additionally, an IP address of a WiFi hotspot or cellular station to which the display device system 8 has a connection can identify a location. Cameras at known positions within a location may identify the user through facial recognition. Additionally, identifier tokens may be exchanged between display device systems 8 via infra-red, Bluetooth or WUSB. The range of the infra-red, WUSB or Bluetooth signal can act as predefined distance for determining proximity of another user.

In step 522, one or more processors, retrieve one or more images of the location from a database (e.g. 470), and uses facial and pattern recognition software 476 in step 524 to select one or more images matching image data from the one or more front facing cameras. In some embodiments, steps 522 and 524 may be performed remotely by a more powerful computer, e.g. hub 12, having access to image databases. Based on location data (e.g. GPS data), in step 526 the one or more processors determines a relative position of one or more objects in front facing image data to one or more GPS tracked objects 528 in the location, and determines in step 529 a position of a user from the one or more real objects based on the one or more relative positions.

Figure 6C:
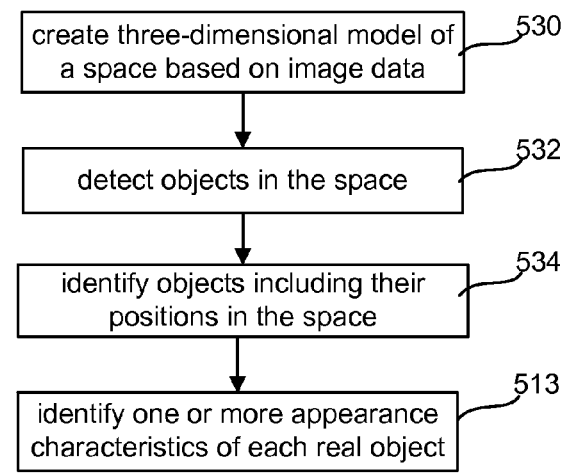
FIG. 6C is a flowchart of a method embodiment for generating a three-dimensional model of a user space.

In some embodiments such as in FIG. 1A, a user wearing a see-through, near-eye, mixed reality display may be in a location in which depth image processing software 450 of a computer system 12 provides a three-dimensional mapping of objects within a space, e.g. a store. FIG. 6C is a flowchart of a method embodiment for generating a three-dimensional model of a user space. In step 530, a computer system with access to depth cameras like hub system 12 with capture devices 20A and 20B creates a three-dimensional model of a space based on depth images. The depth images may be from multiple perspectives and may be combined based on a common coordinate space, e.g. the store space, and creates a volumetric or three dimensional description of the space. In step 532, objects are detected in the space. For example, edge detection may be performed on the depth images to distinguish objects, including people, from each other. In step 534, the computer system 12 executing the facial and pattern recognition software 476 identifies one or more detected objects including their positions in the space, and identifies in step 513 one or more appearance characteristics of each real object. The objects may be identified based on pattern recognition techniques (476) including facial recognition techniques (476) with reference images of things and people from image databases 470 and the reference object data sets 475.

The image processing software 451 can forward front facing image data and sensor data to the depth image processing software 450 and receives back from the computer system 12 three-dimensional positions and identifications including appearance characteristics from the facial and pattern recognition application 476 executing on computer system 12. In this way, the context adaptive UI application $456_1$ can determine which real objects are in the user field of view and which real objects are not currently in the user field of view, but are available in the 3D mode\d space for a physical connection with a virtual object.

Each of the method embodiments of FIGS. 6A through 6C are typically performed repeatedly as the user and objects within the user's environment move around.

For illustrative purposes, the method embodiments below are described in the context of the system embodiments described above. However, the method embodiments are not limited to operating in the system embodiments described above and may be implemented in other system embodiments. As discussed above, many actions may be performed by a version of software, for example a version of the context adaptive UI application, executing on the see-through, augmented reality display device system 8 or another version of the software executing on computer system 12 or a combination of the two. For ease of description, in the discussion below, reference to a software application performing a step with an unsubscripted number indicates that the step may be performed by the version on the display device system 8, or the version executing on the computer system 12 or both.

Figure 7A:
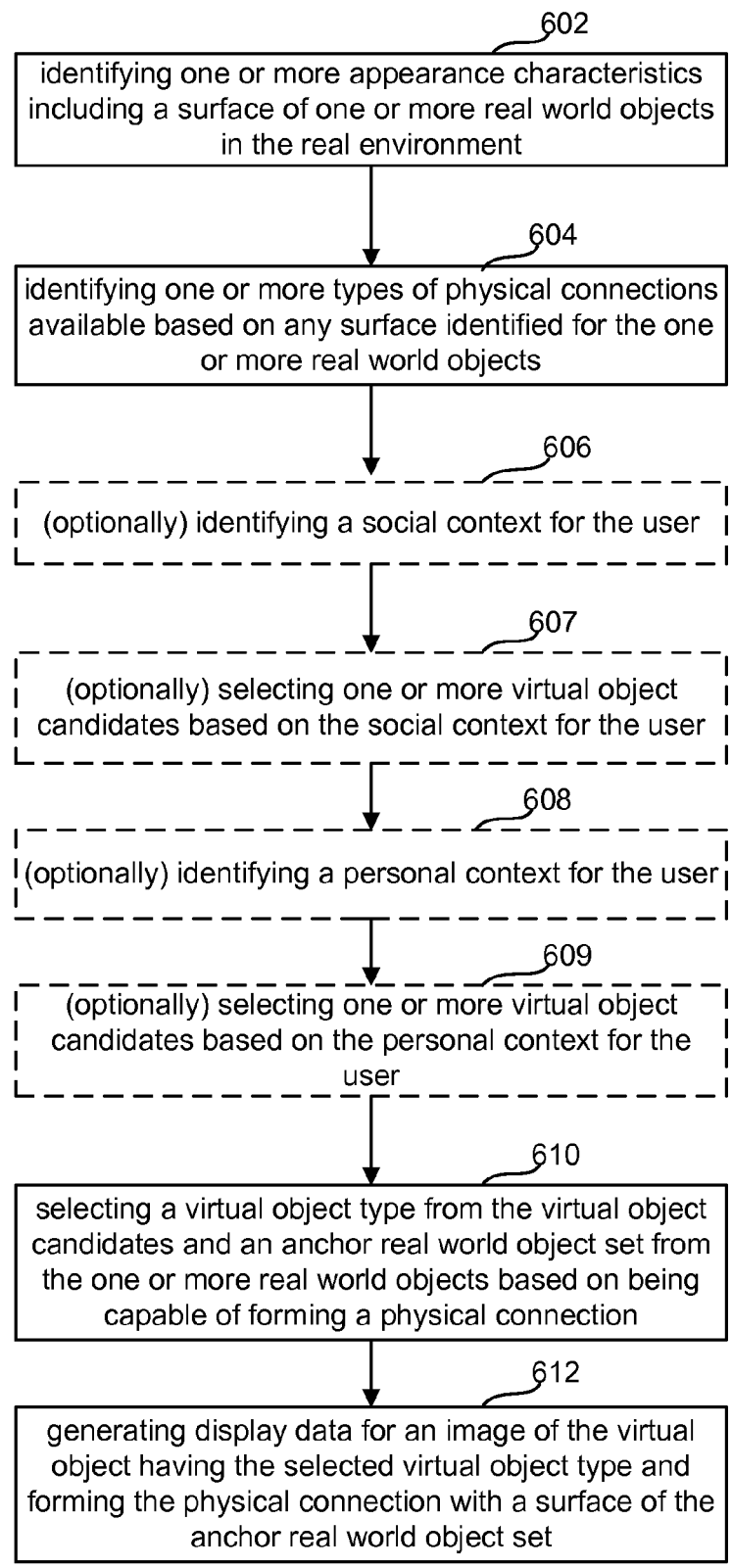
FIG. 7A is a flowchart of an embodiment of a method for providing a user interface with a virtual object appearing in context with a real environment of a user using a see-through, augmented reality display device system.

FIG. 7A is a flowchart of an embodiment of a method for providing a user interface with a virtual object appearing in context with a real environment of a user using a see-through, augmented reality display device system. In step 602, the software applications (e.g. 450, 451, 476) identify one or more appearance characteristics including a surface of one or more real world objects in the real environment. In step 604, the context adaptive UI application 456 identifies one or more types of physical connections available based on any surface identified for the one or more real objects. Optionally, in step 606, the information push service application 459 identifies a social context for the user. For example, a social context setting is set which the context adaptive UI application 456 reads or receives a notification of the setting. Some examples of settings are work, home, with friends, church, particular hobby, with family, sailing and the like. A user may also customize or define a social context setting. Also, one or more social contexts may apply.

Optionally, in step 607, the context adaptive UI 456 selects one or more virtual object candidates based on the social context for the user. For example, as explained in a more detailed example below, a set of virtual object candidates may be made smaller and smaller by applying more criteria to find a best fit solution for the circumstances of real objects available, content to be represented and the social context. Some types of virtual objects may be defaults for a type of physical connection available which may be used for any content or social context. For example, a picture frame when a wall is available may be a default virtual object type. The appearance characteristics available for a virtual object type may also be a basis for the selection of one or more virtual object candidates based on the social context.

Optionally, in step 608, the information push service application 459 identifies a personal context for the user. For example, a personal context setting is set which the context adaptive UI application 456 reads or receives a notification of the setting. Some examples of settings are state of being settings like sleepy, awake, sleeping, being late for an appointment, strong emotion, and may also include activities e.g. running, exercising. A user may also customize or define a personal context setting. Also, one or more personal contexts may apply.

Optionally, in step 609, the context adaptive UI 456 selects one or more virtual object candidates based on the personal context for the user. The appearance characteristics available for a virtual object type may also be a basis for the selection of one or more virtual object candidates based on the personal context.

For example, if a state of being setting in the personal context indicates strong emotion while the person is also in a social context of work, an email notification by image data of animation of fire on the desk followed by burnt lettering of the email may be replaced with a virtual envelope on the desk in a color identified with producing a calming effect.

Other examples of personal context data that may be factors in selecting a virtual object are user profile preferences including likes and dislikes, favorites like color and foods and things to do. As noted in the example above, both the social and personal context, e.g. being sleepy at work, may effect the selection of a virtual object or at least the appearance characteristics selected for a virtual object.

In step 610, the context adaptive UI application 456 selects a virtual object type and an anchor real world object set from the one or more real world objects based on the virtual object type and the one or more real objects of the anchor set both being capable of forming a physical connection with each other, and in step 612, generates display data for an image of the virtual object having the selected virtual object type and forming the physical connection with a surface of the anchor real world object set (e.g. a surface of a single real object or a composite surface.

Figure 7B:
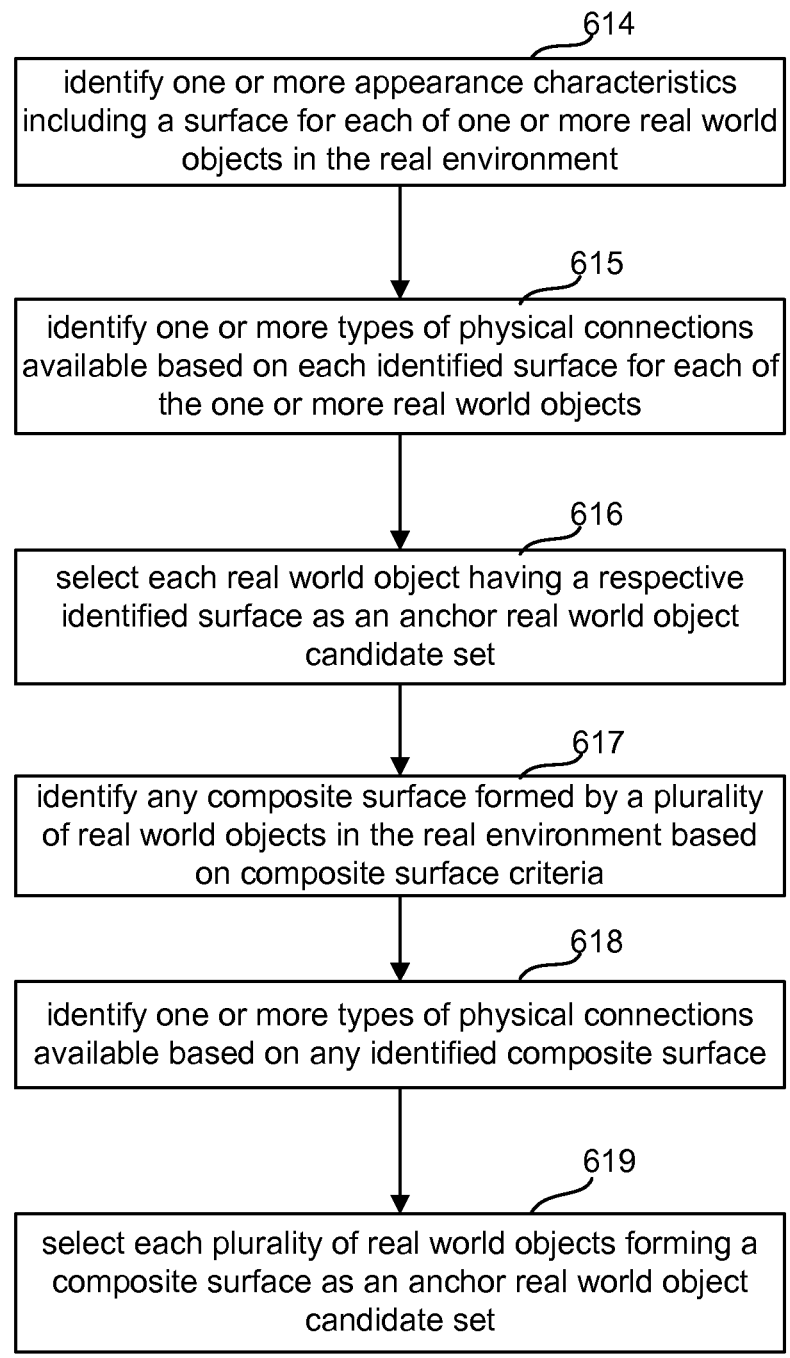
FIG. 7B illustrates an embodiment of an implementation process for performing steps 602 and 604 of FIG. 7A.

FIG. 7B illustrates an embodiment of an implementation process for performing steps 602 and 604 of FIG. 7A. In step 614, the software applications (e.g. 450, 451, 476) identify one or more appearance characteristics including a surface for each of one or more real world objects in the real environment. In step 615, the context adaptive UI application 456 identifies one or more types of physical connections available based on each identified surface for each of the one or more real world objects, and in step 616, selects each real world object having a respective identified surface as an anchor real world object candidate set.

In step 617, based on the surfaces identified for each real object, the context adaptive UI application 456 identifies any composite surface formed by a plurality of real world objects in the real environment based on composite surface criteria. An example of a factor of the composite surface criteria are whether the positions of a plurality of surfaces with respect to each other 558 are within a distance criteria. Another example of a criteria is whether the objects due to their types of material, size and shape share a common set of physical interaction characteristics for supporting a type of physical connection. For example, a tree of a foot diameter and a telephone pole across a street of 30 feet would be real objects with characteristics satisfying composite surface criteria. A bush and a transformer box on a street only a few feet apart likely would not satisfying criteria for a composite surface due to the different material types resulting in a bush exhibiting physical interaction characteristics of shape deformation not being within a criteria of shape deformation characteristics of a sturdy transformer box.

In some embodiments, for any identified composite surface, the context adaptive UI application 456 may assign a surface shape which is a closest fit for the composite surface. For example, even though there may be gaps of space between objects, the composite surface may have a surface shape of flat and a geometric orientation of horizontal. The context adaptive UI may use the gaps identified from the position data 558 between surfaces of individual real objects making up the composite surface as a basis for selecting a virtual object type.

Figure 7C:
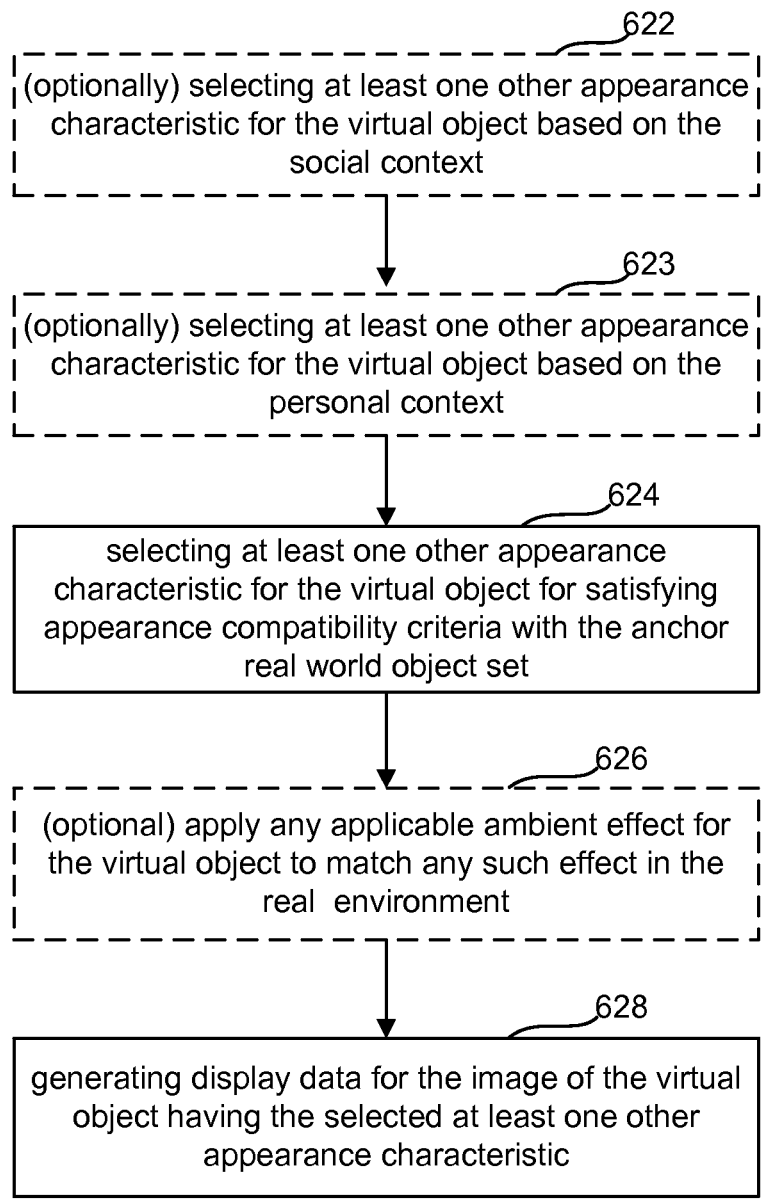
FIG. 7C is a flowchart of an embodiment of additional steps which may be performed for the method embodiment of FIG. 7A.

The context adaptive UI application 456 in step 618, identifies one or more types of physical connections available based on any identified composite surface, and in step 619, the application 456 selects each plurality of real world objects forming a composite surface as an anchor real world object candidate set. For example, in the example of FIG. 5D, each of the objects having a surface forming the composite surface is assigned the same anchor real world object set identifier 561, in addition to any set identifier the object has been assigned on an individual basis. Additionally, each surface of the plurality of objects forming the composite surface is assigned the same composite identifier 557, and each individual surface in the composite surface is assigned a composite component order identifier 551 for identifying its configuration position in the composite surface. FIG. 7C is a flowchart of an embodiment of additional steps which may be performed for the method embodiment of FIG. 8A. Optionally, in step 622, at least one other appearance characteristic for the virtual object is also selected based on the social context. Optionally, in step 623, at least one other appearance characteristic for the virtual object based on the personal context is selected. In step 624, at least one other appearance characteristic for the virtual object is selected for satisfying appearance compatibility criteria with the one or more objects of the anchor real world object set. Optionally, in step 626, the context adaptive UI application 456 applies any applicable ambient effect for the virtual object to match any such effect in the real environment. In step 628, display data is generated for the image of the virtual object having the selected at least one other appearance characteristic.

Figure 8B:
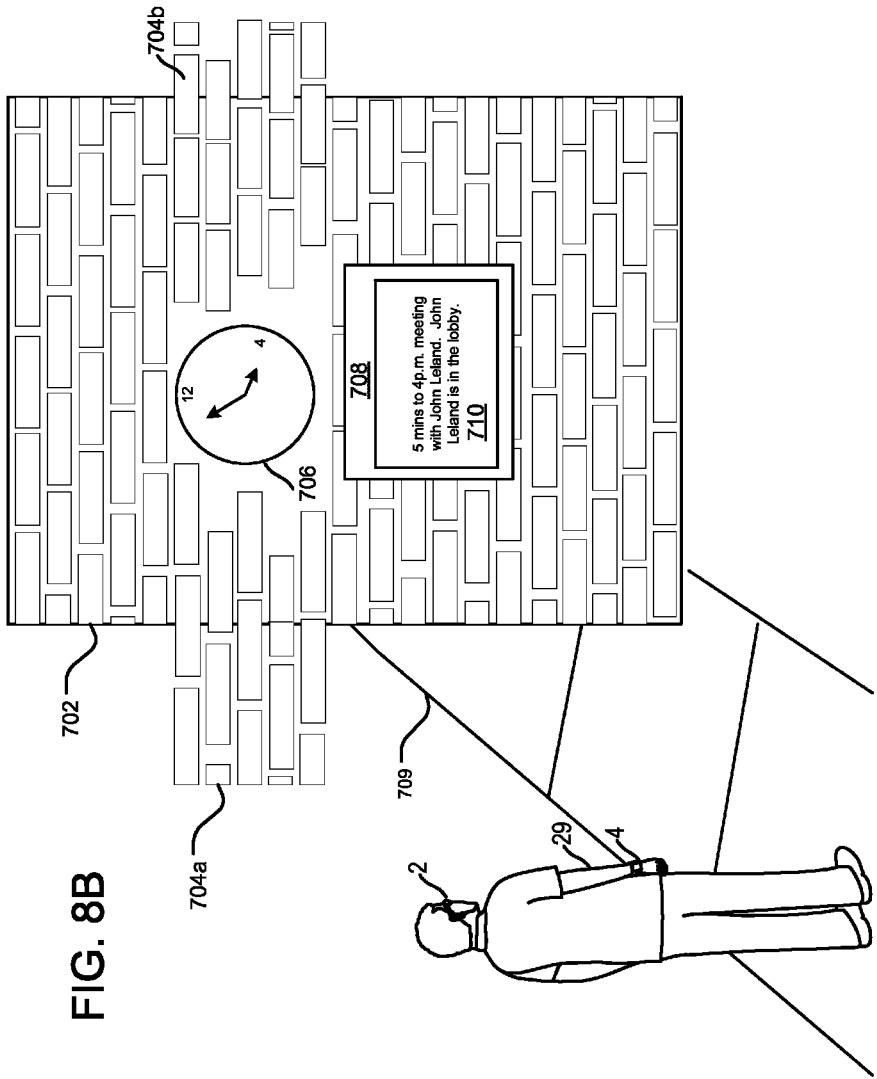

FIGS. 8A and 8B illustrate an example of one or more virtual objects representing content and appearing as being physically connected with a real object in a user field of view. In FIG. 8A, user 29 "Bob" is walking down a street on a sidewalk 709 wearing his see-through, augmented reality display device system 8 comprising his display device 2 and processing unit 4, in this example on his wrist. The facial and pattern recognition software 476 determines from pattern data, for example, reference image data or reference data derived from images of brick patterns a vertical object with a brick pattern and texture and determines the vertical real object is a brick wall. For the object type of wall with material type of brick, the graphical design rules identify an animation effect of separating bricks is available in addition to physical connection types of attachment, hanging, vertical support (e.g. leaning) and integration. The animation effect of separating bricks is like the opening of a secret passageway seen in movies and perhaps in a haunted house or two. So the animation effect is commonly associated with brick patterns, and is compatible with a brick wall. Due to the level of compatibility, this animation effect was associated with the brick wall. Virtual brick sections 704a and 704b move over the brick wall 702 so that it appears to open.

In this example, the opacity filter 114 blocks out the bricks in a real environment as well as the real world portion behind each virtual section 704 as it moves while the context adaptive UI application 456 causes the image generation unit 120 to overlay the virtual brick sections 704a and 704b and move them.

The content to be displayed to the user is text and the subject matter is a reminder of a meeting in 5 minutes from a calendar application. As calendar applications and meeting reminders deal with schedules and hence time, a virtual clock object 706 is selected from the reference object data sets 474. Relationships between virtual objects and subject matter may be predetermined and described in the graphical design rules so the context adaptive UI application 456 can follow a pointer or index to a virtual object type associated with subject matter content. The clock 706 shows the current time and is attached to a non-brick vertical structure behind the bricks. Additionally, a picture frame 708 displays a message 710 in text: "5 mins to 4 p.m. meeting with John Leland. John Leland is in the lobby."

The message 710 may actually be a combination of two messages, one a reminder message from Bob's calendar application, "5 mins to 4 p.m. meeting with John Leland" and the other derived from a text message from a mobile device 461$_N$ of the receptionist "John Leland is in the lobby" or formulated by the push service application 459 to which John Leland also has an account and has allowed his location information to be published to Bob 29.

Figures 9A, 9B, 9C:
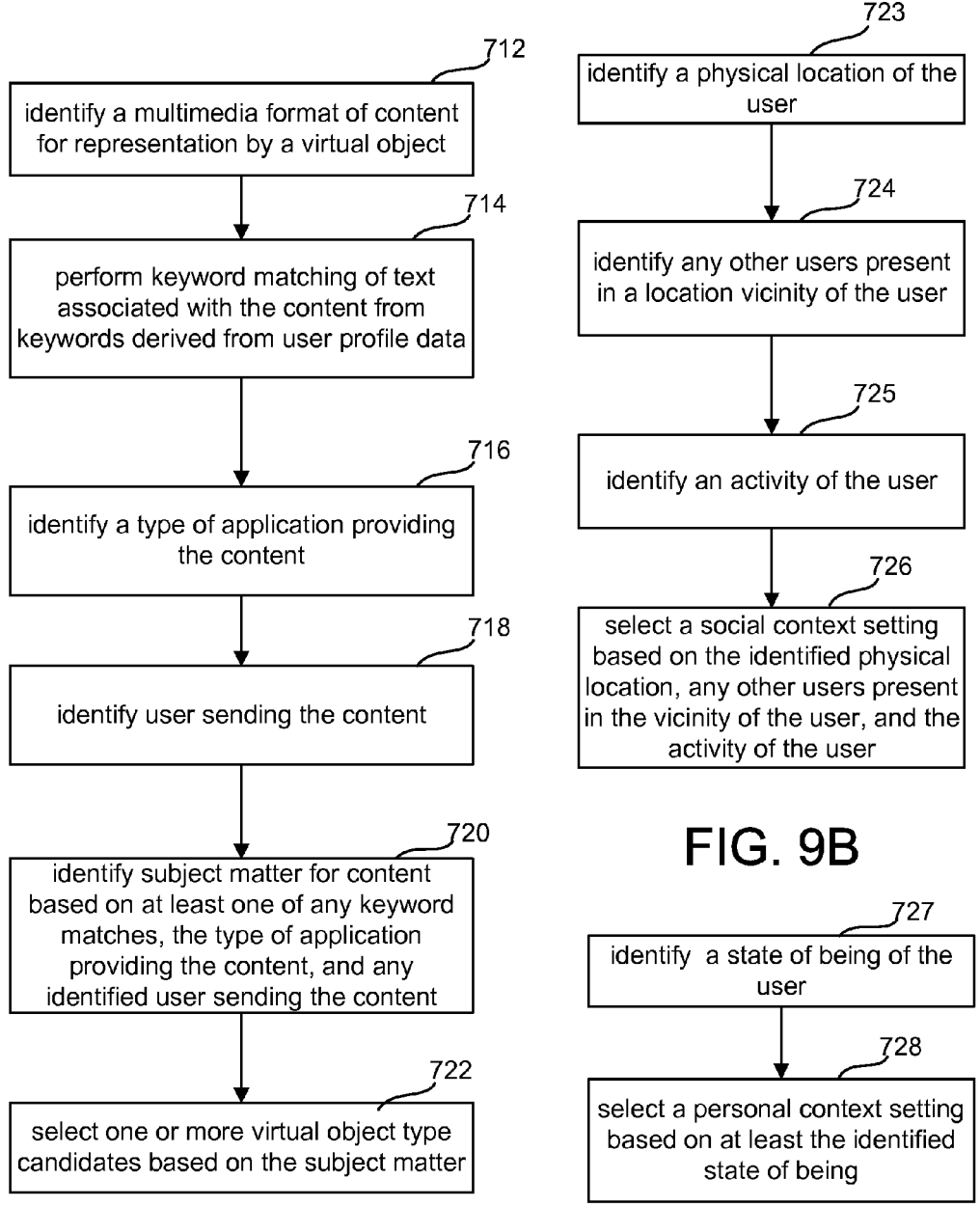
FIG. 9A is a flowchart of an embodiment of a method for selecting a candidate set of one or more virtual objects based on content to be represented by the virtual object.
FIG. 9B is a flowchart of an embodiment of a method for identifying a social context of the user based on user profile data.
FIG. 9C is a flowchart of an embodiment of a method for identifying a personal context of the user.

FIG. 9A is a flowchart of an embodiment of a method for selecting a candidate set of one or more virtual objects based on content to be represented by the virtual object. In step 712, the context adaptive UI application 456 identifies a multimedia format of content for representation by a virtual object. For example, the content may be text, audio, video or image data. In some embodiments, the information push service application 459 performs in step 714 keyword matching of text associated with the content from keywords derived from user profile data for identifying subject matter of the content. For example, the text may be metadata associated with audio, image or video data or the text itself in a text message.

Additionally, the information push service application 459 may also in step 716, identify a type of application providing the content, Some examples of types of application are a calendar, e-mail, media sales site (e.g. Amazon®, ITunes®), game application, game service website, social networking site, etc. Of course, in addition to type, the push service application 459 may identify the specific application e.g. Outlook®, Facebook®, Twitter®, Xbox Live®, etc. The user sending the content may also be identified in step 718. The push service application 459 in step 720 identifies a subject matter for the content based on at least one of any keyword matches, the type of application providing the content, and any identified user sending the content. Based on the subject matter for the content, the context adaptive UI application 456 in step 722 selects one or more virtual object types.

FIG. 9B is a flowchart of an embodiment of a method for identifying a social context of the user based on user profile data. In step 723, a physical location of the user is identified. For example, the location image tracking application 453 may provide this information to the context adaptive UI application 456 based on image matching with images of the location accessed by GPS, for example, or other location index data like a network address of a network access point at a fixed location, a cell tower identifier, or an identifier of a Bluetooth or infra-red transceiver at a fixed location.

In other examples, a processor of the display device system 8 uploads sensor data from the GPS 144 and other sensors like orientation sensor 132 into device data 464 which applications like the image processing application 151, the information push service application 459, and the context adaptive UI application 456 can access.

The information push service application 459 in step 724 identifies any other users present in a location vicinity of the user. For example, the client copy of the push application 459$_1$ may receive data over a communication network 50 from the server based push application 459 monitoring many users which data identifies other users in a predetermined location vicinity of the user. These other users would likely have a trust relationship with the user or a public access setting which allows the push application 459 to notify others of their presence. Furthermore, the local push application copy 459$_1$ may identify other user display device systems 8 which share identity tokens with other display device systems 8 in a vicinity. An example of a vicinity is a predetermined distance.

In step 725, the information push service application 459 identifies an activity of the user. The push service application 459 may have tracked the user to a GPS location for a building during the weekdays during regular business hours, and has determined based on logic embodied in the software that this is the user's place of work. Additionally, an IP address or other network address of an access point at this location through which the display device system 8 communicates over a communication network 50 may identify the employer as well as the controller of the network access point, a company network and computer equipment. Furthermore, image data, particularly that taken over time, also allows for image recognition of a particular location. Based on such location information, the push service application 459 identifies when the user is at work and also when the user is connected to the work network. Besides a location of work, an activity of "work" may be identified.

Additionally, the push service application 459 monitors which applications the user is executing with the display device system 8. In addition, the subject matter of content received and generated via these applications may be determined (e.g. as discussed in FIG. 9A), for determining a more specific level of activity of the user as permitted by user settings for the push application. For example, a user may be playing a game via the display device system 8. Image data, particularly in combination with location data, may also be processed for identifying objects with which a user is interacting. For example, gardening tools and flowers identified from image data from the outward facing cameras 113 with GPS data indicating the user is at home are bases for identifying gardening as the activity of the user.

In step 726, the information push service application 459 selects a social context setting based on the identified physical location, any other users present in the vicinity of the user, and the activity of the user. Some examples of settings as mentioned above are work, home, with friends, church, particular hobby, with family, sailing and the like. Also as mentioned above, more than one setting may apply like sailing, and with friends, which may be further refined to sailing with work friends.

FIG. 9C is a flowchart of an embodiment of a method for identifying a personal context of the user. In step, 727 the push service application 459 identifies a state of being of the user and in step 728, selects a personal context setting based on at least the identified state of being. More than one state of being data values may be assigned to a user. For example, inertial sensor data from sensors 132 and image data may indicate the user is walking rapidly in her work location in a direction previously identified as a route to a known conference room. The push service application 459 may determine from the user's schedule that she is late for a meeting, so one of her states of being is "late". Additionally, eye data may indicate to the push service 459 that she is sleepy or tired. In response to these states of being and the walking rapidly activity, any virtual object representing content related to the meeting is only displayed on her display device 2, and positioned in her user field of view to the sides so as not to obstruct her view as she rushes to the meeting. Additionally, colors associated with a calming effect and which are compatible with the colors of walls she rushes past to her meeting may also be used.

Figure 10:
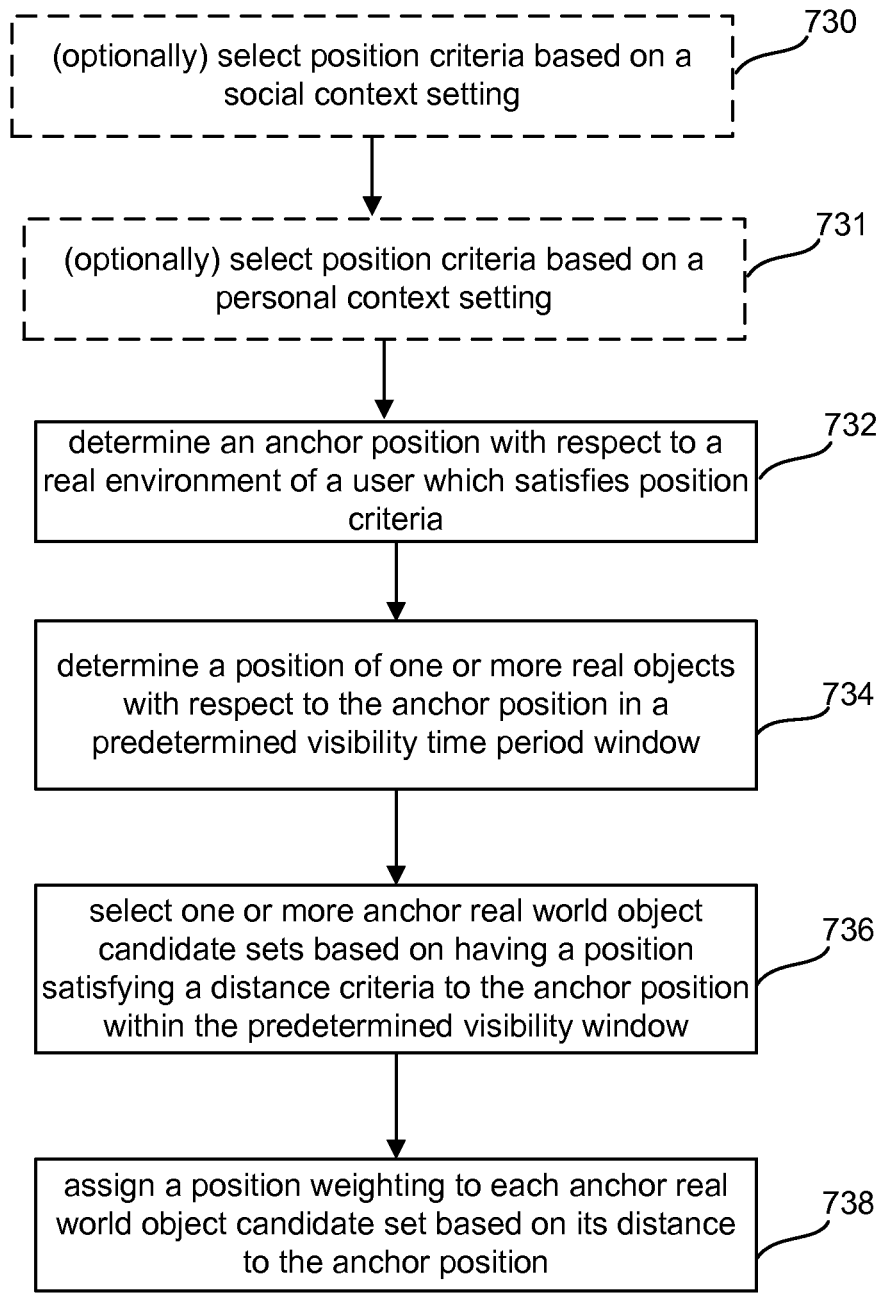
FIG. 10 is a flowchart of an embodiment of a method for selecting an anchor real world object set based on a position of the one or more real objects with respect to a user field of view of a see-through, augmented reality display device system.

FIG. 10 is a flowchart of an embodiment of a method for selecting an anchor real world object set based on a position of one or more real world objects with respect to a user field of view of a see-through, augmented reality display device system. Generally, an object in the center of a user field of view gets the user's attention. There may not always be a suitable real world object in the center of the user field of view with which to form a physical connection. Additionally, a user may not want content blocking their main area of focus in front of them. The center of the field of view may be a default position criteria but other settings may alter the criteria.

Optionally, in step 730, the context adaptive UI application 456 selects position criteria based on a social context setting. For example, the information push service application 459 may have stored a current social context setting at a memory location accessible by the context adaptive UI application 456. In an example of a social context of home with an activity of the user indicated as playing an online game with other users, the position criteria with respect to a real environment of the user, in this case his or her living room, is that messages are to be displayed on a coffee table in the room when the user field of view is centered on the coffee table. In other words, the user does not wish to be disturbed during the game by messages. However, the user can signal to check messages by looking directly at the coffee table. In one example, the messages may be represented as envelopes with senders on return addresses. For the home social setting, there is likely a three dimensional model which may be stored and updated as there is likely image data captured of the location over an extensive period of time. An anchor real world object set not in a current user field of view can be designated due to the monitoring history of the location.

Similarly, optionally, in step 731, the context adaptive UI application 456 may selects position criteria based on a personal context setting. For example, when personal context data is set to indicate a state of strong emotion, the center of the display optical systems 14 may not be an available position according to the position criteria.

In step 732, an anchor position with respect to a real environment of the user which satisfies position criteria is determined. In step 734, the context adaptive UI determines a position of one or more real objects with respect to the anchor position in a predetermined visibility time period window, and in step 736 selects one or more anchor real world object candidate sets based on having a position satisfying a distance criteria to the anchor position within the predetermined visibility window. In step 738, a position weighting is assigned to each anchor real world object candidate set based on its distance to the anchor position. As mentioned above, due to movement of the user or at least the user's head, movement of a real object or a combination of the two, a trajectory of the user or the real object is predicted to be in the user field of view within a time period, in this example referred to as a predetermined visibility time period window.

For example, in FIGS. 8A and 8B, the default position criteria for the anchor position may have been selected to be the center of the user field of view. User Bob 29 is walking with his head looking straightahead. Besides brick wall 702, the position of a portion of sidewalk 709 is also determined with respect to the anchor position of the center of the user field of view in the predetermined visibility time period window. Both the sidewalk 709 and the brick wall 702 are selected anchor real world object candidates as they are both within or will fall within a distance criteria to the center of a user field of view within the visibility time period window. A position weighting is assigned to each of the sidewalk portion 709 and the brick wall 702 based on its distance to the anchor position. In one embodiment, the brick wall may have received a higher weighting due to its position becoming closer and closer to the center of Bob's current user field of view as he walks toward it. The portion of the sidewalk 709 is passing closer and closer to the bottom of Bob's field of view as he walks and looks straightahead.

As discussed above, there may be more than one real object which may act as an anchor object to which a virtual object can form a physical connection, and there may be more than one virtual object suitable for representing content of a particular format or subject matter in a particular social or personal context.

Figure 11:
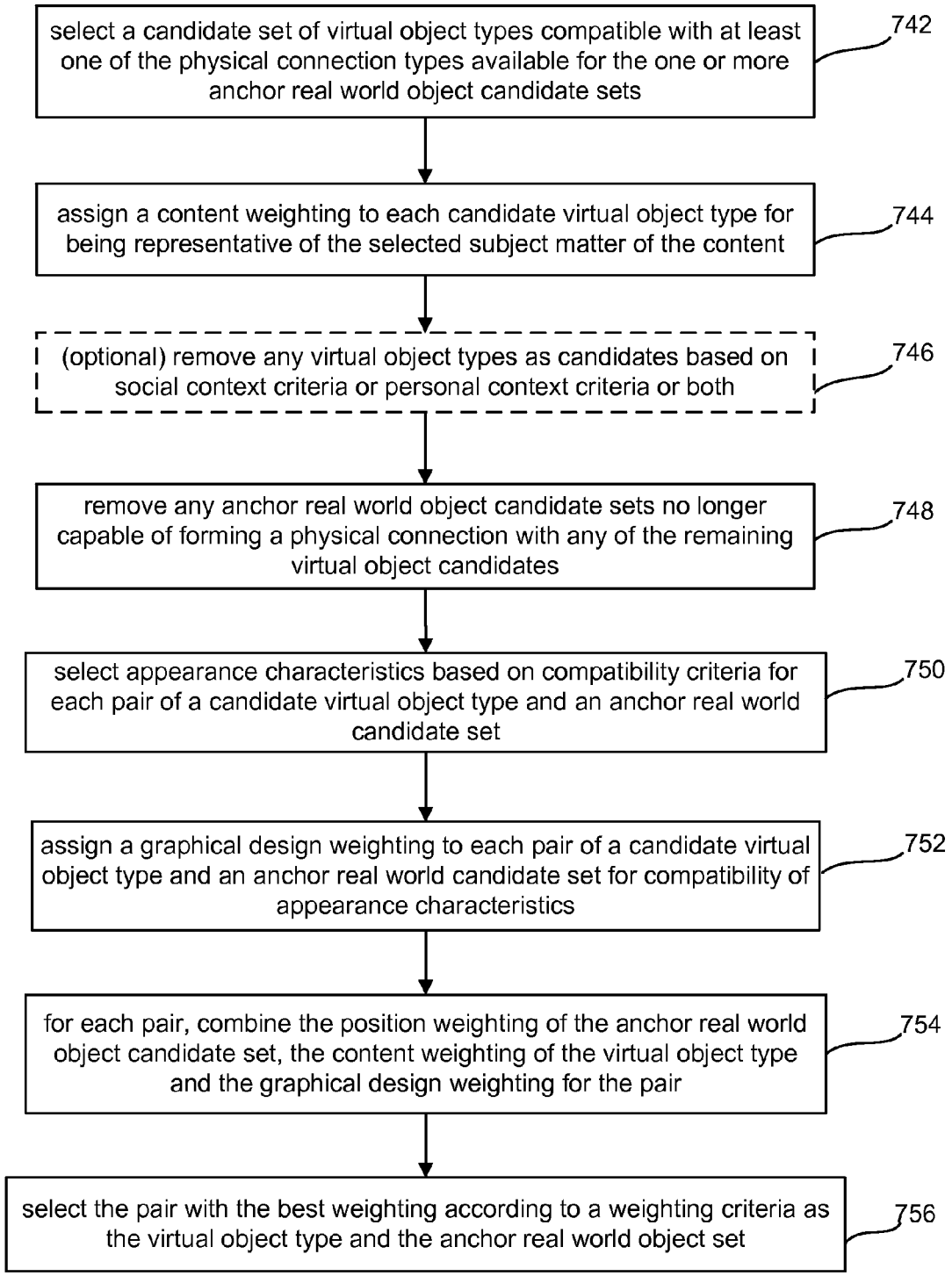
FIG. 11 is a flowchart of an embodiment of a method for selecting a virtual object type for a virtual object and selecting an anchor real world object set for forming a physical connection with the virtual object.

FIG. 11 is a flowchart of an embodiment of a method for selecting a virtual object type for a virtual object and selecting an anchor real world object set for forming a physical connection with the virtual object. In step 742, the context adaptive UI application 456 selects a candidate set of virtual object types compatible with at least one of the physical connection types available for the one or more anchor real world object candidate sets, and in step 744, assigns a content weighting to each candidate virtual object type for being representative of the selected subject matter of the content.

Optionally, in step 746, the context adaptive UI application 456 removes any virtual object types as candidates based on social context criteria or personal context criteria or both. For example, a person may not wish to see content related to alcohol and hence virtual objects representing alcohol when with certain family members under a drinking age legal limit. Furthermore, virtual objects such as avatars of friends may be blocked during study hall hour so as not to tempt the user to play games. In step 748, the context adaptive UI application 456 removes any anchor real world object candidates no longer capable of forming a physical connection with any of the remaining virtual object candidates.

In step 750, the context adaptive UI application 456 selects appearance characteristics based on compatibility criteria for each pair of a candidate virtual object type and an anchor real world candidate set, and in step 752, the context adaptive UI application 456 assigns a graphical design weighting to each pair of a candidate virtual object type and an anchor real world candidate set for compatibility of appearance characteristics. For example, a virtual object when paired with one anchor real world candidate may not have any compatible type of physical connection available even though color and type of material satisfy compatibility criteria. In some examples, there may be individual compatibility weightings for each appearance characteristic which are summed. Within the summing, compatibility weightings for some appearance characteristics may receive a value indicating a higher weighting on the resulting overall compatibility weighting.

In step 754, the context adaptive UI application 456 combines for each pair, the position weighting of the anchor real world object candidate set, the content weighting of the candidate virtual object type and the graphical design weighting for the pair, and in step 756, selects the pair with the best weighting according to a weighting criteria as the virtual object type and the anchor real world object set. As mentioned above, an anchor real world object set can be a set of a single real object have at least one surface for forming the physical connection with the virtual object type or a set of plural real objects forming a composite surface for forming the physical connection.

Figure 12A:
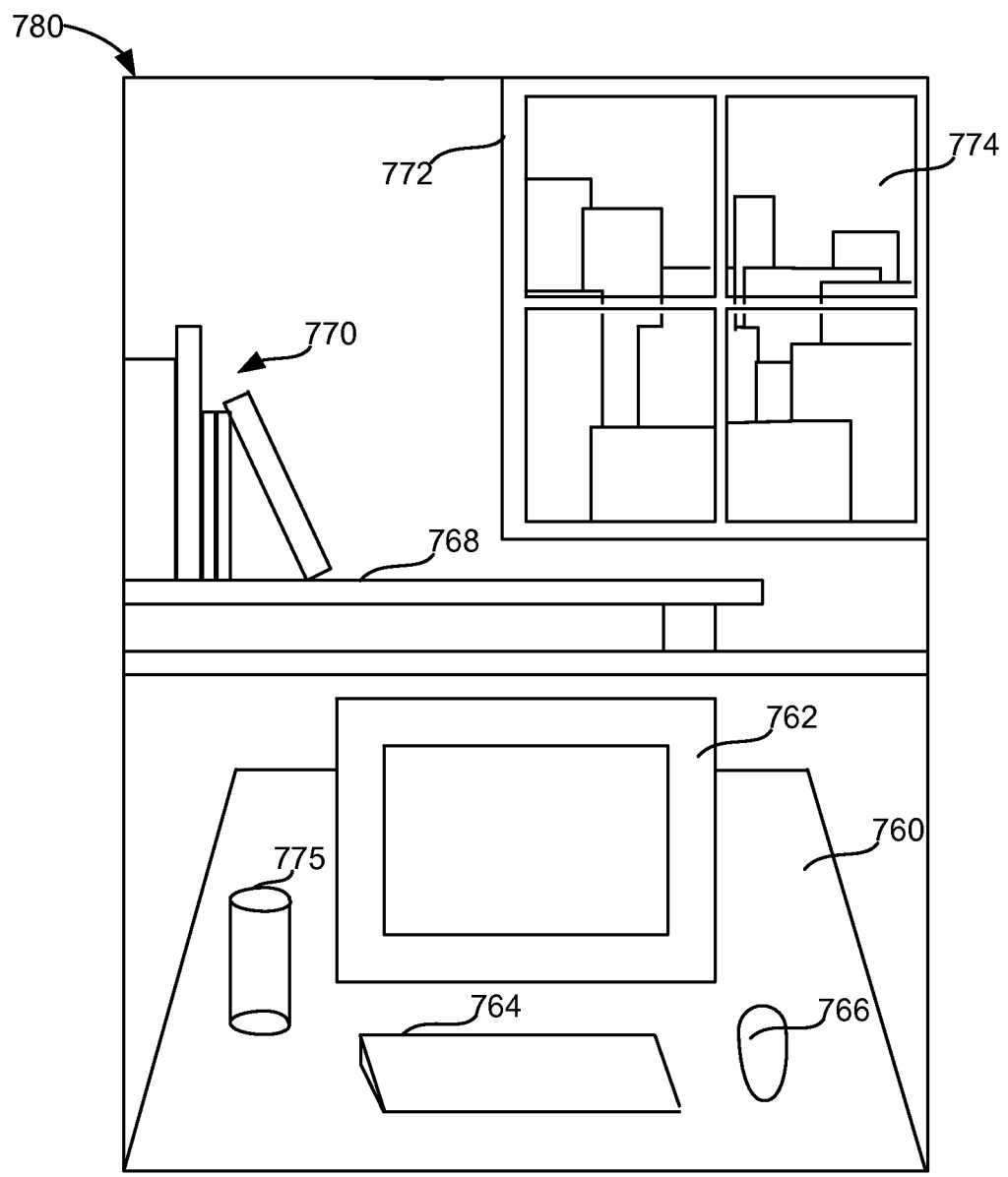
FIGS. 12A, 12B and 12C illustrate examples of one or more virtual objects selected and physically connected with a real object in a real environment about the user at a position based on a social context of the user.
Figure 12B:
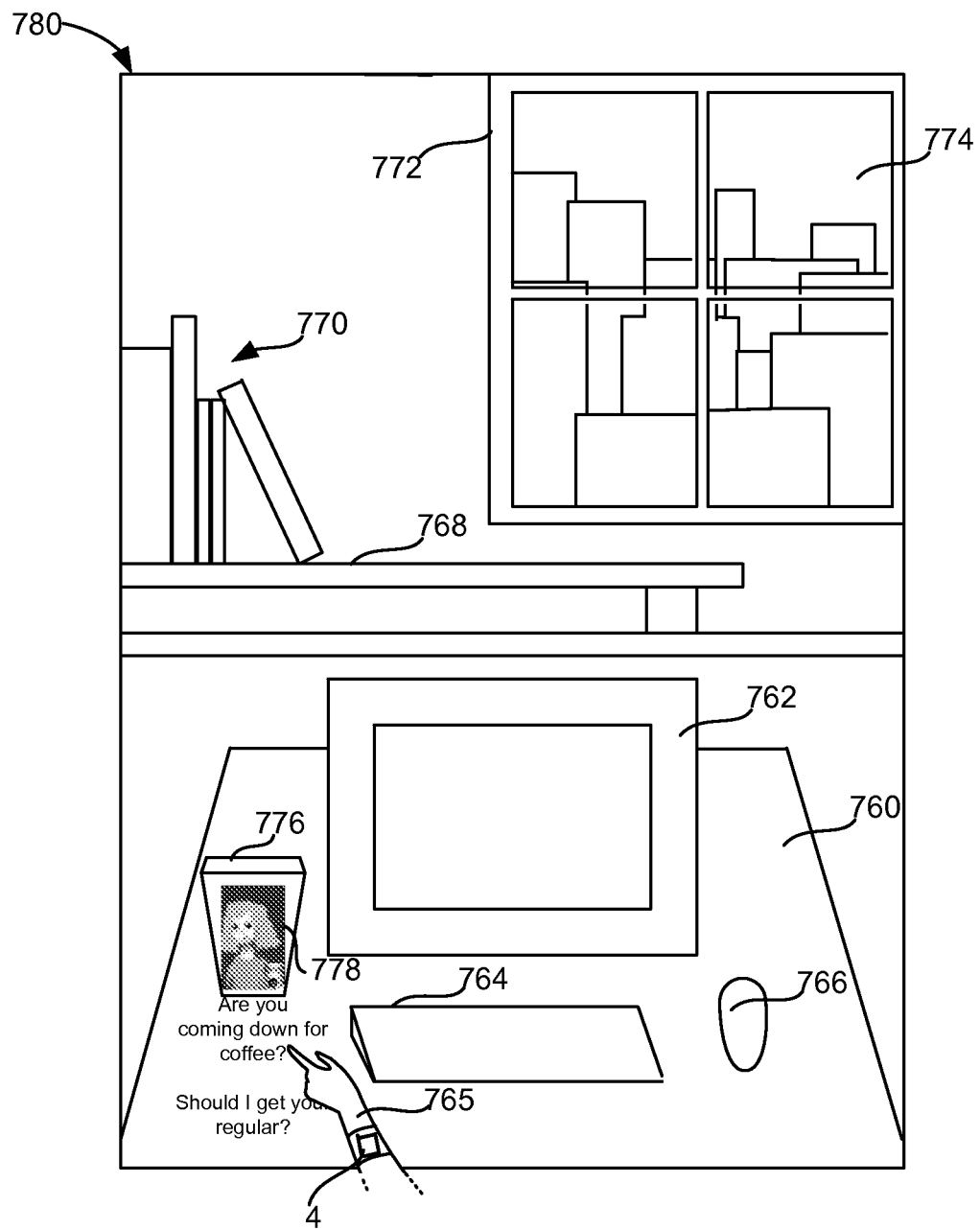
Figure 12C:
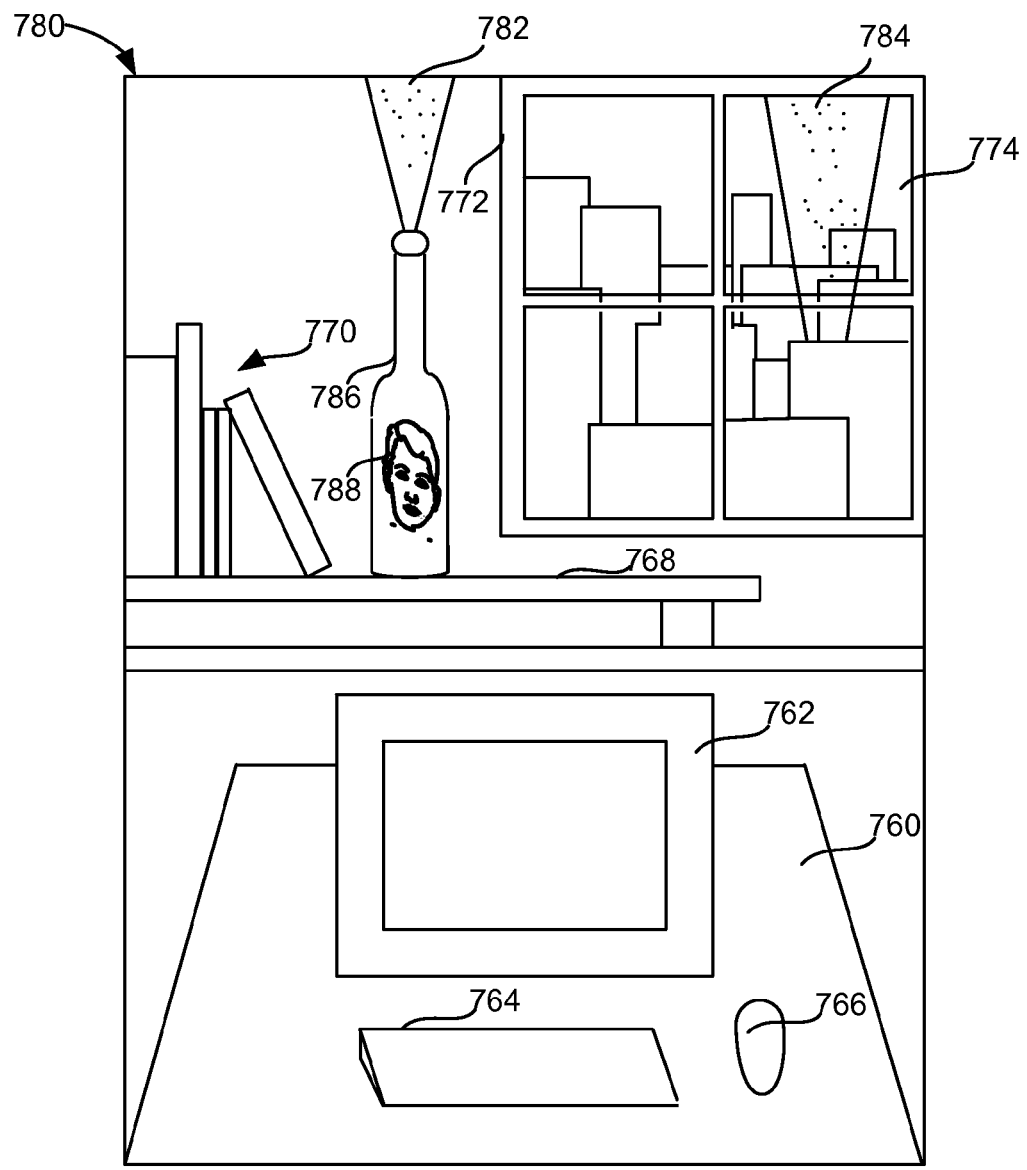

FIGS. 12A, 12B and 12C illustrate examples of one or more virtual objects selected and physically connected with a real object in a real environment about the user at a position based on a social context of the user. For ease of description, the user is referred to as Betty. FIG. 12A illustrates a user field of view 780 as Betty sits at her desk 760 at work in front of her computer monitor 762 with a keyboard 764 and a mouse 766 and an empty glass 775 on the left of the desk. There is a bookshelf 768 with books 770 and a window 772 with a view 774 of a skyline. The social context determined by the information push service application 459 is work. A "work area of focus" within her user field of view 780 while sitting at her desk covers primarily her computer monitor 762 and desk area 760 near her keyboard 764, mouse 766, her usual drinking cup or glass location 775 and monitor 762 based on data captured over time from the eye tracking camera assembly 134 when Betty is at this work location. For her work setting, Betty has indicated she wishes to limit messages or other content received in her work area of focus to work friends and colleagues. Additionally, she prefers her content to be represented by virtual objects that appear like office items, for example, as envelopes for email messages, papers, and office supplies and for the colors to be subdued although highlighting in more dramatic colors for messages from her manager are permitted.

In FIG. 12B, a virtual coffee cup 776 appears replacing her empty glass 775 on the desk area 760 with an image 778 of a work friend Sally holding a coffee cup. Replacement of a real object with a virtual object may also be used to provide a realistic visual relationship between a virtual and a real object in a user field of view of a see-through, augmented reality display device system 8. The opacity control unit 224 and opacity filter 114 may be used to replace the real object with a virtual object. In this example, the virtual coffee cup 776 is typical of the type of real coffee cup often seen on Betty's desk around this time of day, so the coffee cup has social or personal context relevance as well as a realistic visual relationship with the desk surface. As noted above, the glass 775 is at the usual location Betty places her drinking cup or glass throughout the day. This usual location can be stored in Betty's user profile data $460_N$ and is part of her personal context data in that Betty drinks using her left hand. The location 775 may also be considered part of the social context data of her physical location in other examples.

The virtual coffee cup 776 is the result of a video message from Sally. Sally recorded herself holding coffee and asking the user if she wanted coffee. Based on processing the audio to text, the push application detects "coffee" as a keyword. The push application 459 determines Betty knows where Sally is to get her coffee, e.g. the company cafeteria or a coffee shop nearby, for example, from tracking user GPS and image data over time as well as an identifier of the cell station the message was received from and a GPS tag from Sally's smartphone. Through tracking of user Betty over a period of time, e.g. a day, a week, a month in which image data of the user's workstation has been accumulated over time, the push application 459 has identified that Betty shares an office with another person.

Based on audio capture from the microphone 110 and image data from the outward facing cameras 113, the push application 459 identifies that Betty is not alone. Therefore, the method of communicating Sally's video message is to display the video 778 with a transcript 779. As indicated by Sally's hand 765, a pointing gesture is detected and Sally may provide yes or no commands or responses for the pointed to question with eye movements detected by the eye tracking camera assembly 134 or the electrical impulse sensors 128 or with another gesture in the field of view of her outward facing cameras 113. Responsive to the push application 459 updating social context data to indicate Betty is alone, the display device system 8 would have also played the audio accompanying Sally's video. In either case, Betty may also have responded with voice commands.

FIG. 12C illustrates another example of selecting an anchor real world object based on anchor position criteria in accordance with a social context setting. Later in the day, a text message from Bob whom Betty has started dating recently is received asking her if she wishes to join him to celebrate a job promotion after work for a drink. Based on the location suggested being identified as a sports bar and keyword analysis identifying subject matter relating to a celebration and drinking alcohol by the push service application 459, the context adaptive UI application 456 selects a virtual champagne bottle 786 with a stream 782 of bubbles bursting forth and a picture 788 of Bob on the bottle to identify the sender. Based on tracking Betty's destinations as she has permitted, the push service application 459 pushes directions from her current work location to the sports bar to the context adaptive UI application 456.

Based on Betty's settings to only have content from work friends and colleagues in her work area of focus and Bob, not being a work friend or colleague, the anchor position criteria is for a location which may be in Betty's field of view but not in her work area of focus. Real object bookshelf 768 provides a horizontal support type of physical connection with which a champagne bottle virtual object 786 can form a physical connection. Bob's picture 788 from her photos stored in a network accessible memory identified in her user profile data 460 forms the "label" for the bottle. Furthermore, the image processing application 451 alone or in conjunction with the depth image processing and skeletal tracking application 450 has identified real object 772 as a window and that the view seen through the window has been identified as a skyline 774 of buildings. With the aid of GPS data for the user's location and the location image tracking application 453, the image processing application 451 alone or in conjunction with application 450 has identified the buildings in the skyline. The push service application 459 notifies the context adaptive UI application 456 of a match between the location of the sports bar and one of the buildings in the skyline. In one example, another stream 784 of bubbles, which may be animated, is presented as bursting out of the top of the building just like out of the bottle.

When Betty decides to focus on the champagne bottle 786, Bob's image 788 may be replaced with his text message. Responsive to Betty responding with speech or other sounds indicating commands as processed by the sound recognition software 478, or gestures or eye movements indicating yes or no or other known commands, the label 788 may change to the directions from her current location.

Figure 13C:
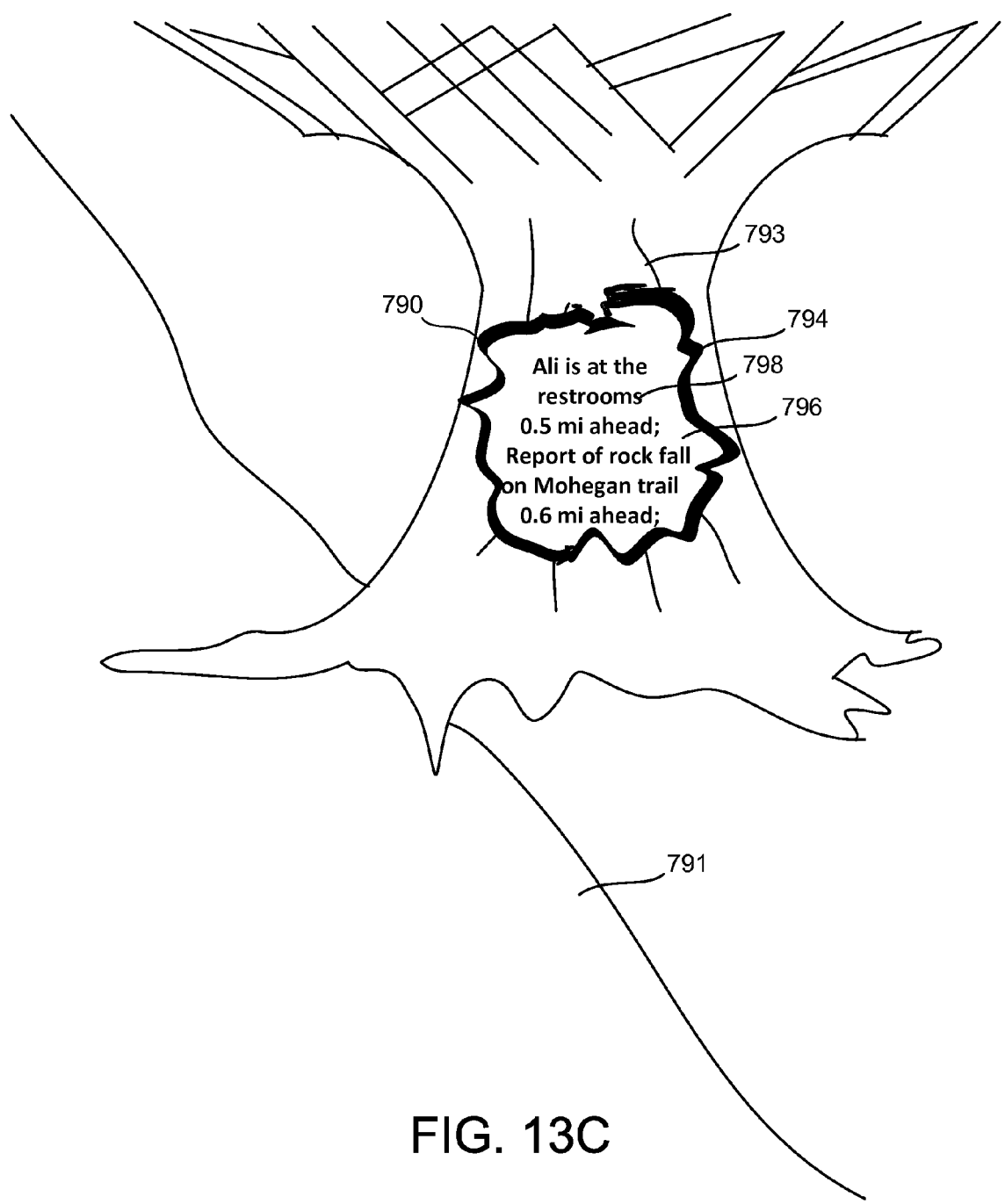

FIGS. 13A, 13B and 13C illustrate an example of an animation effect and a virtual object which is integrated with and has a compatible appearance with an anchor real object in real environment about the user. In this example, user Bob 29 is on a hiking trail. In his field of view as determined by the image data from his outward facing cameras 113 is the trail 791 and a large tree 790 with a sizable trunk. The texture of the tree trunk is rough and gnarly as indicated by the bark features. The see-through, augmented reality display device system 8 Bob is wearing, has received two messages. One is a location update of Ali, an electronically identified friend, e.g. a person identified in a friend's list of a social networking site, over a communication network 50 from the information push service application 459 that she is up ahead on this trail half a mile. Another is a digital broadcast message transmitted via a digital radio on a channel for the trail by a hiker ahead 0.6 miles on the trail 791. The push service application 459 monitors the digital channel for Bob 29 while he is on the trail, and communicates the message to the display device system 8 via a GPS link. The push service application 459 may identify the hiker message as relating to safety in meta data. The context adaptive UI 456 identifies the tree trunk as a real object near the center of Bob's user field of view.

For the wood type of material, fire as an animation effect is identified as a compatible animation effect in the graphic design rules 473. In some embodiments, logic of the context adaptive UI application 456 may indicate the use of animation effects for predetermined urgent matters. Some examples of urgent matters are imminent events and safety issues. Based on the safety indication in the meta data, the fire animation effect 792 is displayed. A portion of the tree trunk is blocked out by the opacity filter 114, and the fire animation 792 overlayed on the trunk. Data from the eye tracking camera 114 may indicate Bob's eyes are focused on the "burning" tree trunk. The context adaptive UI application 456 replaces the fire animation 792 with an overlay having an outline area appearing like burnt wood and an inner area looking like wood in an interior of a tree. The message data from the push service application 459 is written out on the wood portion in the same coloring as the burnt wood outline. In this example, the virtual object of the fire 792 and the virtual object of the exposed would section with charred letters are examples of connecting a virtual object to a real world object via integration.

In addition to how content appears based on social context factors, what content appears in a user field of view may also be based on the social context.

Figure 14:
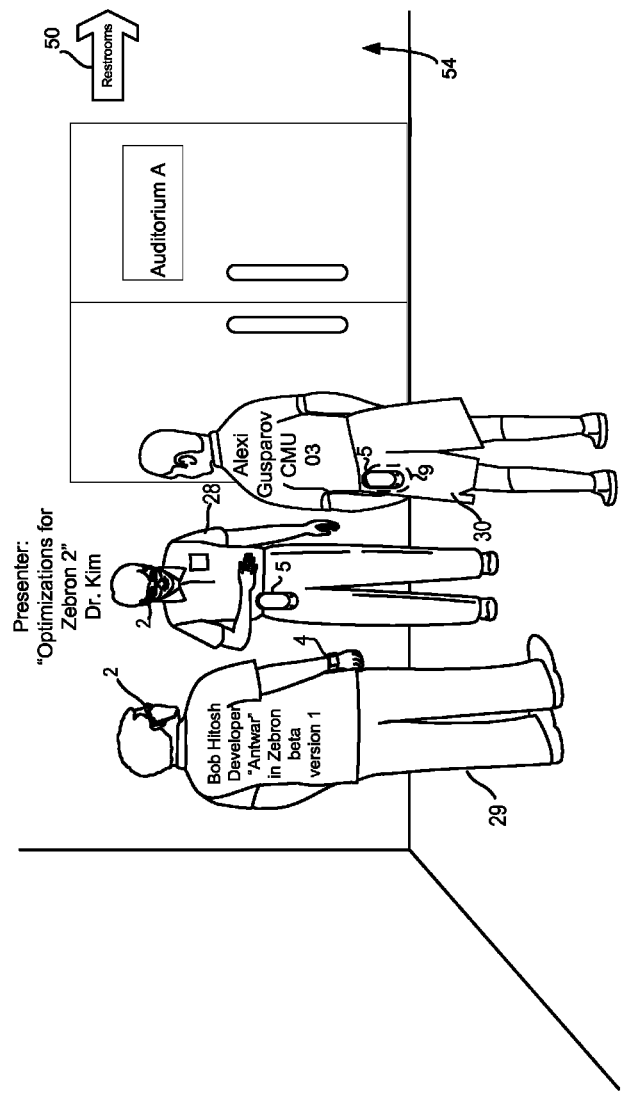
FIG. 14 illustrates examples of virtual objects with appearance characteristics and content selected based on a social context of the user as well as appearance compatibility with real objects in a user field of view.

FIG. 14 illustrates examples of virtual objects with appearance characteristics and content selected based on a social context of the user as well as appearance compatibility with real objects in a user field of view. In this example, a user, for example Betty, is attending the annual "Zebron" conference which many colleagues and people in her field of game development attend. The push service application 459 has determined Betty has never been to this conference center before and so provides data identifying directions for the location of the restrooms for the UI application 456 to display. The context adaptive UI application 456 selects an arrow as the virtual object. The graphical design rules may have a social context component with links types of objects to certain subject matter like directions in general, and restroom directions in particular for which arrows are typically painted on walls in the real world. A virtual arrow 50 stating "Restrooms" appears integrated as a painted arrow on the wall 54.

The push application 459 has identified the social context as work and a sub-setting of conference and has determined the subject matter of the conference is "Zebron" a popular virtual machine language used by game developers. Besides, the appearance of virtual objects, the context adaptive UI application 456 only displays content relevant to those attending the conference. Fortunately, other people at the conference have allowed the push service application 459 to publish items about them to others attending the conference and related to Zebron 2. For example, Bob Hitosh has allowed information from his resume and publications relating to Zebron to be made available for others with see-through, augmented reality display device systems 8. Alexi Gusparov has permitted the information push service 459 to release information from his resume generally that may have a relation to others at the conference. Public information on the conference's website has provided image data for Dr. Kim and that he will be presenting on the topic of "Optimizations for Zebron 2." For example, the push service application 459 has determined a probability that Betty has not met Dr. Kim or Alexi Gusparov before.

The context adaptive UI application 456 identifies Dr Kim 28 in image data and presents text on the wall 54 behind him as he considers a question from Bob of "Presenter: "Optimizations for Zebron 2" Dr. Kim. Identity tokens may also have been exchanged between the display device systems 8 of Dr, Kim, display device 2 and a mobile device 5 as a processing unit and Betty's system which uses a wrist based processing unit 4. Based on the position of Dr Kim's arm, the context adaptive UI application 456 may determine there is not enough space for the text on his shirt, so the wall 54 may receive a higher weighting for position as an anchor object.

The push service application 459 has determined that Alexi and Betty went to the same university, Carnegie Mellon University and notifies the context adaptive UI application 456 of this fact as a conversation accelerator. The push service application 459 has identified Alexi is in the room via GPS, and Betty's display device system 8 has exchanged identity tokens with Alexi's smartphone 5 even though Alexi is not wearing his display device 2 like Dr. Kim 28 and Bob 29. Based on the position of Alexi in the room, the context adaptive UI application 456 displays on his shirt, his name and "CMU 03" as it might appear on an actual jersey shirt.

Betty knows Bob 29 outside of work, but the push service application 459 identifies an accomplishment of Bob's for Zebron from his resume items he has permitted to be shared as the push service application 459 has no record of Betty viewing Bob's online resume. Bob may have been recognized by identity tokens and a visual cue from his device system 2, like a LED flashing, or image processing software 451 alone or in combination with the depth image processing software 451 recognized Bob, even from the back, from image data stored of Bob in either Betty or his own data files. The text is displayed on Bob's shirt: "Bob Hitosh Developer of "Antwar" in Zebron beta version 1."

Figure 15:
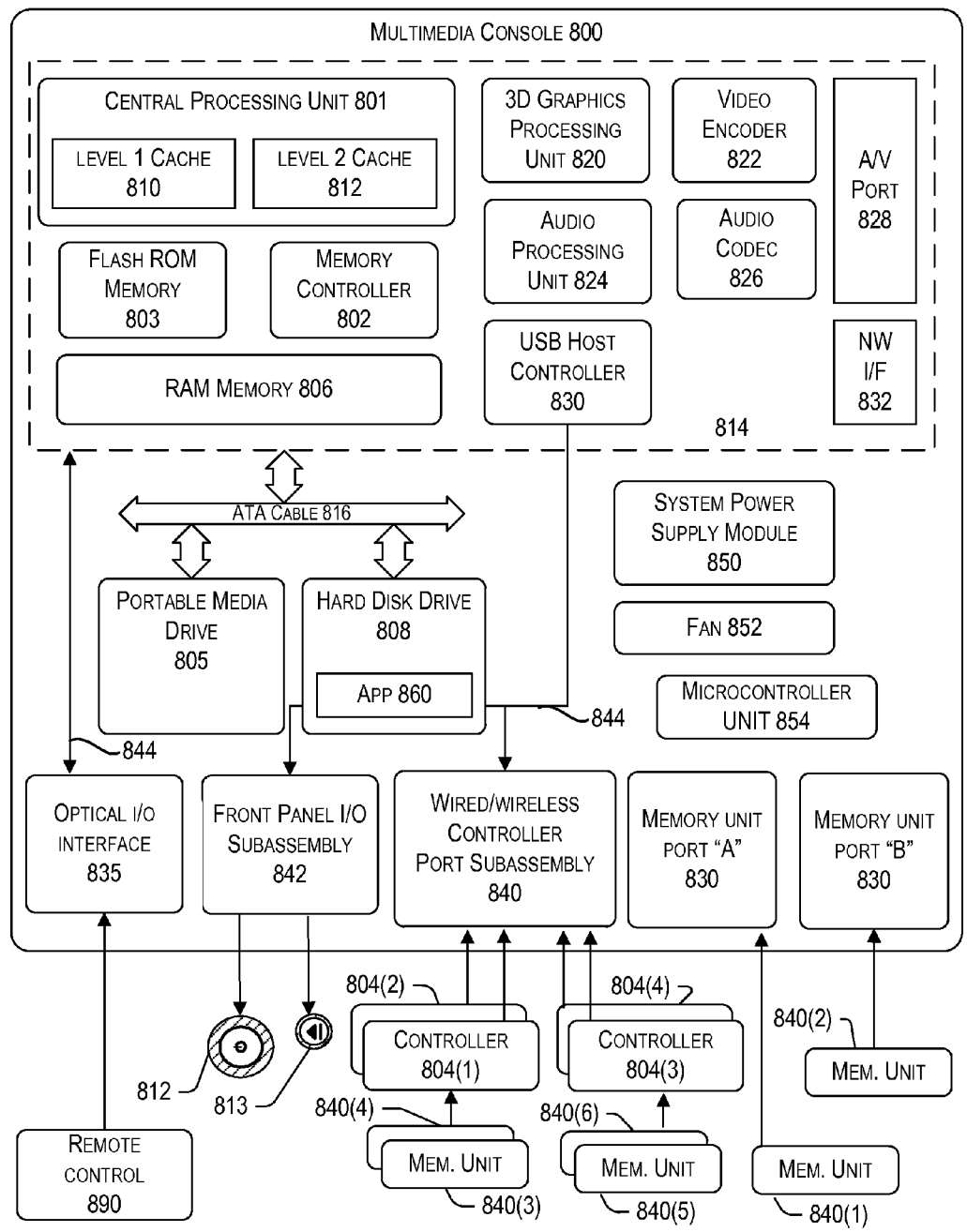
FIG. 15 is a block diagram of one embodiment of a computing system that can be used to implement a network accessible computing system hosting a context adaptive UI application.

FIG. 15 is a block diagram of one embodiment of a computing system that can be used to implement a network accessible computing system hosting a context adaptive UI application. For example, the embodiment of the computing system in FIG. 15 can be used to implement the hub computing system of FIGS. 1A and 1B. In this embodiment, the computing system is a multimedia console 800, such as a gaming console. As shown in FIG. 15, the multimedia console 800 has a central processing unit (CPU) 801, and a memory controller 802 that facilitates processor access to various types of memory, including a flash Read Only Memory (ROM) 803, a Random Access Memory (RAM) 806, a hard disk drive 808, and portable media drive 806. In one implementation, CPU 801 includes a level 1 cache 810 and a level 2 cache 812, to temporarily store data and hence reduce the number of memory access cycles made to the hard drive 808, thereby improving processing speed and throughput.

CPU 801, memory controller 802, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 801, memory controller 802, ROM 803, and RAM 806 are integrated onto a common module 814. In this implementation, ROM 803 is configured as a flash ROM that is connected to memory controller 802 via a PCI bus and a ROM bus (neither of which are shown). RAM 806 is configured as multiple Double Data Rate Synchronous Dynamic RAM (DDR SDRAM) modules that are independently controlled by memory controller 802 via separate buses (not shown). Hard disk drive 808 and portable media drive 805 are shown connected to the memory controller 802 via the PCI bus and an AT Attachment (ATA) bus 816. However, in other implementations, dedicated data bus structures of different types can also be applied in the alternative.

A graphics processing unit 820 and a video encoder 822 form a video processing pipeline for high speed and high resolution (e.g., High Definition) graphics processing. Data are carried from graphics processing unit (GPU) 820 to video encoder 822 via a digital video bus (not shown). Lightweight messages generated by the system applications (e.g., pop ups) are displayed by using a GPU 820 interrupt to schedule code to render popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

An audio processing unit 824 and an audio codec (coder/decoder) 826 form a corresponding audio processing pipeline for multi-channel audio processing of various digital audio formats. Audio data are carried between audio processing unit 824 and audio codec 826 via a communication link (not shown). The video and audio processing pipelines output data to an A/V (audio/video) port 828 for transmission to a television or other display. In the illustrated implementation, video and audio processing components 820-828 are mounted on module 214.

FIG. 15 shows module 814 including a USB host controller 830 and a network interface 832. USB host controller 830 is shown in communication with CPU 801 and memory controller 802 via a bus (e.g., PCI bus) and serves as host for peripheral controllers 804(1)-804(4). Network interface 832 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 15 console 800 includes a controller support subassembly 840 for supporting four controllers 804(1)-804(4). The controller support subassembly 840 includes any hardware and software components needed to support wired and wireless operation with an external control device, such as for example, a media and game controller. A front panel I/O subassembly 842 supports the multiple functionalities of power button 812, the eject button 813, as well as any LEDs (light emitting diodes) or other indicators exposed on the outer surface of console 802. Subassemblies 840 and 842 are in communication with module 814 via one or more cable assemblies 844. In other implementations, console 800 can include additional controller subassemblies. The illustrated implementation also shows an optical I/O interface 835 that is configured to send and receive signals that can be communicated to module 814.

MUs 840(1) and 840(2) are illustrated as being connectable to MU ports "A" 830(1) and "B" 830(2) respectively. Additional MUs (e.g., MUs 840(3)-840(6)) are illustrated as being connectable to controllers 804(1) and 804(3), i.e., two MUs for each controller. Controllers 804(2) and 804(4) can also be configured to receive MUs (not shown). Each MU 840 offers additional storage on which games, game parameters, and other data may be stored. In some implementations, the other data can include any of a digital game component, an executable gaming application, an instruction set for expanding a gaming application, and a media file. When inserted into console 800 or a controller, MU 840 can be accessed by memory controller 802. A system power supply module 850 provides power to the components of gaming system 800. A fan 852 cools the circuitry within console 800. A microcontroller unit 854 is also provided.

An application 860 comprising machine instructions is stored on hard disk drive 808. When console 800 is powered on, various portions of application 860 are loaded into RAM 806, and/or caches 810 and 812, for execution on CPU 801, wherein application 860 is one such example. Various applications can be stored on hard disk drive 808 for execution on CPU 801.

Gaming and media system 800 may be operated as a standalone system by simply connecting the system to monitor 16 (FIG. 1A), a television, a video projector, or other display device. In this standalone mode, gaming and media system 800 enables one or more players to play games, or enjoy digital media, e.g., by watching movies, or listening to music. However, with the integration of broadband connectivity made available through network interface 832, gaming and media system 800 may further be operated as a participant in a larger network gaming community.

Figure 16:
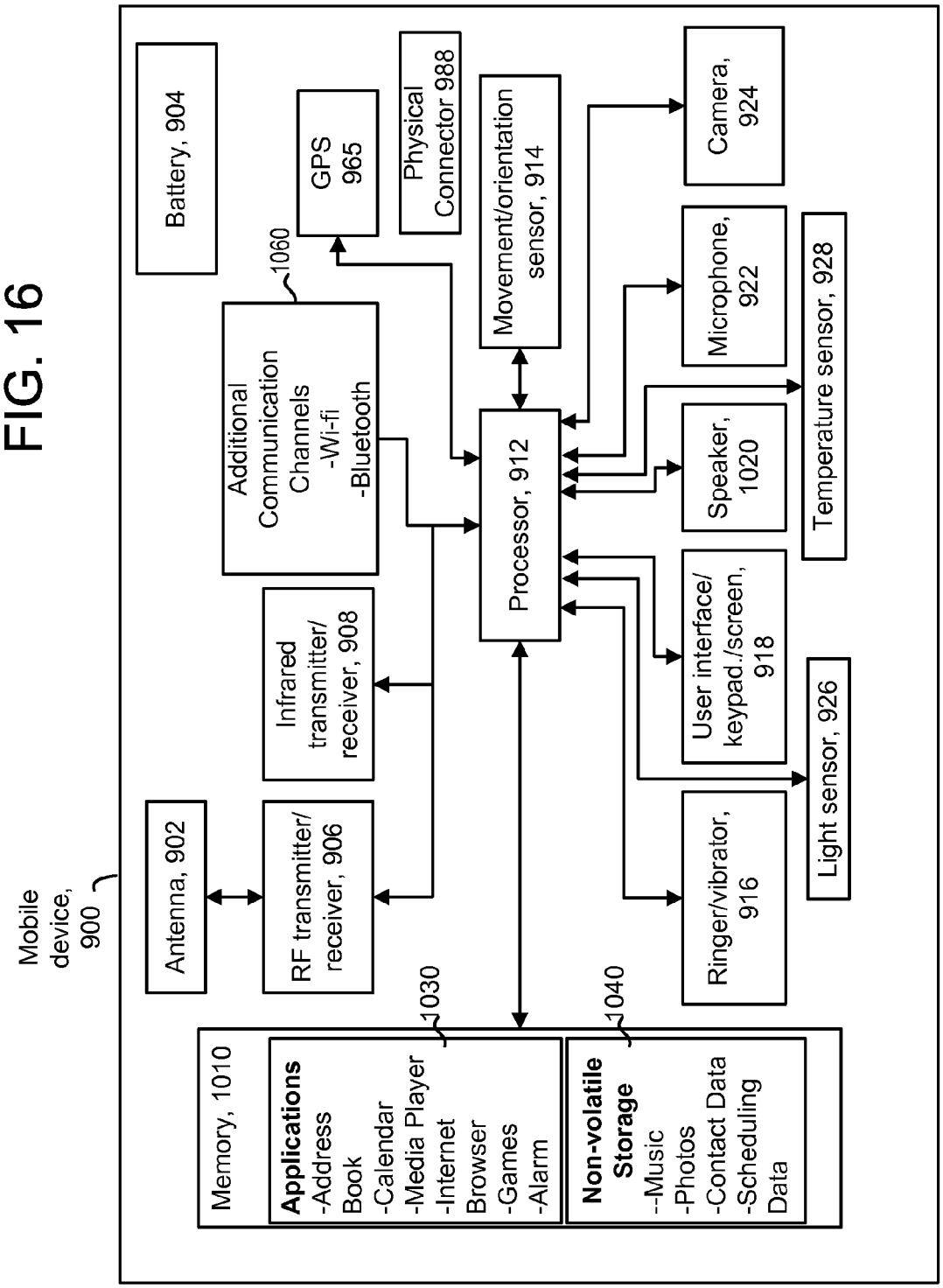
FIG. 16 is a block diagram of an exemplary mobile device which may operate in embodiments of the technology.

As discussed above, the processing unit 4 may be embodied in a mobile device 5. FIG. 16 is a block diagram of an exemplary mobile device 900 which may operate in embodiments of the technology. Exemplary electronic circuitry of a typical mobile phone is depicted. The phone 900 includes one or more microprocessors 912, and memory 910 (e.g., non-volatile memory such as ROM and volatile memory such as RAM) which stores processor-readable code which is executed by one or more processors of the control processor 912 to implement the functionality described herein.

Mobile device 900 may include, for example, processors 912, memory 1010 including applications and non-volatile storage. The processor 912 can implement communications, as well as any number of applications, including the interaction applications discussed herein. Memory 1010 can be any variety of memory storage media types, including non-volatile and volatile memory. A device operating system handles the different operations of the mobile device 900 and may contain user interfaces for operations, such as placing and receiving phone calls, text messaging, checking voicemail, and the like. The applications 930 can be any assortment of programs, such as a camera application for photos and/or videos, an address book, a calendar application, a media player, an internet browser, games, other multimedia applications, an alarm application, other third party applications like a context adaptive UI application and image processing software for processing image data to and from the display device 2 discussed herein, and the like. The non-volatile storage component 940 in memory 910 contains data such as web caches, music, photos, contact data, scheduling data, and other files.

The processor 912 also communicates with RF transmit/receive circuitry 906 which in turn is coupled to an antenna 902, with an infrared transmitted/receiver 908, with any additional communication channels 960 like Wi-Fi or Bluetooth, and with a movement/orientation sensor 914 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 912 further communicates with a ringer/vibrator 916, a user interface keypad/screen, biometric sensor system 918, a speaker 920, a microphone 922, a camera 924, a light sensor 921 and a temperature sensor 927.

The processor 912 controls transmission and reception of wireless signals. During a transmission mode, the processor 912 provides a voice signal from microphone 922, or other data signal, to the RF transmit/receive circuitry 906. The transmit/receive circuitry 906 transmits the signal to a remote station (e.g., a fixed station, operator, other cellular phones, etc.) for communication through the antenna 902. The ringer/vibrator 916 is used to signal an incoming call, text message, calendar reminder, alarm clock reminder, or other notification to the user. During a receiving mode, the transmit/receive circuitry 906 receives a voice or other data signal from a remote station through the antenna 902. A received voice signal is provided to the speaker 920 while other received data signals are also processed appropriately.

Additionally, a physical connector 988 can be used to connect the mobile device 900 to an external power source, such as an AC adapter or powered docking station. The physical connector 988 can also be used as a data connection to a computing device. The data connection allows for operations such as synchronizing mobile device data with the computing data on another device.

A GPS receiver 965 utilizing satellite-based radio navigation to relay the position of the user applications is enabled for such service.

The example computer systems illustrated in the figures (e.g. FIGS. 3A, 3B, 4, and 16 include examples of computer readable storage media. Computer readable storage media are also processor readable storage media. Such storage media include memory in any of various forms such as volatile and nonvolatile, removable and non-removable memory media implemented in any method or technology for storage of information such as computer readable instructions, data structures, program modules or other data. Computer storage media includes, but is not limited to, RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other medium which can be used as a memory to store the desired information and which can be accessed by a computer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for providing a user interface with a virtual object appearing in context with a real environment of a user using a see through, augmented reality display device system comprising:
    a computer system communicatively coupled via a network to the see-through near-eye, augmented reality display device system for receiving image data of a real environment of a user, the computer system comprising one or more processors and a memory accessible by the one or more processors;

the one or more processors being configured to identify one or more appearance characteristics including surface characteristics of one or more real world objects in the real environment;

the one or more processor being configured to identify one or more types of realistic physical connections available for providing a realistic visual connectivity relationship based on any of the appearance characteristics identified for the one or more real world objects;

a set of graphical design rules being stored in the memory, the set of graphical design rules defining compatibility criteria between appearance characteristics including as between respective surface characteristics;

the one or more processors being configured to select a type of object for the virtual object and to select an anchor real world objects set from the one or more real world objects based on compatibility criteria of the set of graphical design rules for forming a realistic physical connection using one of the one or more of the identified types of realistic physical connection available;

the one or more processors being configured to select at least one virtual connecting member for realistic visual interposition between a member of the selected anchor real world objects set and the virtual object so as to provide said realistic visual connectivity relationship using the selected at least one virtual connecting member as being visually interposed between a member of the selected anchor real world objects set and the virtual object; and the one or more processors being configured to generate display data for an image of the virtual object having the realistic physical connection with a selected member of the anchor real world objects set with the selected at least one virtual connecting member being visually interposed there between, the generated display data being usable by the see-through, near-eye, augmented reality display device system.

2. The system of claim 1 further comprising the computer system for receiving data from one or more applications executing in the see-through, near-eye, augmented reality display system for identifying content being represented by the virtual object for display.

3. The system of claim 2 further comprising the one or more processors having access to applications executing on the see-through, near-eye, augmented reality display device system of the user for determining at least one of a social context for the user or a personal context for the user.

4. The system of claim 2 wherein the one or more processors have access to one or more stored images of real world objects; and the one or more processors for identifying one or more appearance characteristics of one or more real world objects in the real environment based on the stored images.

5. The system of claim 1 wherein the set of graphical design rules for defining compatibility criteria between appearance characteristics comprise definitions of at least one of the following:
complimentary colors;
a texture associated with a type of material;
a geometric orientation of a surface of a type of object; and
a type of physical connection available for the surface of the type of object.

6. The system of claim 1 wherein the set of graphical design rules link one or more animation effects with a type of appearance characteristic.

7. Processor-readable storage implemented as hardware storage having plural and respectively addressable storage locations for simultaneously storing respective addressable data items including instructions encoded therein for causing one or more processors to execute a method causing display of virtual imagery that appears to be realistically and in context integrated with a real world object of a real environment viewable by a user using a see-through, augmented reality display system, the executed method comprising:

first identifying a real world object present in the viewable real environment and to which predetermined virtual imagery can be visually coupled by way of a visually interposed virtual connecting member such that the predetermined virtual imagery appears to be realistically and in context connectively integrated with the identified real world object;

second identifying a virtual connecting member usable for realistic connective disposition visually between the predetermined virtual imagery and the identified real world object so as to provide said realistic and in context, visually connective integration of the virtual imagery with the identified real world object;

generating display data for displaying the virtual connecting member as being visually connectedly interposed between the predetermined virtual imagery and the identified real world object; and using the generated display data to cause display by the see-through, augmented reality display system of the predetermined virtual imagery as being realistically and in context, visually connectively integrated with the identified real world object.

8. The processor-readable storage media of claim 7 wherein:

said first identifying includes identifying one or more real world appearance characteristics including those of respective surfaces of one or more real world objects present in the real environment;

said second identifying includes identifying one or more types of realistic physical connections that may be used during display to provide visually realistic virtual connectivities between the predetermined virtual imagery and at least one of the real world objects based on at least one of the identified real world surface appearance characteristics of the one or more real world objects;

the method further comprising:

based on the identified types of realistic physical connections, selecting a virtual object type from one or more virtual object type candidates capable of realistically being realistically portrayed as having at least one of the identified types of realistic physical connections; and selecting from an anchor candidates group of the one or more real world objects, a set whose members can each serve as a realistic physical connection providing anchor to be visually connected by way of the identified virtual connecting member to the predetermined virtual imagery based on the selected virtual object type, the members of the selected set of the one or more real objects being capable of forming a realistic physical connection with at least one of the virtual objects of the selected virtual object type and vice versa.

9. The processor-readable storage media of claim 8 wherein the selecting of the virtual object type and the selecting of the anchor real world objects set comprises:

selecting the anchor real world objects set based on positions of the real world objects of the anchor real world object set with respect to a user field of view of the see-through, augmented reality display device system.

10. The processor-readable storage media of claim 8 wherein the method further comprises:
identifying a social context of the user based on user profile data; and
selecting the virtual object type based on the social context of the user.

11. The processor-readable storage media of claim 10 wherein the method further comprises:
selecting a user interface method of communicating output to a user based on the social context.

12. The processor readable storage media of claim 9 wherein the selecting of the anchor real world objects set based on a position of the anchor real world objects further comprises selecting the anchor real world objects set based on the positions of the objects of the anchor real world object set satisfying at least one of a social context position criteria or a personal context position criteria.

13. The processor-readable storage media of claim 10 wherein the method further comprises:
selecting at least one other appearance characteristic for the virtual object for satisfying appearance compatibility criteria with the anchor real world object set and based on the social context; and
generating display data for the image of the virtual object including the selected at least one other appearance characteristic.

14. The processor-readable storage of claim 7 wherein the second identifying identifies the virtual connecting member as being usable for providing realistic physical support for the predetermined virtual imagery to which the virtual connecting member visually connects.

15. A method for presenting predetermined virtual imagery that appears to be realistically and in context integrated with a real environment viewable by a user using a see-through, augmented reality display system, the method comprising:
first identifying as an anchor at least one real world object present in the real environment and viewable through the see-through, augmented reality display system where the identified anchor can serve as a foundation for realistically supporting a virtual connecting member to which the predetermined virtual imagery will be displayed as being physically connected to by way of interposition of the virtual connecting member such that the predetermined virtual imagery is seen as being realistically supported by both of the identified anchor and the interposed virtual connecting member;
second identifying one of a plurality of predetermined virtual connecting members as the virtual connecting member to be displayed and used for realistic visual and supportive connective disposition between the predetermined virtual imagery and the identified anchor so as to provide said realistic and in context integration of the virtual imagery with the identified anchor;
generating display data for displaying the identified virtual connecting member as being visually connectedly interposed between the predetermined virtual imagery and the identified real world object; and
using the generated display data to cause display by the see-through, augmented reality display system of the predetermined virtual imagery as being realistically and in context integrated with the identified real world object by way of the identified virtual connecting member.

16. The method of claim 15 wherein:
said first identifying includes identifying one or more real world appearance characteristics of one or more real world objects present in the real environment, the identified characteristics including those of respective surfaces of one or more real world objects present in the real environment;
said second identifying includes identifying one or more types of realistic physical connections that may be provided by a subset of the plurality of predetermined virtual connecting members so as to present realistic virtual connectivities between the predetermined virtual imagery and at least one of the real world objects based on at least one of the identified real world surface appearance characteristics of the one or more real world objects;
the method further comprising:
selecting from among the identified types a type that can serve as a realistic connecting member based on content of the predetermined virtual imagery;
selecting an anchor real world objects set from the one or more real world objects viewable in the real environment based on their capability of providing realistic physical support for the content of the predetermined virtual imagery.

17. The method of claim 16 further comprising:
using at least one other appearance characteristic for identifying the virtual connecting member for satisfying appearance compatibility criteria with the anchor real world object set.

18. The method of claim 17 wherein the one or more appearance characteristics used for identifying the virtual connecting member comprises at least one of the following:
a size, a shape, a color, a surface, a geometric orientation of a surface, a surface texture, a pattern, and physical interaction characteristics.

19. The method of claim 18 wherein the physical connection type available for the surface comprises at least one of the following:
attachment;
hanging;
integration; and
supporting.

20. The method of claim 16 further comprising:
replacing a real world object with a virtual object in a user field of view of the see-through, augmented reality display device system.

21. The method of claim 16 further comprising
identifying a personal context of the user including a state of being based on eye data of the user; and
wherein selecting the type of object for the virtual connecting member further comprises selecting the virtual connecting member based on the personal context of the user.

22. The method of claim 21 further comprising
selecting at least one other appearance characteristic of the virtual connecting member in the image for display based on a social context of a user determined from image data of a physical location of the user.

23. The method of claim 22 wherein identifying a social context of the user based on user profile data further comprises determining the social context based on data identifying at least one of the following:
a person in a vicinity of the user;

a geographic location of the user; and
an activity of the user.

\* \* \* \* \*